United States Patent
Yun et al.

(10) Patent No.: US 12,556,154 B2
(45) Date of Patent: Feb. 17, 2026

(54) ELECTRONIC DEVICE AND METHOD FOR PERFORMING IMPEDANCE MATCHING ACCORDING TO ACTIVATION OF ANTENNAS

(71) Applicant: Samsung Electronics Co., Ltd., Suwon-si (KR)

(72) Inventors: Himchan Yun, Suwon-si (KR); Junwoo Kim, Suwon-si (KR); Kyungjae Lee, Suwon-si (KR); Bomyoung Kim, Suwon-si (KR); Sungkoo Park, Suwon-si (KR); Soonho Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 466 days.

(21) Appl. No.: 18/153,064

(22) Filed: Jan. 11, 2023

(65) Prior Publication Data
US 2023/0208379 A1 Jun. 29, 2023

Related U.S. Application Data

(63) Continuation of application No. PCT/KR2022/020391, filed on Dec. 14, 2022.

(30) Foreign Application Priority Data

Dec. 24, 2021 (KR) .......................... 10-2021-0187831
Jan. 28, 2022 (KR) .......................... 10-2022-0013534

(51) Int. Cl.
*H03H 7/38* (2006.01)
*H01Q 1/50* (2006.01)
(Continued)

(52) U.S. Cl.
CPC ............... *H03H 7/38* (2013.01); *H01Q 1/50* (2013.01); *H03H 7/40* (2013.01); *H03H 7/46* (2013.01); *H03H 7/465* (2013.01)

(58) Field of Classification Search
CPC .. H03H 7/38; H03H 7/40; H03H 7/46; H03H 7/465
(Continued)

(56) References Cited

U.S. PATENT DOCUMENTS 7,239,289 B2   7/2007   Kim
7,444,175 B2  10/2008   Ito et al.
(Continued)

FOREIGN PATENT DOCUMENTS

EP        4 220 851 A1   8/2023
KR  10-2005-0022977 A   3/2005
(Continued)

OTHER PUBLICATIONS

International Search Report and written opinion dated Mar. 13, 2023, issued in International Application No. PCT/KR2022/020391.
(Continued)

*Primary Examiner* — Rakesh B Patel
(74) *Attorney, Agent, or Firm* — Jefferson IP Law, LLP

(57) ABSTRACT

An electronic device is provided. The electronic device includes a first antenna, a first impedance matching circuitry corresponding to the first antenna, a second antenna, a second impedance matching circuitry corresponding to the second antenna, a switch connected to the first impedance matching circuitry and the second impedance matching circuitry, and a processor controlling the switch, wherein the processor is configured to adjust, in a first state that the first antenna and the second antenna is activated based on a preset phase, impedances of the first impedance matching
(Continued)

circuitry and the second impedance matching circuitry as a first impedance by controlling the switch, and adjust, in a second state that the first antenna of the first antenna and the second antenna is activated, an impedance of the first impedance matching circuitry as the second impedance different from the first impedance by controlling the switch.

20 Claims, 30 Drawing Sheets

(51) Int. Cl.
 *H03H 7/40* (2006.01)
 *H03H 7/46* (2006.01)
(58) Field of Classification Search
 USPC .................................. 333/101, 124, 17.3, 32
 See application file for complete search history.

(56) References Cited

U.S. PATENT DOCUMENTS

| | | | |
|---|---|---|---|
| 7,599,725 B2 | 10/2009 | Park et al. | |
| 8,224,239 B2 | 7/2012 | Kojima | |
| 8,614,646 B2 | 12/2013 | Zhang et al. | |
| 9,602,147 B2 | 3/2017 | Uejima | |
| 10,424,841 B2 | 9/2019 | Kuroda et al. | |
| 11,546,459 B2 | 1/2023 | Jung et al. | |
| 2004/0242289 A1 | 12/2004 | Jellicoe et al. | |
| 2013/0069737 A1 | 3/2013 | See et al. | |
| 2014/0240178 A1 | 8/2014 | Chun et al. | |
| 2016/0211881 A1 | 7/2016 | Kang et al. | |
| 2021/0218137 A1 | 7/2021 | Zhu | |
| 2023/0108502 A1 | 4/2023 | Cho et al. | |

FOREIGN PATENT DOCUMENTS

| | | |
|---|---|---|
| KR | 10-2006-0023541 A | 3/2006 |
| KR | 10-0714163 B1 | 5/2007 |
| KR | 10-2010-0127827 A | 12/2010 |
| KR | 10-1286971 B1 | 7/2013 |
| KR | 10-2021-0152860 A | 12/2021 |
| KR | 10-2022-0052663 A | 4/2022 |
| WO | 2021/066854 A1 | 4/2021 |

OTHER PUBLICATIONS

Extended European Search Report dated Feb. 26, 2025, issued in European Application No. 22911767.6-1206.

ELECTRONIC DEVICE AND METHOD FOR PERFORMING IMPEDANCE MATCHING ACCORDING TO ACTIVATION OF ANTENNAS

CROSS-REFERENCE TO RELATED APPLICATION(S)

This application is a continuation application, claiming priority under § 365(c), of an International application No. PCT/KR2022/020391, filed on Dec. 14, 2022, which is based on and claims the benefit of a Korean patent application number 10-2021-0187831, filed on Dec. 24, 2021, in the Korean Intellectual Property Office, and of a Korean patent application number 10-2022-0013534, filed on Jan. 28, 2022, in the Korean Intellectual Property Office, the disclosure of each of which is incorporated by reference herein in its entirety.

TECHNICAL FIELD

The disclosure relates to an electronic device and methods for performing impedance matching according to activation of antennas. More particularly, the disclosure relates an electronic device that adjusts at least one phase and/or impedance among a plurality of antennas using a power division circuit connected to the plurality of antennas.

BACKGROUND ART

With the development of wireless communication technology, the number and/or shape of antennas included in an electronic device is diversified. The electronic device may transmit and/or receive a radio frequency (RF) signal including a voice signal and/or data (e.g., messages, pictures, videos, music files, or games) using one or more antennas. The number and/or shape of antennas included in the electronic device may be designed depending on a form factor of the electronic device.

DISCLOSURE

Technical Problem

In case that the electronic device simultaneously supplies power to a plurality of antennas, in a case that impedance matching is changed according to the number of antennas to which power is supplied, since insertion loss occurs when impedance matching is varied according to the number of antennas to which power is supplied, performance of the antennas may be degraded.

As the electronic device includes a plurality of antennas, performance of the antennas may be degraded due to factors that deteriorate wireless communication performance based on the antenna.

According to an embodiment, the electronic device may adjust at least one phase and/or impedance among a plurality of antennas using a power division circuit connected to the plurality of antennas.

The technical problems to be achieved in this document are not limited to those described above, and other technical problems not mentioned herein will be clearly understood by those having ordinary knowledge in the art to which the present disclosure belongs, from the following description.

Technical Solution

According to an embodiment, an electronic device may comprise a first antenna, a first impedance matching circuitry corresponding to the first antenna, a second antenna, a second impedance matching circuitry corresponding to the second antenna, a switch connected to the first impedance matching circuitry and the second impedance matching circuitry, and a processor controlling the switch. The processor may be configured to adjust, in a first state that the first antenna and the second antenna is activated based on a preset phase, impedances of the first impedance matching circuitry and the second impedance matching circuitry as a first impedance by controlling the switch. The processor may be configured to adjust, in a second state that the first antenna of the first antenna and the second antenna is activated, an impedance of the first impedance matching circuitry as the second impedance different from the first impedance by controlling the switch.

According to an embodiment, a method of an electronic device may comprise identifying a distance between a first antenna and a second antenna supporting communication between the electronic device and external electronic device. The method may comprise activating, in a first state where the distance is lower than a preset threshold, a first impedance matching circuit of the first antenna and a second impedance matching circuit of the second antenna, based on a preset phase and a first impedance. The method may comprise selectively activating, in a second state where the distance is greater than the preset threshold, one of the first impedance matching circuit and the second impedance matching circuit based on a second impedance different from the first impedance.

According to an embodiment, an electronic device may comprise a sensor, a first antenna, a first impedance matching circuit corresponding to the first antenna, a second antenna, a second impedance matching circuit corresponding to the second antenna, a switch connected to the first impedance matching circuit and the second impedance matching circuit, and a processor controlling the switch based on the sensor. The processor may be configured to activate, in a first state that both the first antenna and second antenna are activated, both the first impedance matching circuit and the second impedance matching circuit based on a preset phase and a first impedance by controlling the switch. The processor may be configured to switch, in response to identification of an external object in contact with the electronic device by using the sensor in the first state, from the first state to a second state that an impedance of one of the first impedance matching circuit or the second impedance matching circuit is adjusted to a second impedance different from the first impedance by controlling the switch.

According to an embodiment, a method of an electronic device may comprise activating, in a first state that both the first antenna and second antenna are activated, both the first impedance matching circuit and the second impedance matching circuit based on a first impedance by controlling a switch connected to a first impedance matching circuit corresponding to the first antenna and a second impedance matching circuit corresponding to the second antenna. The method may comprise switching, in response to identification of an external object in contact with the electronic device by using the sensor of the electronic device in the first state, from the first state to a second state that an impedance of one of the first impedance matching circuit or the second impedance matching circuit is adjusted to a second impedance different from the first impedance by controlling the switch.

Advantageous Effects

In controlling a plurality of antennas, the electronic device according to an embodiment can reduce an insertion loss of a power division circuit based on impedance matching based on an activated antenna.

The electronic device according to an embodiment can reduce performance degradation of a plurality of antennas due to factors that deteriorate wireless communication performance based on the antenna.

The effects that can be obtained from the present disclosure are not limited to those described above, and any other effects not mentioned herein will be clearly understood by those having ordinary knowledge in the art to which the present disclosure belongs, from the following description.

MODE FOR INVENTION

Figure 1:
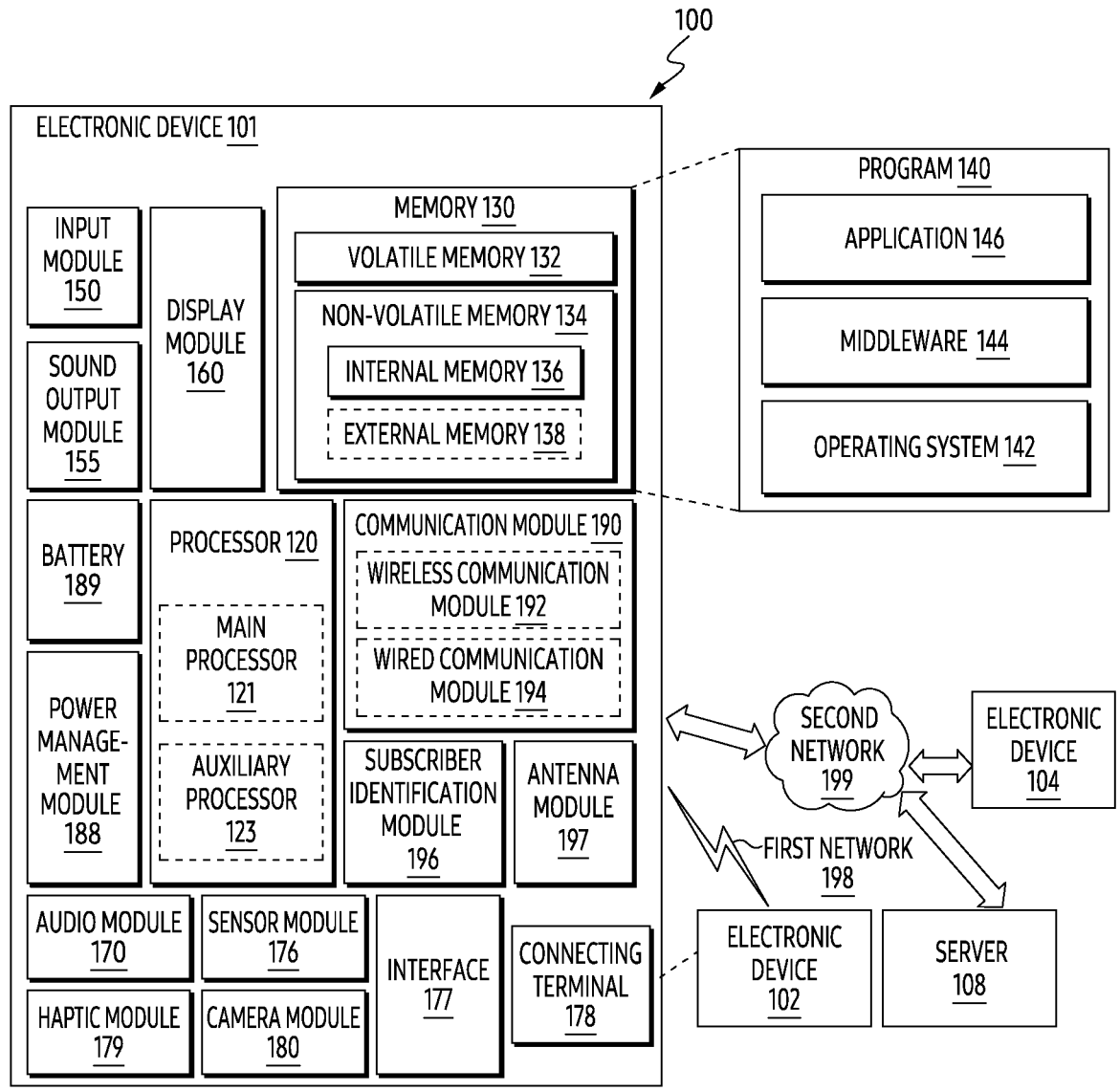
FIG. 1 is a block diagram of an electronic device in a network environment according to an embodiments.

Hereinafter, various embodiments of the present document will be described with reference to the accompanying drawings.

It is to be understood that the singular forms "a," "an," and "the" include plural referents unless the context clearly dictates otherwise. For example, reference to "a component surface" includes reference to one or more of such surfaces.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Hereinafter, various embodiments of the disclosure may be written with reference to the accompanying drawings.

FIG. 1 is a block diagram illustrating an electronic device 101 in a network environment 100 according to various embodiments.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected status. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
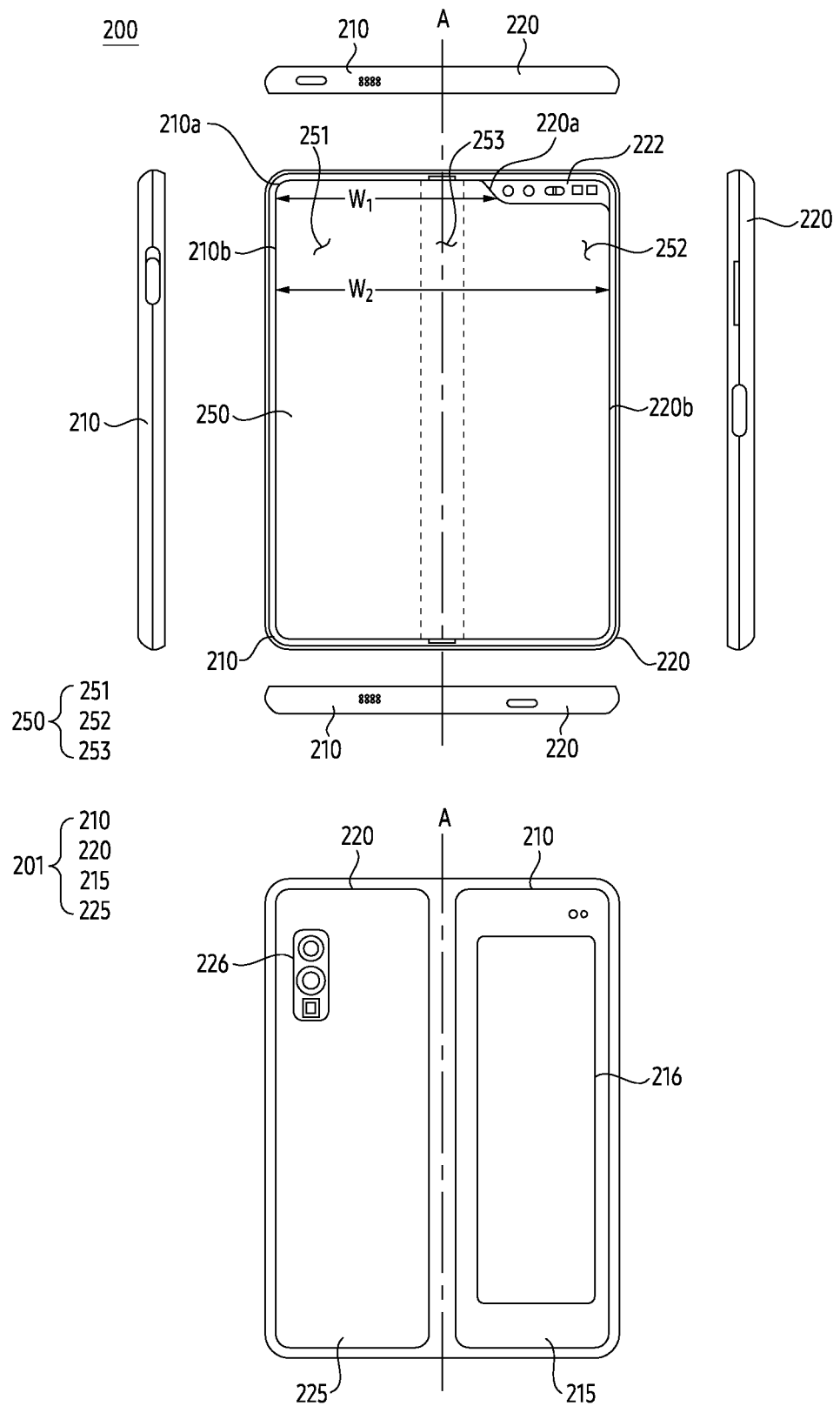
FIG. 2 is a view illustrating an unfolded status of an electronic device according to an embodiment.

FIG. 2 is a view illustrating an unfolded status of an electronic device according to an embodiment.

Figure 3:
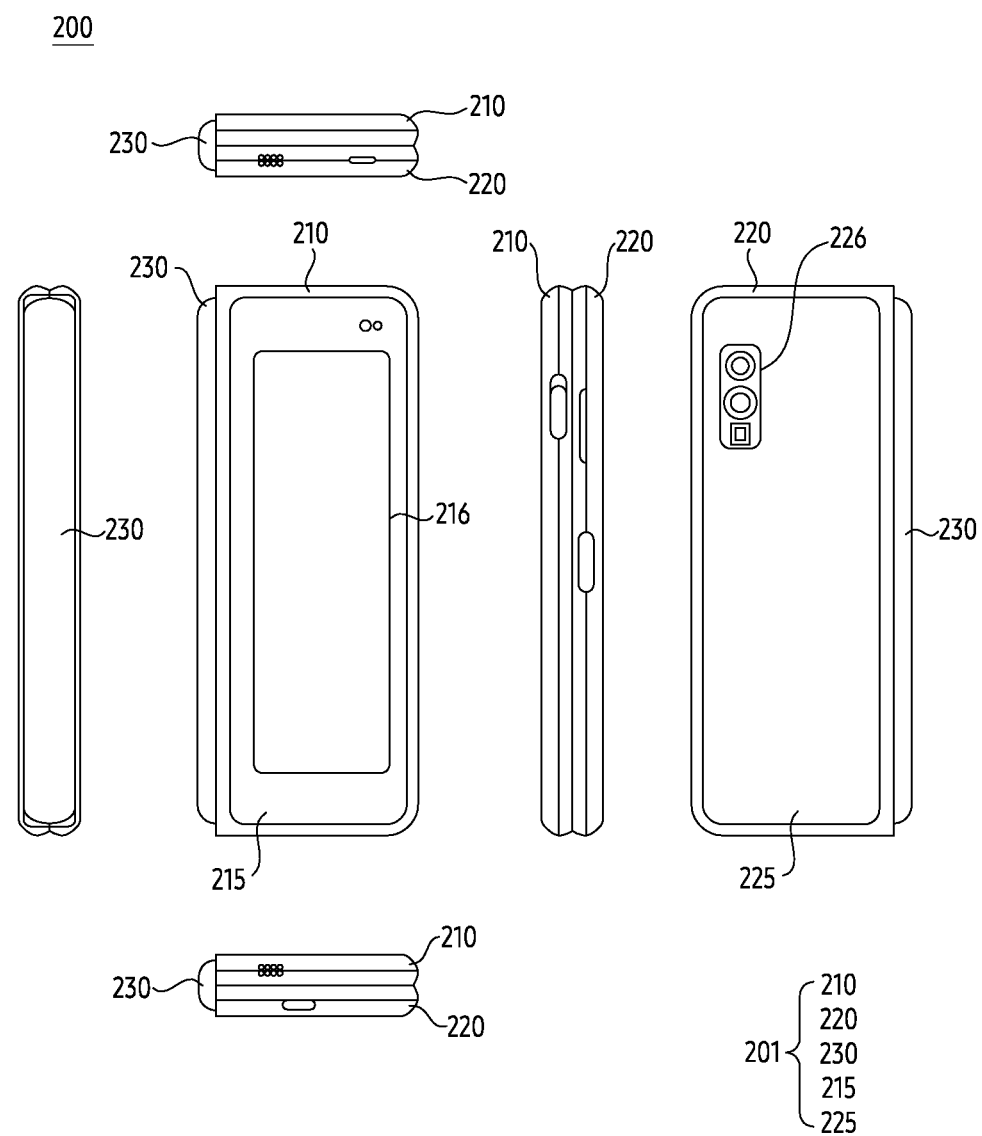
FIG. 3 is a view illustrating a folded status of an electronic device according to an embodiment.

FIG. 3 is a view illustrating a folded status of an electronic device according to an embodiment.

Figure 4A:
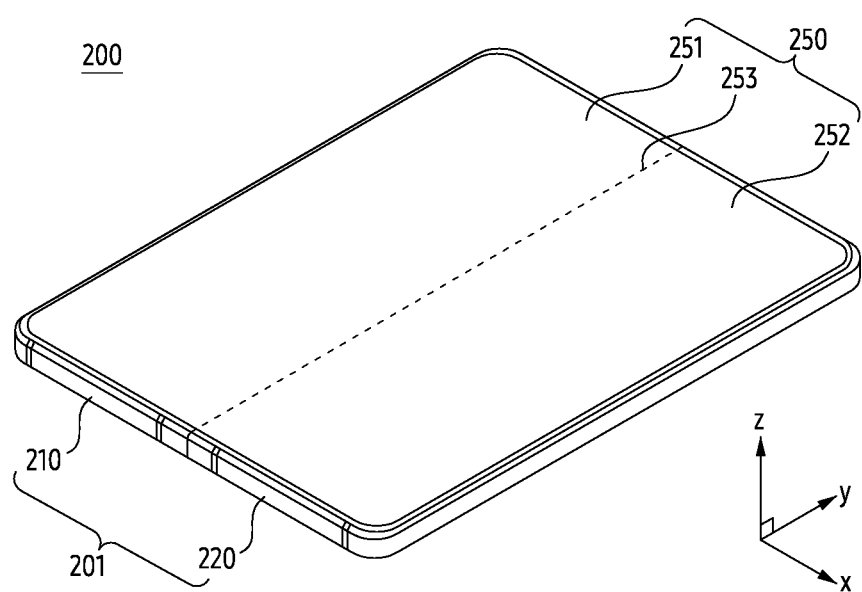
FIGS. 4A and 4B are perspective views illustrating a fully unfolded status or a partially unfolded intermediate status of an electronic device according to an embodiment.
Figure 4B:
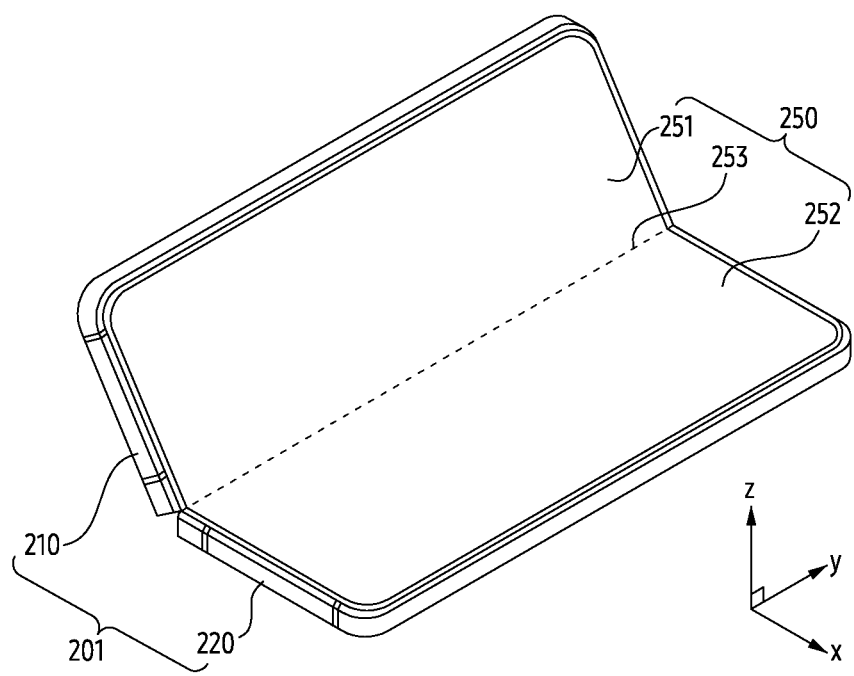

FIGS. 4A and 4B are perspective views illustrating a fully unfolded status or a partially unfolded intermediate status of an electronic device 200 according to an embodiment.

The electronic device 200 of FIGS. 2 to 4 is an example of the electronic device 101 illustrated in FIG. 1, and may be a foldable or bendable electronic device.

Referring to FIGS. 4A and 4B, a spatial coordinate system defined as an X-axis, a Y-axis, and a Z-axis orthogonal to each other is illustrated. Herein, the X-axis may indicate the width direction of the electronic device, the Y-axis may indicate the length direction of the electronic device, and the Z-axis may indicate the height (or thickness) direction of the electronic device. In the description to be described below, the term "first direction" may mean a direction parallel to the Z-axis.

Referring to FIGS. 2 and 3, in an embodiment, the electronic device 200 may include a foldable housing 201 and a flexible or foldable display 250 (hereinafter, abbreviated as "display" 250) (e.g., display device 160 of FIG. 1) disposed in a space formed by the foldable housing 201. According to an embodiment, a surface on which the display 250 is disposed (or a surface on which the display 250 is viewed from the outside of the electronic device 200) may be defined as a front surface of the electronic device 200. In addition, an opposite surface of the front surface may be defined as the rear surface of the electronic device 200. In addition, a surface surrounding a space between the front surface and the rear surface may be defined as a side surface of the electronic device 200.

According to various embodiments, the foldable housing 201 may include a first housing structure 210, a second housing structure 220 including a sensor region 222, a first rear cover 215, a second rear cover 225, and a hinge structure 230. Herein, the hinge structure 230 may include a hinge cover covering a foldable part of the foldable housing 201. The foldable housing 201 of the electronic device 200 is not limited to the shape and coupling illustrated in FIGS. 2 and 3, and may be implemented by a combination and/or coupling of other shapes or components. For example, in another embodiment, the first housing structure 210 and the first rear cover 215 may be integrally formed, and the second housing structure 220 and the second rear cover 225 may be integrally formed.

According to various embodiments, the first housing structure 210 may include a first surface connected to the hinge structure 230 and facing in a first direction, and a second surface facing in a second direction opposite to the first direction. The second housing structure 220 may include a third surface connected to the hinge structure 230 and facing in a third direction, and a fourth surface facing in a fourth direction opposite to the third direction. The second housing structure 220 may rotate with respect to the first housing structure 210 with the hinge structure 230 as the center. The electronic device 200 may switch to a folded status or an unfolded status.

According to an embodiment, in the electronic device 200, the first surface may face the third surface in a fully folded status, and the third direction may be the same as the first direction in a fully unfolded status.

According to various embodiments, the first housing structure 210 and the second housing structure 220 may be disposed on both sides of the folding axis A, and may have an overall symmetrical shape with respect to the folding axis A. As will be described later, the first housing structure 210 and the second housing structure 220 may have different angles or distances formed from each other depending on whether the state of the electronic device 200 is an unfolded status, a folded status, or a partially unfolded (or partially folded) intermediate status. According to an embodiment, unlike the first housing structure 210, the second housing structure 220 further includes the sensor region 222 in which various sensors are disposed, but may have a shape symmetrical to each other in other regions.

According to various embodiments, as illustrated in FIG. 2, the first housing structure 210 together with the second housing structure 220 may form recesses for accommodating the display 200 together. According to an embodiment, due to the sensor region 222, the recess may have two or more different widths in a direction perpendicular to the folding axis A. According to an embodiment, the recess may have a first width w1 between a first part 210a parallel to the folding axis A in the first housing structure 210 and a first part 220a formed at an edge of the sensor region 222 in the second housing structure 220. The recess may have a second width w2 formed by a second part 220b of the first housing structure 210 and a second part 220b parallel to the folding axis A without corresponding to the sensor region 222 of the second housing structure 220. In this case, the second width w2 may be formed to be longer than the first width w1. According to an embodiment, the first part 220a and the second part 220b of the second housing structure 220 may have different distances from the folding axis A from each other. The width of the recess is not limited to the illustrated example. In another embodiment, the recess may have a plurality of widths by a part having a shape of the sensor region 222 or an asymmetrical shape of the first housing structure 210 and the second housing structure 220. According to various embodiments, the sensor region 222 may be formed to have a certain region, adjacent to a corner of the second housing structure 220. However, the arrangement, shape, and size of the sensor region 222 are not limited to the illustrated example. For example, in another embodiment, the sensor region 222 may be provided in another corner of the second housing structure 220 or in an arbitrary region between the upper corner and the lower corner. In an embodiment, components for performing various functions embedded in the electronic device 200 may be exposed on the front surface of the electronic device 200 through the sensor region 222, or through one or more openings provided in the sensor region 222. In various embodiments, the components may include various types of sensors. The sensor may include, for example, at least one of a front camera, a receiver, or a proximity sensor. According to various embodiments, the sensor region 222 in the second housing structure 220 may be omitted or may be formed at a position different from that illustrated in the drawing.

According to various embodiments, at least a part of the first housing structure 210 and the second housing structure 220 may be formed of a metal material or a non-metal material having rigidity of a size selected to support the display 250. At least a part formed of the metal material may provide a ground plane of the electronic device 200, and may be electrically connected to a ground line formed on a printed circuit board disposed within the foldable housing 201.

According to various embodiments, the first rear cover 215 may be disposed on one side of the folding axis A on the rear surface of the electronic device 200, for example, may have a substantially rectangular edge, and the edge may be surrounded by the first housing structure 210. Similarly, the second rear cover 225 may be disposed on another side of the folding axis A on the rear surface of the electronic device 200, and an edge thereof may be surrounded by the second housing structure 220.

According to various embodiments, the first rear cover 215 and the second rear cover 225 may have a substantially symmetrical shape around the folding axis A. However, the first rear cover 215 and the second rear cover 225 do not necessarily have a symmetrical shape, and in another embodiments, the electronic device 200 may include the first rear cover 215 and the second rear cover 225 having various shapes. In still another embodiment, the first rear cover 215 may be integrally formed with the first housing structure 210, and the second rear cover 225 may be integrally formed with the second housing structure 220.

According to various embodiments, the first rear cover 215, the second rear cover 225, the first housing structure 210, and the second housing structure 220 may form a space in which various components (e.g., a printed circuit board or a battery) of the electronic device 200 may be disposed. According to an embodiment, one or more components may be disposed on the rear surface of the electronic device 200 or may be visually exposed. For example, at least a part of the sub-display may be visually exposed through the first rear region 216 of the first rear cover 215. In another embodiment, one or more components or sensors may be visually exposed through the second rear region 226 of the second rear cover 225. In various embodiments, the sensor may include a proximity sensor and/or a rear camera.

According to various embodiments, the front camera exposed to the front surface of the electronic device 200 through one or more openings provided in the sensor region 222 or the rear camera exposed through the second rear region 226 of the second rear cover 225 may include one or more lenses, an image sensor, and/or an image signal processor. The flash may include, for example, a light emitting diode or a xenon lamp. In some embodiments, two or more lenses (infrared cameras, wide-angle and telephoto lenses) and image sensors may be disposed on one side of electronic device 200.

Referring to FIG. 3, the hinge cover may be configured to cover internal parts (e.g., the hinge structure 230) by being disposed between the first housing structure 210 and the second housing structure 220. According to an embodiment, the hinge structure 230 may be covered by a part of the first housing structure 310 and the second housing structure 320 or exposed to the outside according to an unfolded status, an intermediate status, or a folded status of the electronic device 200.

According to an embodiment, as illustrated in FIG. 2, when the electronic device 200 is in an unfolded status (e.g., a fully unfolded status), the hinge structure 230 may be covered by the first housing structure 210 and the second housing structure 220 and may not be exposed. As another example, as illustrated in FIG. 3, when the electronic device 200 is in a folded status (e.g., a fully folded status), the hinge structure 230 may be exposed to the outside between the first housing structure 210 and the second housing structure 220. As still another example, when the first housing structure 210 and the second housing structure 220 are in an intermediate status that is folded with a certain angle, the hinge structure 230 may be partially exposed to the outside between the first housing structure 210 and the second housing structure 220. However, in this case, the exposed region may be less than the fully folded status. In an embodiment, the hinge structure 230 may include a curved surface.

According to various embodiments, the display 250 may be disposed on a space formed by the foldable housing 201. For example, the display 250 is seated on a recess formed by the foldable housing 201 and may be viewed from the outside through the front surface of the electronic device 200. For example, the display 250 may compose most of the front surface of the electronic device 200. Accordingly, the front surface of the electronic device 200 may include the display 250 and a partial region of the first housing structure 210 adjacent to the display 250 and a partial region of the second housing structure 220. In addition, the rear surface of the electronic device 200 may include a first rear cover 215, a partial region of the first housing structure 210 adjacent to the first rear cover 215, a second rear cover 225, and a partial region of the second housing structure 220 adjacent to the second rear cover 225.

According to various embodiments, the display 250 may mean a display in which at least some regions are deformable into a flat or curved surface. According to an embodiment, the display 250 may include the folding region 253, a first region 251 disposed on one side (e.g., the left side of the folding region 253 illustrated in FIG. 2) with respect to the folding region 253 and a second region 252 disposed on another side (e.g., right side of the folding region 253 illustrated in FIG. 2).

However, the region classification of the display 250 illustrated in FIG. 2 is exemplary, and the display 250 may be classified into a plurality of regions (for example, four or more or two) according to a structure or a function. For example, in the embodiment illustrated in FIG. 2, the region of the display 200 may be divided by a folding region 203 extending parallel to the folding axis A, but in another embodiment, the region of the display 200 may be divided based on another folding axis (e.g., a folding axis parallel to a width direction of the electronic device).

According to various embodiments of the disclosure, the display 250 may be coupled to or disposed adjacent to a touch panel provided with a touch sensing circuit and a pressure sensor capable of measuring the intensity (pressure) of the touch. For example, the display 250 is an example of a touch panel, and may be coupled to or disposed adjacent to a touch panel detecting an electromagnetic resonance (EMR) type stylus pen.

According to various embodiments, the first region 251 and the second region 252 may have an overall symmetrical shape around the folding region 253. However, unlike the first region 251, the second region 252 may include a notch which is cut according to the presence of the sensor region 222, but may have a shape symmetrical to the first region 251 in another regions. In other words, the first region 251 and the second region 252 may include a part having a symmetrical shape and a part having an asymmetrical shape.

According to various embodiments, edge thicknesses of the first region 251 and the second region 252 may be formed differently from edge thicknesses of the folding region 253. The edge thickness of the folding region 253 may be formed to be thinner than thicknesses of the first region 251 and the second region 252. In terms of thickness, the first region 251 and the second region 252 may have an asymmetric shape when the first region 251 and the second region 252 are viewed in cross-section. For example, the edge of the first region 251 may be formed to have a first radius of curvature, and the edge of the second region 252 may be formed to have a second radius of curvature different from the first radius of curvature. In another embodiment, in terms of thickness, the first region 251 and the second region 252 may have a symmetrical shape when the first region 251 and the second region 252 are viewed in cross-section. It will be described in detail later through embodiments disclosed in FIG. 10A or below.

Hereinafter, operations of the first housing structure 210 and the second housing structure 220 according to the state (e.g., a folded status, an unfolded status, or an intermediate status) of the electronic device 200, and regions of the display 250 will be described.

According to various embodiments, when the electronic device 200 is in an unfolded status (e.g., FIG. 2), the first housing structure 210 and the second housing structure 220 may be disposed to face the same direction while forming an angle of 180 degrees. The surface of the first region 251 and the surface of the second region 252 of the display 250 may form 180 degrees with each other and may face the same direction (e.g., the front direction of the electronic device). The folding region 253 may form a same plane as the first region 251 and the second region 252.

According to various embodiments, when the electronic device 200 is in a folded status (e.g., FIG. 3), the first housing structure 210 and the second housing structure 220 may be disposed to face each other. The surface of the first region 251 and the surface of the second region 252 of the display 250 may form a narrow angle (e.g., between 0 and 10 degrees), and may face each other. At least a part of the folding region 253 may be formed of a curved surface having a preset curvature.

According to various embodiments, when the electronic device 200 is in an intermediate status, the first housing structure 210 and the second housing structure 220 may be disposed at a certain angle with each other. The surface of the first region 251 and the surface of the second region 252 of the display 250 may form an angle greater than the folded status and smaller than the unfolded status. At least a part of the folding region 253 may be formed of a curved surface having a certain curvature, and the curvature at this time may be smaller than that in the folded status.

FIG. 4A may illustrate an unfolded status of the electronic device 200, and FIG. 4B may illustrate an intermediate status in which the electronic device 200 is partially unfolded. As described above, the electronic device 200 may switch to a folded status or an unfolded status. According to an embodiment, when viewed in the folding axis direction (e.g., the A axis of FIG. 2), the electronic device 200 may be folded in two ways: 'in-folding' in which the front surface of the electronic device 200 is folded to form an acute angle, and 'out-folding' in which the front surface of the electronic device 200 is folded to form an obtuse angle. For example, in the folded status of the electronic device 200, the first surface of the first housing structure 210 may face the third surface of the second housing structure 220, and in the unfolded status, the first surface of the first housing structure 210 and the third surface of the second housing structure 220 may face the same direction (e.g., a direction parallel to the Z-axis).

For another example, when the electronic device 200 is folded in an out-folding type, the second surface of the first housing structure 210 may face the fourth surface of the second housing structure 220.

In addition, although not illustrated in the drawings, the electronic device 200 may include a plurality of hinge axes (e.g., two mutually parallel hinge axes including the A axis in FIG. 2 and the other axis parallel to the above A axis), and in this case, the electronic device 200 may be folded in a 'multi-folding' type in which the in-folding and the out-folding types are combined.

The in-folding type may mean to a state in which the display 250 is not exposed to the outside in a fully folded status. The out-folding type may mean a state in which the display 250 is exposed to the outside in a fully folded status. FIG. 4B illustrates an intermediate status that is partially unfolded in the process of in-folding of the electronic device 200.

Hereinafter, for convenience, a state in which the electronic device 200 is folded in an in-folding type will be mainly described, but it also should be noted that these descriptions may be applied to a state in which the electronic device 200 is folded in an out-folding type.

Figure 5:
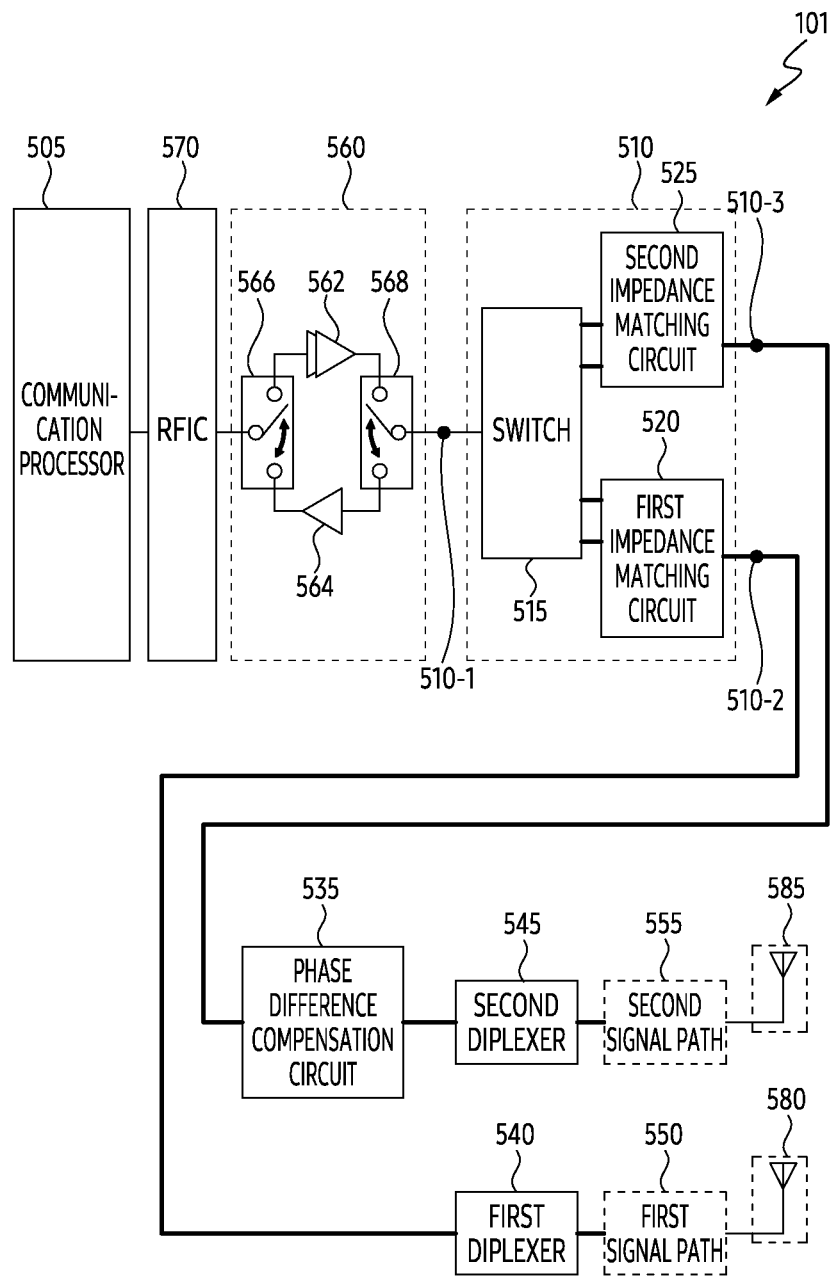
FIG. 5 is a block diagram of an electronic device according to an embodiment.

FIG. 5 is a block diagram of an electronic device 101 according to an embodiment. The electronic device 101 of FIG. 5 may be an example of the electronic device 101 of FIG. 1. For example, the block diagram of the electronic device 101 of FIG. 5 may be at least a part of the communication module 190 and/or the antenna module 197 of FIG. 1. Hereinafter, a circuit included in the electronic device 101 according to an embodiment will be described in order to activate at least one of the first antenna 580 and the second antenna 585.

Referring to FIG. 5, according to an embodiment, the electronic device 101 may include at least one of a communication processor 505, a radio frequency integrated circuit (RFIC) 570, a radio frequency front-end (RFFE) 560, a power division circuit 510, a phase difference compensation circuit 535, a first diplexer 540, a second diplexer 545, a first signal path 550, a second signal path 555, a first antenna 580, and a second antenna 585. According to an embodiment, in each of the first state of simultaneously activating both the first antenna 580 and the second antenna 585, or a second state of selectively activating either the first antenna 580 or the second antenna 585, the electronic device 101 may perform impedance matching based on the power division circuit 510. A structure of the power division circuit 510 of the electronic device 101 according to an embodiment will be described later with reference to FIGS. 6A, 6B, 6C, 7A, 7B, 7C, 7D, 8A, 8B, and 9A to 9B.

According to an embodiment, the electronic device 101 may switch between the first state and the second state, based on at least one of the posture of the electronic device 101, one or more external objects in contact with the electronic device 101, and/or the state of the hardware component (e.g., a receiver included in the sound output module 155 of FIG. 1). As the electronic device 101 according to an embodiment performs impedance matching based on the power division circuit 510, insertion loss of the first antenna 580 and the second antenna 585 may be reduced, wherein the insertion loss are caused by an impedance mismatch caused by a difference in impedance in each of the first state and the second state. The reduction of the insertion loss according to impedance matching by the power division circuit 510 will be described later with reference to FIGS. 10A and 10B.

Referring to FIG. 5, according to an embodiment, the communication processor 505 of the electronic device 101 may control a circuit connected to the communication processor 505 in order to transmit and/or receive wireless signals between the electronic device 101 and one or more external electronic devices. For example, in response to receiving a request from an application processor (AP) (e.g., the processor 120 in FIG. 1) to transmit data to an external electronic device, the communication processor 505 may output an electrical signal (e.g., a digital data signal) having a frequency band of a base band based on the data to the RFIC 570. Hereinafter, the base band is a frequency band used for transmitting and receiving an electrical signal in the communication processor 505, and may mean, for example, a frequency band including 0 GHz.

Referring to FIG. 5, according to an embodiment, the RFIC 570 of the electronic device 101 may convert the electrical signal of the base band received from the communication processor 505 into an RF signal of a preset frequency band used in the cellular network. For example, the cellular network may include a legacy network including a second-generation (2G), third-generation (3G), fourth-generation (4G), and/or long-term evolution (LTE) network, and/or a 5G network defined by 3GPP. For example, the preset frequency band may include a low band (LB) (e.g., B71, B12, B13, B14, B17, B28, B29, B44, B67, B68, B85) between 600 MHz and 700 MHz, a mid-band (MB) between 1 GHz and 2 GHz, and/or a high band (HB) between 2 GHz and 3 GHz.

Referring to FIG. 5, according to an embodiment, the RFFE 560 of the electronic device 101 may include a first amplifier 562 for pre-processing (e.g., amplifying) an electrical signal to be transmitted from the RFIC 570 to at least one of the first antenna 580 and the second antenna 585. The RFFE 560 of the electronic device 101 according to an embodiment may include a second amplifier 564 for pre-processing an electrical signal from at least one of the first antenna 580 and the second antenna 585 toward the RFIC 570. For example, the first amplifier 562 may include a cascade amplifier in which a plurality of amplifiers are connected in series. For example, the second amplifier 564 may include a low-noise amplifier (LNA).

Referring to FIG. 5, the RFFE 560 may include switches 566 and 568 for selectively adding a first amplifier 562 or a second amplifier 564 to a signal path. For example, in a state in which a wireless signal is transmitted using the first antenna 580 and/or the second antenna 585, the switches 566 and 568 may form a signal path including a first amplifier 562 of the first amplifier 562 and the second amplifier 564, and thus may amplify an electrical signal output from the RFIC 570 using the first amplifier 562. For example, in a state in which a wireless signal is received using the first antenna 580 and/or the second antenna 585, the switches 566 and 568 may form a signal path including a second amplifier 564 of the first amplifier 562 and the second amplifier 564, and thus may amplify an electrical signal input to the RFFE 560 using the second amplifier 564. As the switches 566 and 568 are controlled to be electrically connected to the RFIC 570 through the second amplifier 564, the electrical signal amplified by the second amplifier 564 may be output to the RFIC 570.

Referring to FIG. 5, a signal path formed by switches 566 and 568 in the RFFE 560 may be formed between the RFIC 570 and the power division circuit 510. According to an embodiment, the power division circuit 510 of the electronic device 101 may transmit the electrical signal received through the RFFE 560, according to states in which at least one of the first antenna 580 and the second antenna 585 is selectively activated, to at least one of the first antenna 580 and the second antenna 585. In a first state in which the electrical signal is transmitted to all of the first antenna 580 and the second antenna 585 through the power division circuit 510, a ratio between power of the electrical signals divided into each of the first antenna 580 and the second antenna 585 may be selected from different ratios according to embodiments. For example, the ratio may be any one of a plurality of ratios including 1:1, 2:1, and 1:2. Hereinafter, an embodiment in which a ratio between power of electrical signals divided into each of the first antenna 580 and the second antenna 585 is 1:1, but the embodiment is not limited thereto.

Referring to FIG. 5, according to an embodiment, the power division circuit 510 of the electronic device 101 may include a first node 510-1 connected to the RFFE 560, a second node 510-2 electrically connected to the first antenna 580, and a third node 510-3 electrically connected to the second antenna 585. According to an embodiment, the power division circuit 510 may include a switch 515 connected to the RFFE 560 through the first node 510-1. According to an embodiment, the switch 515 of the power division circuit 510 may be controlled by a processor included in the electronic device 101 (e.g., the communication processor 505 of FIG. 5 and/or the processor 120 of FIG. 1). An operation in which the switch 515 of the power division circuit 510 according to an embodiment is controlled by a processor included in the electronic device 101 will be described later with reference to FIG. 15.

According to an embodiment, the power division circuit 510 may include a first impedance matching circuit 520 disposed between the switch 515 and the second node 510-2 to adjust a phase and/or impedance of an electrical signal transmitted from the switch 515 to the second node 510-2. According to an embodiment, the power division circuit 510 may include a second impedance matching circuit 525 disposed between the switch 515 and the third node 510-3 to adjust a phase of an electrical signal transmitted from the switch 515 to the third node 510-3. Referring to FIG. 5, each of the first impedance matching circuit 520 and the second impedance matching circuit 525 may include a plurality of nodes connected to the switch 515. The plurality of nodes included in each of the first impedance matching circuit 520 and the second impedance matching circuit 525 and connected to the switch 515 may be selectively connected to the node 510-1 through the switch 515. As the plurality of nodes are selectively connected to the first node 510-1 through the switch 515, impedance between the first node 510-1 and the second node 510-2 to the third node 510-3 may be changed. The impedance between the first node 510-1 to the third node 510-3 may be changed to improve transmission characteristics of the electrical signal between the first node 510-1 to the third node 510-3. The plurality of nodes included in each of the first impedance matching circuit 520 and the second impedance matching circuit 525 and connected to the switch 515 will be described later with reference to FIGS. 6A, 6B, and 6C.

According to an embodiment, the second node 510-2 of the power division circuit 510 may be connected to the first antenna 580 through the first diplexer 540 and the first signal path 550. The third node 510-3 of the power division circuit 510 according to an embodiment may be connected to the second antenna 585 through a phase difference compensation circuit 535, a second diplexer 545, and a second signal path 555. The first diplexer 540 and the second diplexer 545 may filter electrical signals using a low-pass filter (LPF) and a high-pass filter (HPF). For example, since the first diplexer 540 and the second diplexer 545 may include the same filters, the electronic device 101 may control the first antenna 580 and the second antenna 585 in the same band.

According to an embodiment, the first signal path 550 of the power division circuit 510 may include hardware (e.g., Flexible RF cable (FRC) and/or FRC connector) connecting the first antenna 580 and the first diplexer 540 formed on the first portion of the housing of the electronic device 101. Referring to FIG. 5, in the housing of the electronic device 101, the second signal path 555 of the power division circuit 510 may include hardware (e.g., a conductive line) connecting the second antenna 585 and the second diplexer 545 formed on the second portion distinct from the first portion. As in examples of FIGS. 11A, 11B, 12, 13, 14, and 15, the first antenna 580 and the second antenna 585 may be formed on distinct portions of the electronic device 101 according to a form factor of the electronic device 101. As the first antenna 580 and the second antenna 585 are formed on distinct portions, lengths and/or materials of the first signal path 550 and the second signal path 555 may be different from each other. For example, the difference in lengths of the first signal path 550 and the second signal path 555 may cause a phase difference between electrical signals output from each of the first signal path 550 and the second signal path 555, after the same electrical signal is input to the first signal path 550 and the second signal path 555. The phase difference compensation circuit 535 of FIG. 5 may be included in the electronic device 101 to compensate for the phase difference.

According to an embodiment, the first antenna 580 and the second antenna 585 may transmit a wireless signal based on the electrical signal divided by the power division circuit 510. The first antenna 580 and the second antenna 585 may include a conductive pattern formed on at least a part of a side surface (e.g., at least one surface between the front surface of the electronic device 101 on which the display is disposed and the rear surface opposite to the front surface) of a housing of the electronic device 101. In an embodiment, the first antenna 580 may be referred to as a main antenna. In an embodiment in which the first antenna 580 is referred to as the main antenna, the second antenna 585 may be referred to as a sub antenna.

According to an embodiment, the electronic device 101 may adjust impedance (e.g., impedance between an input node and an output node of an impedance matching circuit) corresponding to at least one antenna activated from the first impedance matching circuit 520 and the second impedance matching circuit 525 to improve the performance of at least one activated antenna among the first antenna 580 and the second antenna 585 $n$ each of the states distinguished by activation of each of the first antenna 580 and second antenna 585. For example, the states may include a first state in which both the first antenna 580 and the second antenna 585 are activated and operate based on the same phase. Hereinafter, the first state may be referred to as an equivalent phase antenna (EPA) state. For example, the states may include a second state in which any one of the first antenna 580 and the second antenna 585 is selectively activated and the other is deactivated. Hereinafter, the second state may be referred to as an antenna switched diversity (ASDiv) state. In an embodiment in which the first antenna 580 is referred to as the main antenna and the second antenna 585 is referred to as the sub antenna, the second state may mean a state in which the sub antenna is activated of the main antenna and the sub antenna. In an embodiment in which the first antenna 580 is referred to as the main antenna and the second antenna 585 is referred to as the sub-antenna, a state in which the main antenna is activated of the main antenna and the sub-antenna may be referred to as a third state.

According to an embodiment, the electronic device 101 may be switched between the first to third states to compensate for a decrease in radiation efficiency due to an external object (e.g., a human body) in contact with the electronic device 101. When switching between the first to third states, the switch 515 may perform impedance matching based on a current state of the first to third states, by adjusting the impedance between at least one input node and the output node of the first impedance matching circuit 520 or the second impedance matching circuit 525, based on a control signal (e.g., a control signal transmitted from the communication processor 505) transmitted to the switch 515. The impedance matching performed based on the switch 515 may be performed to compensate for impedance mismatch due to a change in the number of antennas connected to the RFIC 570, according to the first state to the third state.

Hereinafter, referring to FIGS. 6A to 6C, structures of a first impedance matching circuit 520, a second impedance matching circuit 525 and a switch 515 for performing impedance matching will be described in the power division circuit 510 included in the electronic device 101 according to an embodiment.

Figure 6A:
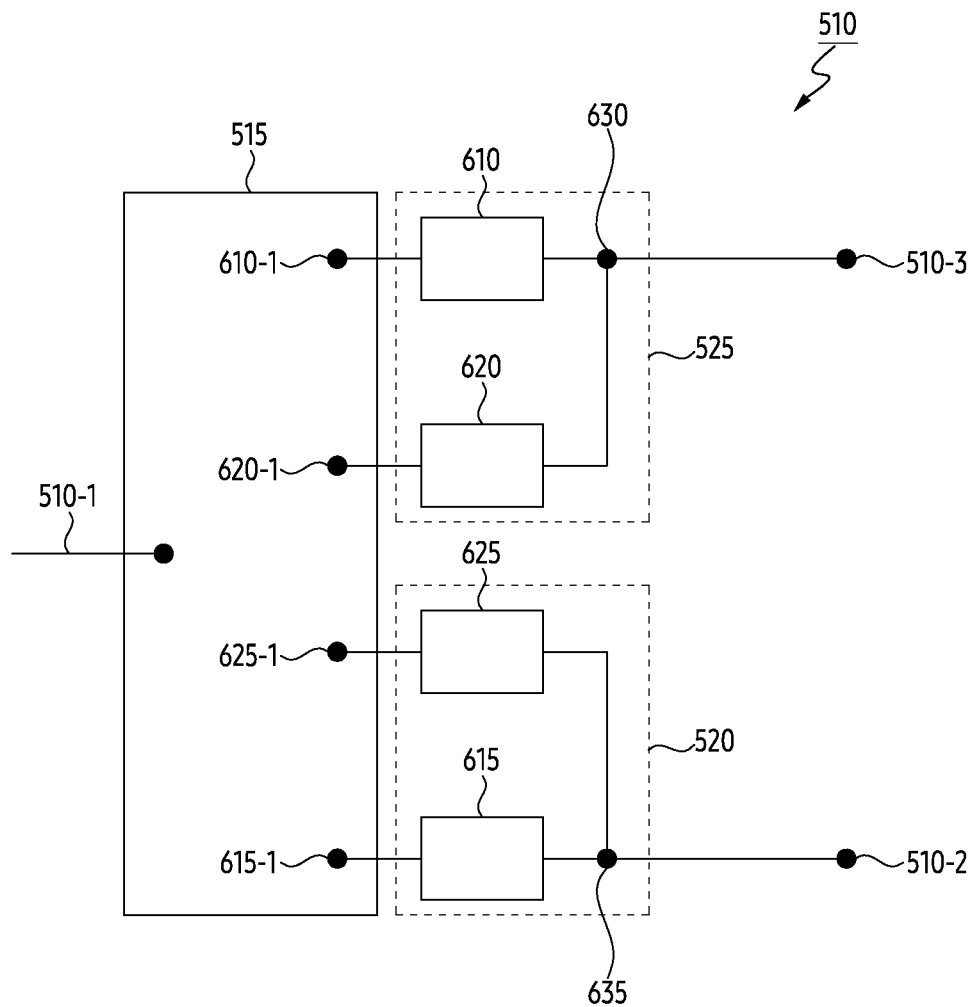
FIGS. 6A, 6B, and 6C are exemplary block diagrams of a power division circuit included in an electronic device according to an embodiment.
Figure 6B:
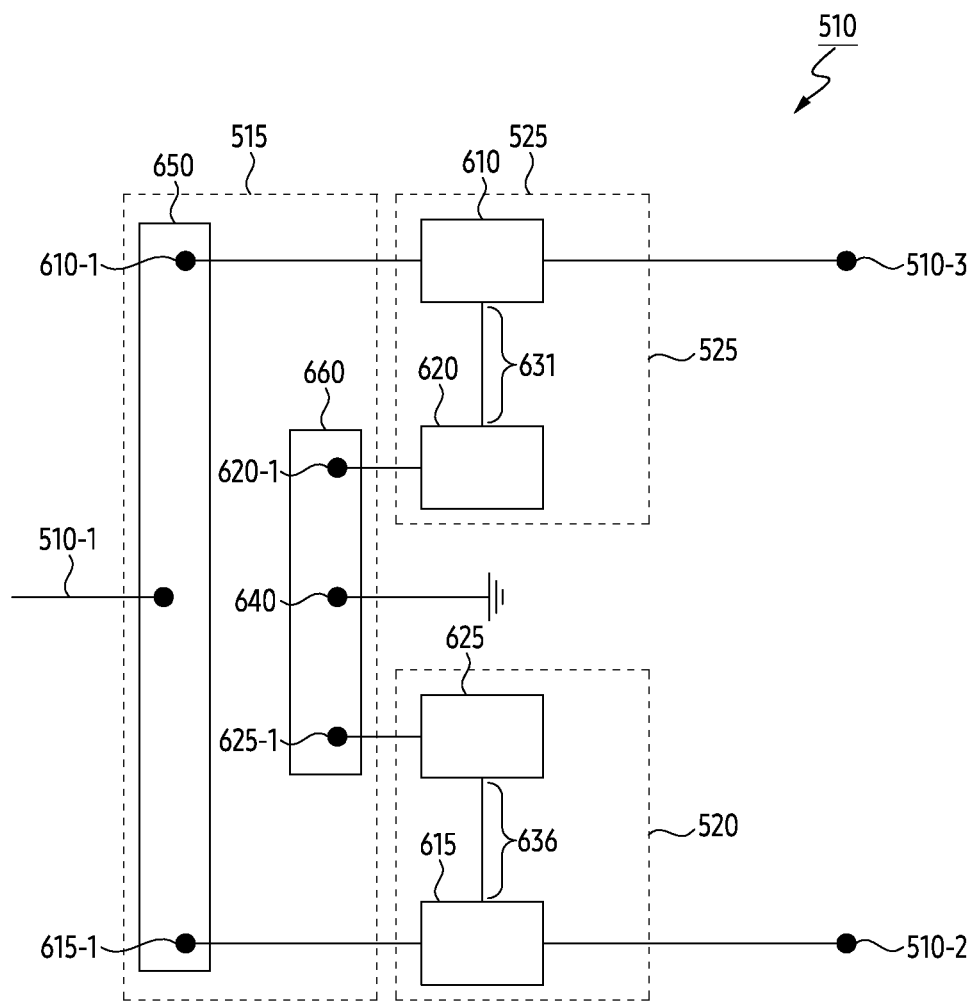
Figure 6C:
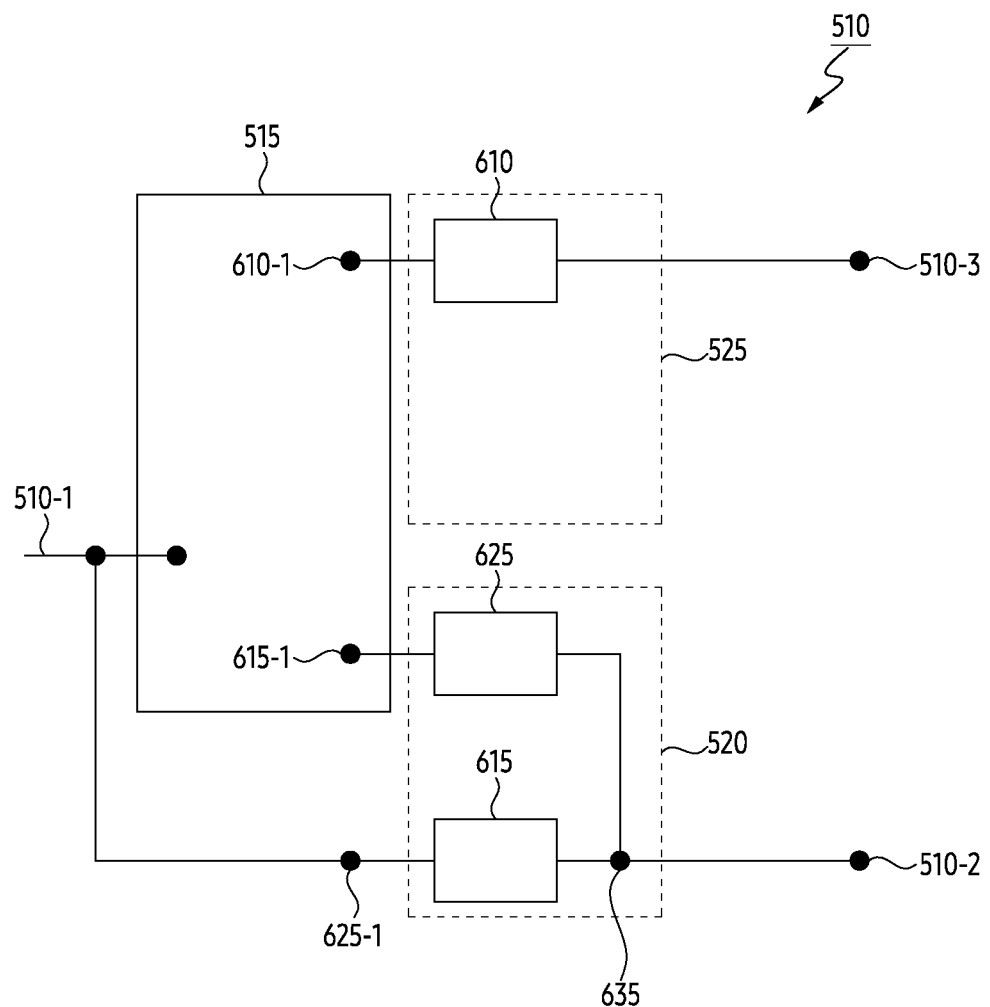

FIGS. 6A, 6B, and 6C are exemplary block diagrams of a power division circuit 510 included in an electronic device according to an embodiment. The electronic device of FIGS. 6A, 6B, and 6C may be an example of the electronic device 101 of FIGS. 1 and 5. The power division circuit 510 of FIGS. 6A to 6C may be different examples of the power division circuit 510 of FIG. 5. Components commonly illustrated in at least two drawings of FIGS. 6A to 6C may have the same reference numerals.

Referring to FIG. 6A, an example of a power division circuit 510 according to an embodiment is illustrated. In an embodiment of FIG. 6A, the switch 515 included in the power division circuit 510 may be a single pole 4throw (SP4T) type switch connecting the first node 510-1 to at least one of four distinct nodes 610-1, 620-1, 615-1, and 625-1. Hereinafter, the node 610-1 may be referred to as a first node 610-1 connected to the second impedance matching circuit 525. The node 620-1 may be referred to as a second node 620-1 connected to the second impedance matching circuit 525. The node 615-1 may be referred to as a third node 615-1 connected to the first impedance matching circuit 520. The node 625-1 may be referred to as a fourth node 625-1 connected to the first impedance matching circuit 520. Referring to FIG. 6A, four nodes 610-1, 620-1, 615-1, and 625-1 may be connected to a first impedance matching circuit 520 and a second impedance matching circuit 525. For example, the nodes 615-1 and 625-1 may be electrically connected to the first impedance matching circuit 520 and the nodes 610-1 and 620-1 may be electrically connected to the second impedance matching circuit 525.

According to an embodiment, the first impedance matching circuit 520 may include a first block 615 for shifting a phase of an electrical signal applied to the third node 615-1 by a preset phase (e.g., 90 degrees). The first impedance matching circuit 520 may include a second block 625 for adjusting an impedance between an input node and an output node of the first impedance matching circuit 520 based on the electrical signal applied to the fourth node 625-1 connected to the first impedance matching circuit 520. The first impedance matching circuit 520 may include a node 635 connected to all of the blocks 615 and 615. The node 635 may match the second node 510-2 of the power division circuit 510.

According to an embodiment, each of the blocks 610 and 620 and the node 630 of the second impedance matching circuit 525 may be similar to the blocks 615 and 625 and the node 635 of the first impedance matching circuit 520. Hereinafter, a block of impedance matching circuits 520 and 525 may represent a group of at least one circuit element included in impedance matching circuits 520 and 525. Hereinafter, a block of impedance matching circuits 520 and 525 may be referred to as a part of impedance matching circuits 520 and 525. For example, the first block 610 of the second impedance matching circuit 525 may include one or more circuit elements for shifting the phase of the electrical signal applied to the first node 610-1 connected to the second impedance matching circuit 525 by the preset phase. For example, the second block 620 of the second impedance matching circuit 525 may include at least one circuit element for adjusting the impedance of the second impedance matching circuit 525 based on an electrical signal applied to the second node 620-1 connected to the second impedance matching circuit 525. The node 630 connected to the third node 510-3 of the power division circuit 510 may be electrically connected to both of the block 610 and the block 620 of the second impedance matching circuit 525.

According to an embodiment, the power division circuit 510 may selectively change the electrical connection between the nodes 510-1, 610-1, 615-1, 620-1, and 625-1 in the switch 515 based on the states related to the antennas (e.g., the first antenna 580 and the second antenna 585 of FIG. 5) connected to each of the second node 510-2 and the third node 510-3 of the power division circuit 510. For example, in a first state (or EPA state) in which all of the antennas are activated according to a preset phase, the power division circuit 510 may electrically connect the first node 510-1 and 625-1 to the nodes 610-1 and 615-1, among the nodes 610-1, 615-1, 620-1, connected to blocks 610 and 615 for performing phase transition according to a preset phase in each of the first impedance matching circuit 520 and the second impedance matching circuit 525. For example, the impedance of the blocks 610 and 615 may have a first impedance for satisfying an impedance matching condition in the first state. As the impedance of the blocks 610 and 615 has the first impedance, and the blocks 620 and 625 of each of the first impedance matching circuit 520 and the second impedance matching circuit 525 distinct from the blocks 610 and 615 are electrically opened, the impedance of the entire first impedance matching circuit 520 and the second impedance matching circuit 525 may be adjusted to the first impedance.

For example, in another state (e.g., the second state referred to as the ASDiv state, or the third state) that activates any one of the antennas unlike the first state, the power division circuit 510 may connect the first node 510-1 to all of nodes of the impedance matching circuit corresponding to the activated antenna among the nodes 610-1, 615-1, 620-1, and 625-1. For example, in a second state (or ASDiv state) that activates the second antenna, the power division circuit 510 may electrically connect the first node 510-1 to all of the nodes 610-1 and 620-1 connected to the second impedance matching circuit 525 connected to the second antenna. In this case, since all of the blocks 610 and 620 of the second impedance matching circuit 525 are activated by an electrical signal received from the first node 510-1, the impedance between the input node and the output node of the second impedance matching circuit 525 may have equivalent impedance of all blocks 610 and 620. For example, the impedance between the input node and the output node of the second impedance matching circuit 525 may be adjusted to a second impedance distinct from the first impedance of the first block 610 of the second impedance matching circuit 525.

For another example, since the first node 510-1 is electrically connected to all of the nodes 615-1 and 625-1 of the first impedance matching circuit 520 in the third state of activating the first antenna, the impedance of the first impedance matching circuit 520 may be adjusted to the second impedance distinct from the first impedance of the first block 615 of the first impedance matching circuit 520. Hereinafter, the second impedance may mean impedance of the preset impedance matching circuit for satisfy an impedance matching condition when a preset impedance matching circuit of the first impedance matching circuit 520 or the second impedance matching circuit 525 is selectively activated. For example, the second impedance may be referred to as $Z_0$. Hereinafter, the first impedance may mean impedance of each of the first impedance matching circuit 520 and the second impedance matching circuit 525 for satisfy the impedance matching condition when both the first impedance matching circuit 520 and the second impedance matching circuit 525 are activated. The first impedance may be referred to as $\sqrt{2}Z_0$ for performing power division of an electrical signal by the power division circuit 510 in which all of the first impedance matching circuit 520 and the second impedance matching circuit 525 are activated.

In an embodiment, impedance of the blocks 620 and 625 of the first impedance matching circuit 520 and the second impedance matching circuit 525 may have impedance required to satisfy an impedance matching condition, wherein the impedance matching condition is an impedance matching condition when the equivalent impedance (e.g., the second impedance) of the first impedance matching circuit 520 or the second impedance matching circuit 525 is selectively activated. An example in which the power division circuit 510 of FIG. 6A is implemented based on a lumped element will be described later with reference to FIGS. 7A to 7C.

Referring to FIG. 6B, an example of a power division circuit 510 according to an embodiment is illustrated. In an embodiment of FIG. 6B, the switch 515 included in the power division circuit 510 may include sub-switches 650 and 660 of a single pole double-throw (SPDT) type. For example, the first sub-switch 650 may selectively connect the first node 510-1 to nodes 610-1 and 615-1 connected to each of the first impedance matching circuit 520 and the second impedance matching circuit 525. For example, the second sub-switch 660 may selectively connect the ground node 640 to nodes 620-1 and 625-1 connected to each of the first impedance matching circuit 520 and the second impedance matching circuit 525.

Similar to the first block 615 of FIG. 6A, the first block 615 of the first impedance matching circuit 520 of FIG. 6B may include one or more circuit elements for shifting the phase of the electrical signal applied to the third node 615-1 by a preset phase (e.g., 90 degrees). Similar to the second block 625 of FIG. 6A, the second block 625 of the first impedance matching circuit 520 may include one or more circuit elements for adjusting the impedance of the first impedance matching circuit 520 to the second impedance that satisfies the impedance matching condition in a state that the first impedance matching circuit 520 is activated among the first impedance matching circuit 520 and the second impedance matching circuit 525. The blocks 615 and 625 of the first impedance matching circuit 520 may be connected to each other through a path 636. The path 631 in the second impedance matching circuit 525 and the blocks 610 and 620 connected to each other through the path 631 may be similar to the path 636 in the first impedance matching circuit 520 and the blocks 615 and 625.

According to an embodiment, the power division circuit 510 may selectively change the electrical connection within the sub-switches 650 and 660 based on the number and/or type of activated antennas among antennas connected to each of the second node 510-2 and the third node 510-3 of the power division circuit 510. For example, in the first state (or the EPA state), the power division circuit 510 may connect the first node 510-1 to all of the nodes 610-1 and 615-1 in the first sub-switch 650. In the first state, the power division circuit 5210 may electrically insulate all of the nodes 640, 620-1, and 625-1 included in the second sub-switch 660. As all of the nodes 640, 620-1, and 625-1 are electrically insulated, the blocks 620 and 625 connected to each of the nodes 620-1 and 625-1 may be electrically opened. Since the blocks 620 and 625 are electrically opened in the first state, each of the first impedance matching circuit 520 and the second impedance matching circuit 525 may have a first impedance that is impedance of blocks 610 and 615.

According to an embodiment, when switched to a state distinct from the first state (e.g., a second state referred to as an ASDiv state or a third state), the power division circuit 510 may connect nodes of the impedance matching circuit corresponding to the activated antenna to each of the first node 510-1 and the ground node 640. For example, in the third state of activating the first antenna, the power division circuit 510 electrically connects the first node 510-1 and the third node 615-1 connected to the first impedance matching circuit 520 within the first sub-switch 650, and electrically insulate the first node 510-1 and the first node 610-1 connected to the second impedance matching circuit 525. In the third state, within the second sub-switch 660, the power division circuit 510 may electrically connect the ground node 640 and the fourth node 625-1 and electrically insulate the ground node 640 and the second node 620-1. In the third state, as the current is applied to the second block 625 connected to the ground node 640, the impedance of the first impedance matching circuit 520 may be adjusted to a second impedance distinct from the first impedance of the first block 615 of the first impedance matching circuit 520. The second impedance may satisfy an impedance matching condition when only the first impedance matching circuit 520 is activated. An example in which the power division circuit 510 of FIG. 6B is implemented based on the lumped element will be described later with reference to FIGS. 8A to 8B.

Referring to FIG. 6C, another example of a power division circuit 510 according to an embodiment is illustrated. In an embodiment of FIG. 6C, the switch 515 included in the power division circuit 510 may be an SPDT type switch. In an embodiment of FIG. 6C, independently of the switch 515, the fourth node 625-1 of the first block 615 of the first impedance matching circuit 520 of the power division circuit 510 may be connected to the first node 510-1. As the fourth node 625-1 is connected to the first node 510-1 independently of the switch 515, the first impedance matching circuit 520 may continuously receive an electrical signal of the first node 510-1.

In an embodiment of FIG. 6C, similar to the first block 615 of FIGS. 6A to 6B, the first block 615 of the first impedance matching circuit 520 connected to the first node 510-1 of the power division circuit 510 through the fourth node 625-1 may shift the phase of the electrical signal applied to the first node 510-1 by a preset phase. Similar to the second block 625 of FIGS. 6A to 6B, in a state that an electrical signal is received through the third node 615-1 of the first impedance matching circuit 520, the second block 625 of the first impedance matching circuit 520 may change the impedance of the first impedance matching circuit 520 to the second impedance distinct from the first impedance of the first block 615. The blocks 615 and 625 of the first impedance matching circuit 520 may be connected to each other at a node 635 of the power division circuit 510. In an embodiment of FIG. 6C, the second node 510-2 of the power division circuit 510 may extend from the node 635 or may be connected to the node 635. The first block 610 of the second impedance matching circuit 525 may be similar to the first block 615 of the first impedance matching circuit 520.

According to an embodiment, the power division circuit 510 may form an electrical connection in the switch 515 based on whether to activate an antenna connected to the third node 510-3. For example, in the first state (or EPA state), since the antenna connected to the third node 510-3 is activated, the power division circuit 510 may electrically connect the first node 610-1 connected to the first node 510-1 and the second impedance matching circuit 525 in the switch 515. In the first state, the power division circuit 510 may electrically insulate the first node 510-1 and the third node 615-1 extended from the second block 625 of the first impedance matching circuit 525. As the first node 610-1 connected to the first node 510-1 and the second impedance matching circuit 525 is electrically connected, in the first block 610 of the second impedance matching circuit 525, the same phase transition as the phase transition occurring in the first block 615 of the first impedance matching circuit 520 may occur. In this case, the electrical signals output from the second node 510-2 and the third node 510-3 may have a phase shifted by the same phase (e.g., 90 degrees) compared with the electrical signal of the first node 510-1.

When switching to a third state distinct from the first state, the power division circuit 510 may electrically insulate the first node 510-1 and the node 610-1 connected to the second impedance matching circuit 525. In the third state, the power division circuit 510 may electrically connect the first node 510-1 and the third node 615-1 connected to the first impedance matching circuit 520. Since the second block 625 is activated by an electrical signal transmitted from the first node 510-1 as the first node 510-1 and the third node 615-1 are electrically connected, the impedance between the input node and the output node of the first impedance matching circuit 520 may be adjusted to the second impedance. As the impedance between the input node and the output node of the first impedance matching circuit 520 is adjusted to the second impedance, impedance matching may be performed by the power division circuit 510. As the switch 515 of the power division circuit 510 forms the above-described electrical connection, impedance matching of the power division circuit 510 may be maintained despite switching between states distinguished according to activation of antennas. An example in which the power division circuit 510 of FIG. 6C is implemented based on a lumped element will be described later with reference to FIGS. 9A to 9B.

FIGS. 7A, 7B, 7C, and 7D are circuit diagrams of a power division circuit of FIG. 6A according to an embodiment. The electronic devices of FIGS. 7A, 7B, 7C, and 7D may be an example of the electronic device 101 of FIGS. 1 and 5. The power division circuit 510 of FIGS. 7A, 7B, 7C, and 7D may be an example of the power division circuit 510 of FIGS. 5 and/or 6A. Components commonly illustrated in at least two drawing of FIGS. 6A, and 7A to 7D may have the same reference numerals.

Figure 7A:
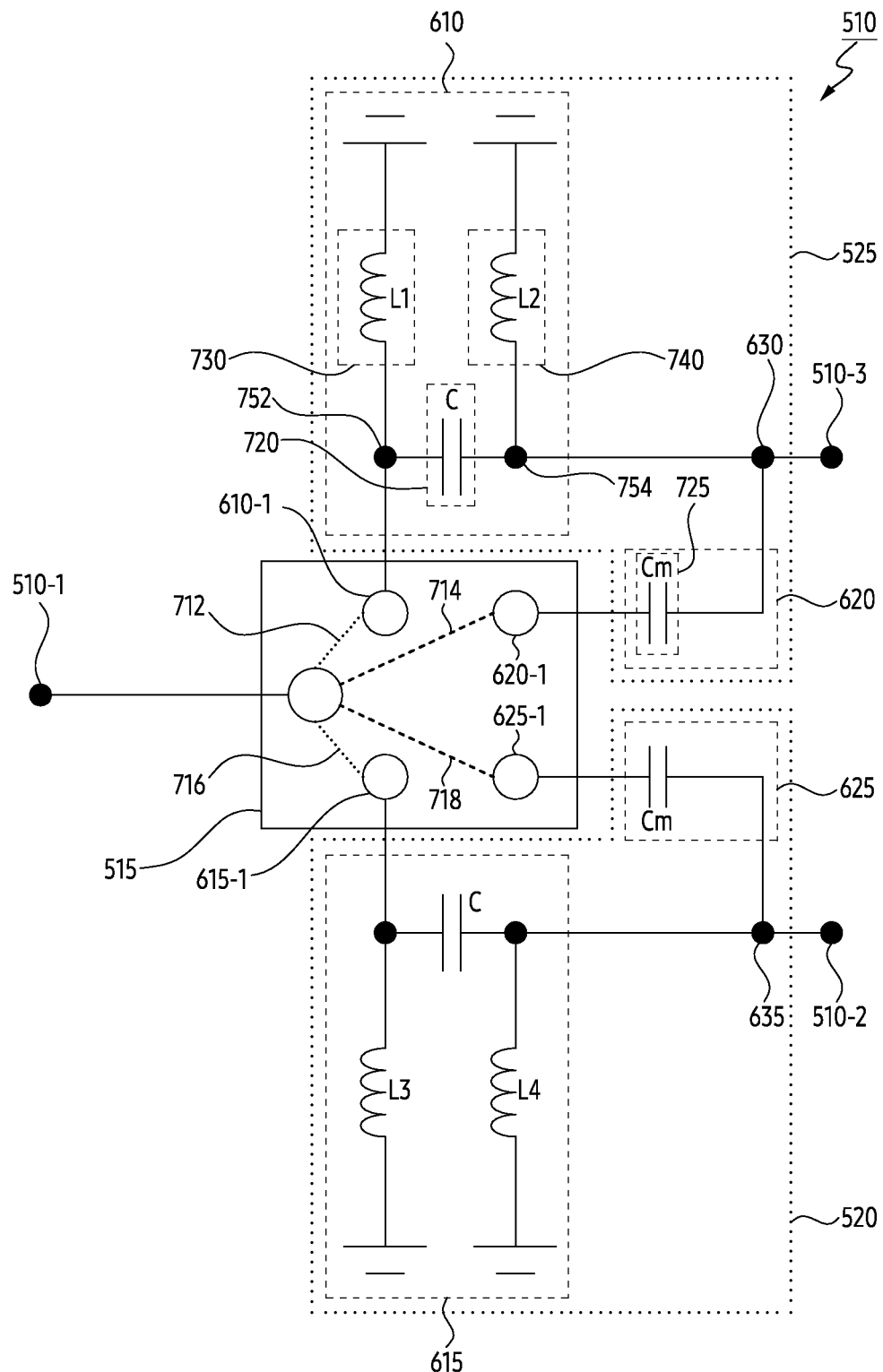
FIGS. 7A, 7B, 7C, and 7D are exemplary circuit diagrams of the power division circuit of FIG. 6A.

Referring to an embodiment of FIG. 7A, blocks 610 and 615 of the power division circuit 510 may have a topology based on a high-band pass filter.

For example, in the first block 610 of the second impedance matching circuit 525, the power division circuit 510 may include a capacitor 720 and inductors 730 and 740 connected in an π shape. Referring to FIG. 7A, one end of the inductor 730 may be connected to one end 752 of the capacitor 720. The other end of the inductor 730 may be grounded. In an embodiment of FIG. 7A, one end 752 of the capacitor 720 may be electrically connected to the first node 610-1 included in the switch 515. Referring to FIG. 7A, one end of the inductor 740 may be connected to the other end 754 of the capacitor 720. The other end of the inductor 740 may be grounded. In an embodiment of FIG. 7A, the other end 754 of the capacitor 720 may match the node 630 of the second impedance matching circuit 525 and/or the third node 510-3 of the power division circuit 510.

Referring to FIG. 7A, an embodiment of the power division circuit 510 including two inductors 730 and 740 connected in parallel based on the π shape is illustrated, but the embodiment is not limited thereto. For example, in the first block 610 of the second impedance matching circuit 525, two or more inductors may be connected in parallel. Inductors and/or capacitors included in blocks 610 and 615 may be implemented in different numbers according to embodiments based on losses of the inductors and capacitors.

In an embodiment, in a state that the blocks 620 and 625 activated, the blocks 620 and 625 of the power division circuit 510 may include a lumped element for adjusting impedance of impedance matching circuits including blocks 620 and 625, respectively. Referring to FIG. 7A, the second block 620 of the second impedance matching circuit 525 may include a capacitor including one end connected to the second node 620-1 included in the switch 515 and the other end connected to the node 630. Referring to FIG. 7A, a structure of the first impedance matching circuit 520 may be similar to the structure of the above-described second impedance matching circuit 525. Among descriptions of the structure of the first impedance matching circuit 520, descriptions overlapping the structure of the second impedance matching circuit 525 will be omitted.

In an embodiment of FIG. 7A, in which the blocks 610 and 615 of the power division circuit 510 are high-band pass filters, when the blocking frequency of the high-band pass filter is $\omega_0$, the impedance of each of the blocks 610 and 615 is Z, and the change in phase in the blocks 610 and 615 is $\phi$, capacitors (e.g., capacitors 720) and inductors (e.g., inductors 730 and 740) included in blocks 610 and 615, may have capacitance C and inductance L of Equation 1.

$$C = \frac{1}{\omega_0 Z \sin|\phi|}$$ Equation 1

-continued
$$L = \frac{Z}{\omega_0 \tan\left|\frac{\phi}{2}\right|}$$

Referring to FIG. 7A, when the inductances are symmetrical in the circuit diagram of FIG. 7A (e.g., when L1=L3 and L2=L4) with respect to the inductances L1, L2, L3, and L4 of the inductances included in the blocks 610, 615, 620, and 625 of the power division circuit 510, a ratio of power of power signals divided into each of the second node 510-2 and the third node 510-3 in the power division circuit 510 may be 1:1. In an embodiment where the power division circuit 510 is designed to operate in a frequency band between 600 MHz and 1 GHz, perform phase transition based on 90°, and divide power based on a ratio of 1:1, the inductance L of Equation 1 may be set in a range between about 5.6 nH and about 27 nH (e.g., 22 nH), and the capacitance C of Equation 1 may be set in a range between about 1.5 pF and about 5.6 pF (e.g., 3.3 pF).

Hereinafter, an embodiment in which the inductances L1, L2, L3, and L4 correspond to the inductance L of Equation 1 will be described.

As described above in FIG. 6A, since the impedance of the blocks 610 and 615 is the first impedance $\sqrt{2}Z_0$, and the phase change in the blocks 610 and 615 is 90 degrees, capacitors (e.g., capacitors 720) and inductors (e.g., inductors 730 and 740) included in blocks 610 and 615, may have capacitance C and inductance L of Equation 2.

$$C = \frac{1}{\sqrt{2}\,\omega_0 Z_0}$$ Equation 2
$$L = \frac{\sqrt{2}\,Z}{\omega_0}$$

As described above in FIG. 6A, according to an embodiment, in a first state (or an EPA state) in which all of the antennas (e.g., the first antenna 580 and the second antenna 585 of FIG. 5) connected to the second node 510-2 and the third node 510-3 are activated, the power division circuit 510 may activate an electrical connection 712 between the first node 510-1 connected to the second impedance matching circuit 525 and the first node 610-1 and an electrical connection 716 between the first node 510-1 and the third node 615-1. In the first state, the power division circuit 510 may deactivate an electrical connection 714 between the first node 510-1 and the second node 620-1 and an electrical connection 718 between the first node 510-1 and the fourth node 625-1. Referring to FIG. 7A, since blocks 610 and 615 which are high-band pass filters of the first impedance matching circuit 520 and the second impedance matching circuit 525 are selectively activated by the activated electrical connections 712 and 716, both impedance of the first impedance matching circuit 520 and the second impedance matching circuit 525 may be adjusted to the first impedance $\sqrt{2}Z_0$, and a phase transition by 90 degrees may be performed in both the first impedance matching circuit 520 and the second impedance matching circuit 525.

According to an embodiment, in a state different from the first state, as described above in FIG. 6A, the power division circuit 510 may adjust the electrical connections 712, 714, 716, and 718 differently from the first state. For example, in a second state in which an antenna connected to the third node 510-3 is activated, the power division circuit 510 may deactivate the electrical connections 716, 718 and activate all of the electrical connections 712 and 714 related to the nodes 610-1 and 620-1 of the second impedance matching circuit 525 connected to the third node 510-3. As all of the electrical connections 712 and 714 are activated, a capacitor 725 included in the second block 620 of the second impedance matching circuit 525 and having a capacitance Cm may be further activated. In this case, as capacitors of the capacitor 720 and the second block 620 are connected in parallel, Equation 3 may be established with respect to a cut-off frequency $\omega_0$ of the second impedance matching circuit 525 including blocks 610 and 620, a phase change $\phi_1$, and an impedance Z.

$$C + Cm = \frac{1}{\omega_0 Z \sin|\phi_1|} \qquad \text{Equation 3}$$

$$L = \frac{Z}{\omega_0 \tan\left|\frac{\phi_1}{2}\right|}$$

In the second state, the impedance of the second impedance matching circuit 525 is adjusted to the second impedance Z0, and L of Equation 3 is the inductance of the inductors 730 and 740, and thus is the same as $$L = \frac{\sqrt{2}Z}{\omega_0}.$$

Therefore, from the equivalent relationship between L of Equation 3 and L of Equation 2, $$\tan\left|\frac{\phi_1}{2}\right| = \frac{1}{\sqrt{2}}$$

may be established. C+Cm of Equation 3 may be established as Equation 4 from the relationship of $$\tan\left|\frac{\phi_1}{2}\right| = \frac{1}{\sqrt{2}}, \sin|\phi_1| = 2\sin\left|\frac{\phi_1}{2}\right|\cos\left|\frac{\phi_1}{2}\right| \text{ and } C = \frac{1}{\sqrt{2}\omega_0 Z_0}$$

of Equation 2.

$$C + Cm = \frac{1}{\omega_0 Z_0 \sin|\phi_1|} = \frac{1}{2\omega_0 Z_0 \sin\left|\frac{\phi_1}{2}\right|\cos\left|\frac{\phi_1}{2}\right|} = \qquad \text{Equation 4}$$

$$\frac{1}{2\omega_0 Z_0 \left(\frac{1}{\sqrt{3}}\right)\left(\frac{\sqrt{2}}{\sqrt{3}}\right)} = \frac{3}{2}\frac{1}{\sqrt{2}\omega_0 Z_0} = C + \frac{C}{2}$$

Referring to Equation 4, when the capacitance Cm of the capacitor included in the second block 620 of the second impedance matching circuit 525 becomes half (C/2) of the capacitance C of the capacitor 720, the impedance of the second impedance matching circuit 525 may satisfy the impedance matching condition in the second state. In the first impedance matching circuit 520, similar to that described above based on the second impedance matching circuit 525, the capacitance of the capacitor included in the second block 625 of the first impedance matching circuit 520 may be half of the capacitance of the capacitor included in the first block 615 of the first impedance matching circuit 520. As the second block 620 of the second impedance matching circuit 525 is additionally activated, a phase transition of about 70 degrees may occur in the second impedance matching circuit 525.

Figure 7B:
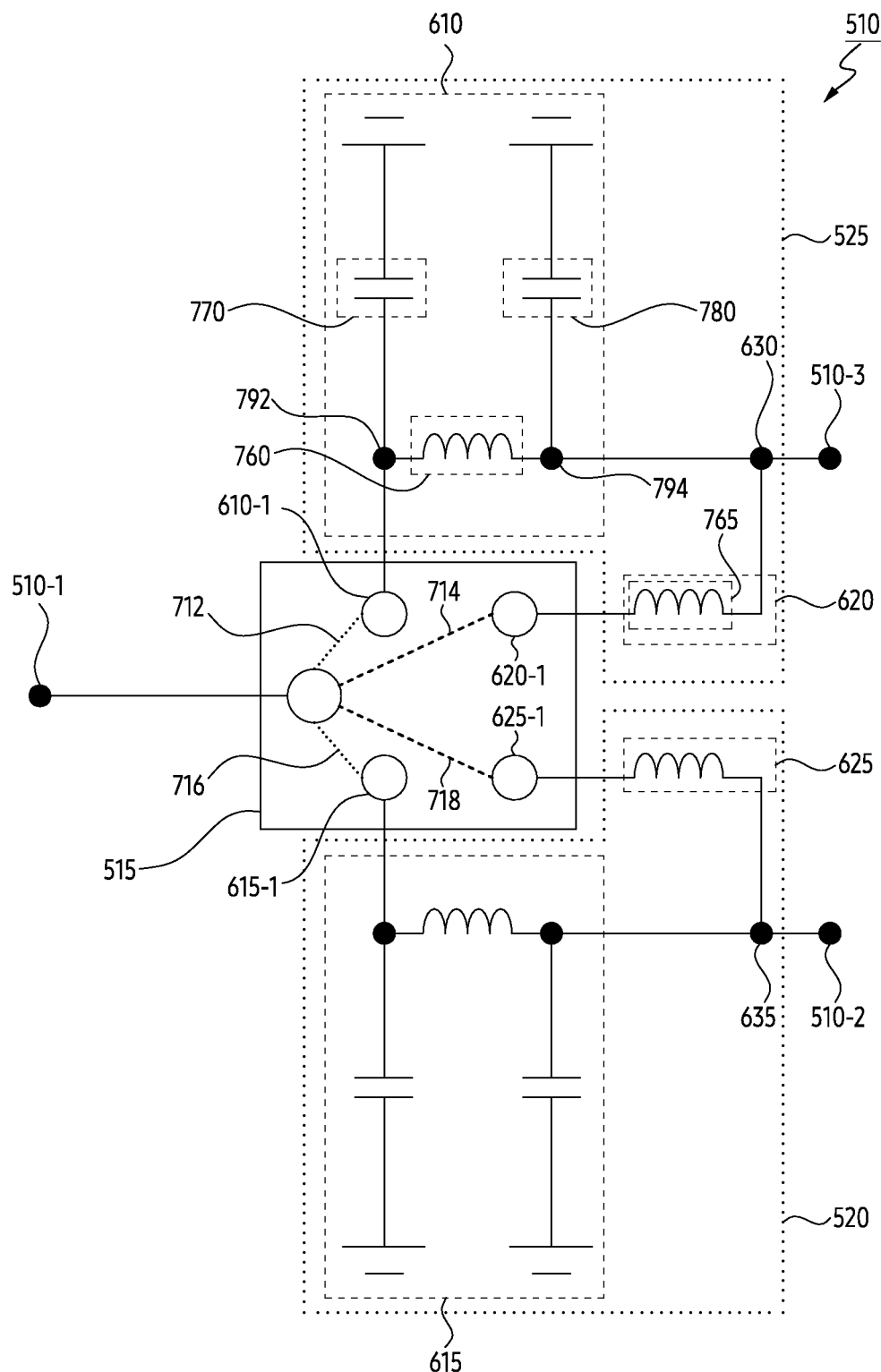

Referring to an embodiment of FIG. 7B, the blocks 610 and 615 of the power division circuit 510 may have a topology based on a low-band pass filter. For example, in the first block 610 of the second impedance matching circuit 525, the power division circuit 510 may include an inductor 760 and capacitors 770, 780. Referring to FIG. 7B, at a node 792 of the first block 610 extending toward the switch 515 and matching the first node 610-1 connected to the second impedance matching circuit 525, one end of the inductor 760 and one end of the capacitor 770 may be connected. The other end of the capacitor 770 may be grounded. At the node 794 of the first block 610 matching the third node 510-3 of the power division circuit 510, the other end of the inductor 760 and one end of the capacitor 780 may be connected. The other end of the capacitor 780 may be grounded.

In an embodiment in which blocks 610 and 615 have a topology based on a low-band pass filter, blocks 620 and 625 of the power division circuit 510 may include an inductor 765 for adjusting impedance of a corresponding impedance matching circuit. Referring to FIG. 7B, a structure of the first impedance matching circuit 520 may be similar to a structure of the above-described second impedance matching circuit 525. In an embodiment of FIG. 7B, similar to an embodiment of FIG. 7A, the power division circuit 510 may control electrical connections 712, 714, 716, and 718 based on distinct states that activate the antennas.

In an embodiment of FIG. 7B, when the cut-off frequency of the low-band pass filter is $\omega 0$, the impedance of the first block 610 is Z, and the phase change in the first block 610 is $\phi$, The capacitance $$C = \frac{\tan\left|\frac{\phi}{2}\right|}{\omega_0 Z}$$

of the capacitor 760 may be satisfied, and the inductance $$L = \frac{Z\sin|\phi|}{\omega_0}$$

of the inductors 770. Since the impedance of the first block 610 has the first impedance $\sqrt{2}Z_0$ and a phase transition of about 90 degrees occurs in the first block 610, the capacitance C and the inductance L may satisfy Equation 2. As the inductor of the second block 620 is activated in a second state in which the second impedance matching circuit 525 is selectively activated, an inductor of the second block 620 and an inductor 760 may be connected in parallel in the second impedance matching circuit 525. In this case, similar to those described in Equations 3 to 4, the equivalent impedance of the activated blocks 610 and 620 may have a second impedance Z0 only when the inductance Lm of the second block 620 is twice the inductance of the inductors 770, 780 (i.e., Lm=2L). As the second block 620 is additionally activated, a phase transition of 70 degrees may occur in the second impedance matching circuit 525. In the first impedance matching circuit 520, similar to that described above based on the second impedance matching circuit 525, the inductance of the inductor included in the second block 625 may also be twice the inductance of the inductor included in the first block 615.

Figure 7C:
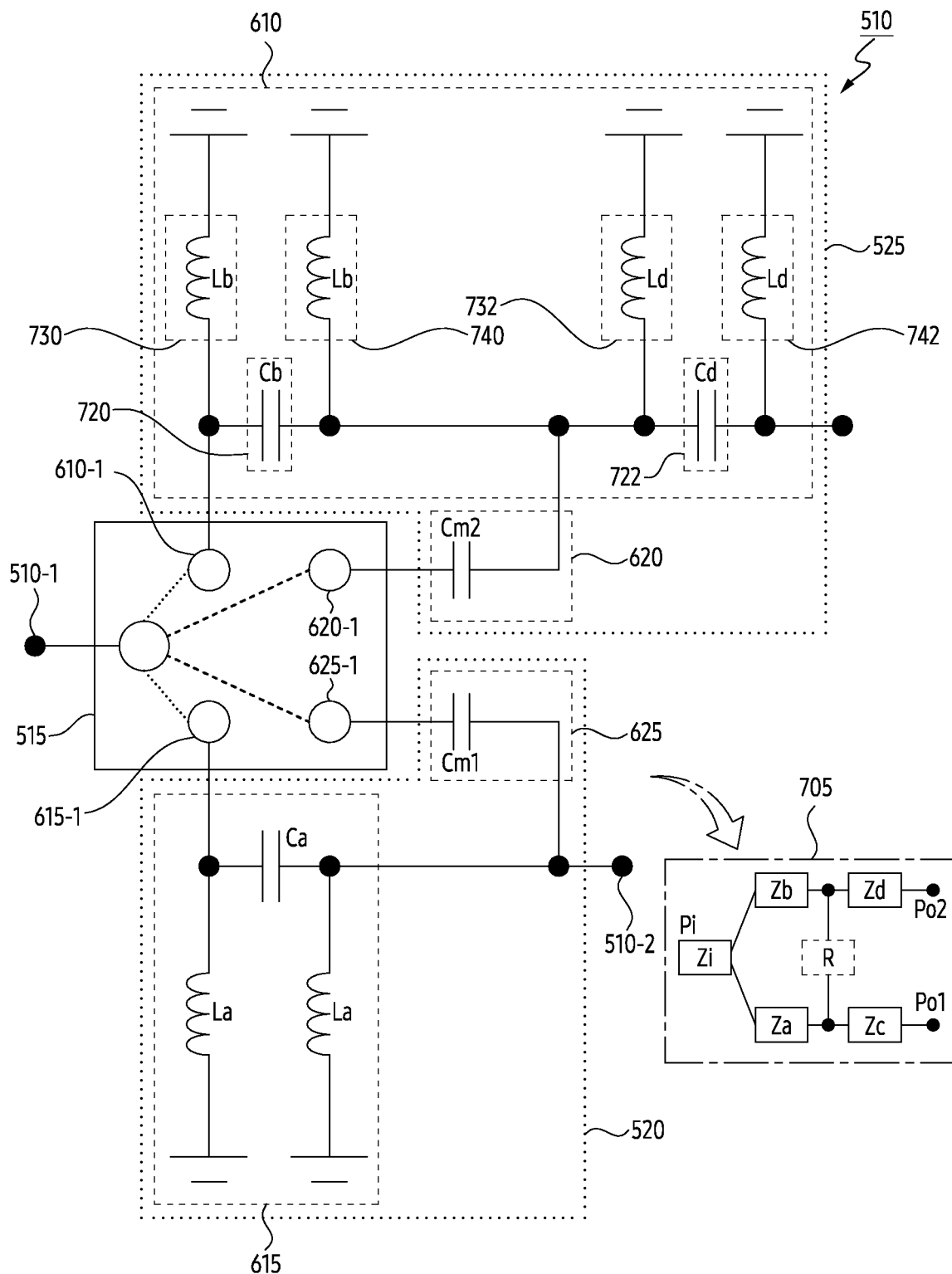

Referring to an embodiment of FIG. 7C, according to an embodiment, the second impedance matching circuit 525 of the power division circuit 510 may further include inductors 732 and 742 connected in a π shape and a capacitor 722. The inductors 740 and 732 may be merged into a single inductor according to an embodiment.

Referring to FIG. 7C, an equivalent circuit 705 of the power division circuit 510 according to an embodiment is illustrated. Referring to the equivalent circuit 705, according to an embodiment, the power division circuit 510 may have a structure based on the Wilkinson power divider. The impedance Za of the equivalent circuit 705 may represent an equivalent impedance of the capacitor Ca and the inductors La connected in a t shape in the first impedance matching circuit 520 of the power division circuit 510. The impedance Zb of the equivalent circuit 705 may represent the equivalent impedance of the capacitor Cb and the inductors Lb connected in the π shape in the second impedance matching circuit 525 of the power division circuit 510. The impedance Zd of the equivalent circuit 705 may represent the equivalent impedance of the capacitor Cd and the inductors Ld connected in the π shape in the second impedance matching circuit 525 of the power division circuit 510. A circuit element in the power division circuit 510 corresponding to the impedance Zc of the equivalent circuit 705 may be omitted according to an impedance matching condition of 50Ω when power is divided at a ratio of 1:N to each of the second node 510-2 and the third node 510-3. The resistance R of the equivalent circuit 705 is for isolation between the outputs Po1 and Po2 of the Wilkinson power divider and may be omitted in the power division circuit 510.

In the equivalent circuit 705, each of the impedance Za, Zb, Zc, and Zd may be set as illustrated in Table 1, based on the impedance matching condition in the Wilkinson power divider when the ratio between the outputs Po1 and Po2 is 1:N.

TABLE 1

| Impedance | Value |
| --- | --- |
| Za | (Select according to design) |
| Zb | N × Za |
| Zc | $\dfrac{Za}{\sqrt{1+\dfrac{1}{N}}}$ |
| Zd | $\dfrac{Za}{\sqrt{\dfrac{1+\dfrac{1}{N}}{N}}}$ |

Referring to Table 1, impedance Za, Zb, Zc, or Zd in the equivalent circuit 705 may be dependent on each other to satisfy an impedance matching condition. It is assumed that the power division circuit 510 corresponding to the equivalent circuit 705 divides power at a ratio of 1:2 to each of the second node 510-2 and the third node 510-3. In this case, it may be N=2 in Table 1. Meanwhile, when the impedance Zc of the equivalent circuit 705 applies a condition (Zc=50Ω) for being omitted in the power division circuit 510, Za=61.2Ω, Zb=122.4Ω, and Zd=70.7Ω may be obtained from Table 1. Based on the obtained impedance Za to Zd, the inductances La, Lb, Ld and the capacitors Ca, Cb, Cd, Cm1, and Cm2 of FIG. 7C may be set as illustrated in Table 2.

TABLE 2

| Time constant | Value |
| --- | --- |
| Ca | 3.9 pF |
| La | 15 nH |
| Cb | 2.2 pF |
| Lb | 27 nH |
| Cd | 3.3 pF |
| Ld | 18 nH |
| Cm1 | 3.3 pF |
| Cm2 | 2.7 pF |

Figure 7D:
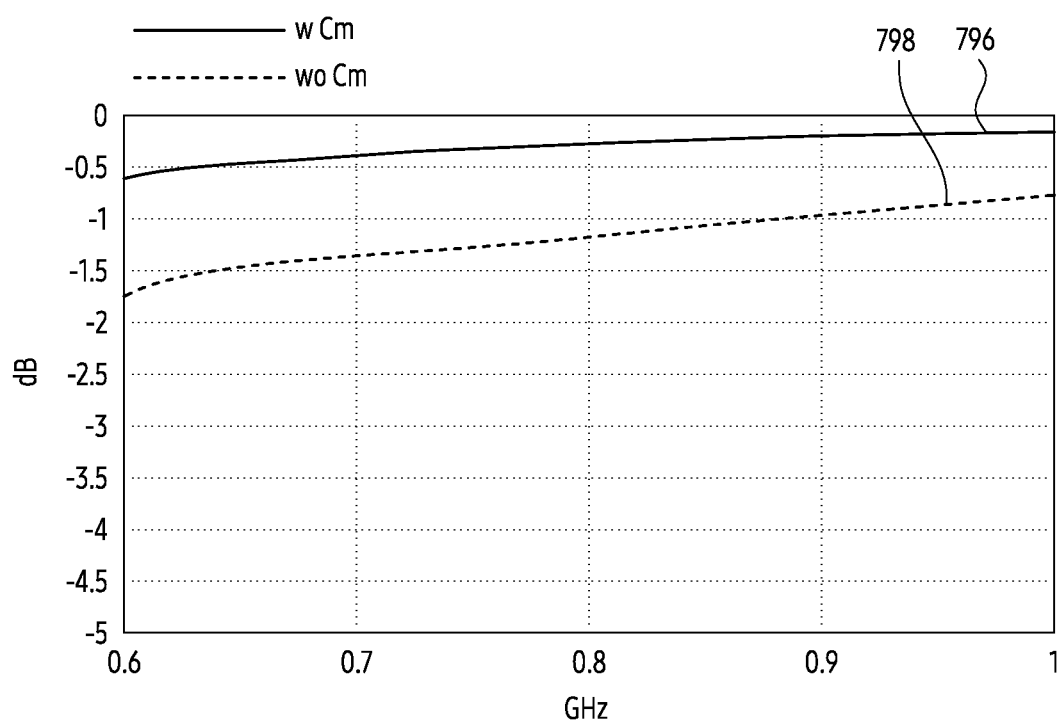

FIG. 7D is graphs 796, 798 illustrating losses (e.g., s-parameters) caused by the adjustment of impedance by the power division circuit 510 of FIG. 7C. Graph 798 illustrate an s-parameter in a frequency domain when the electronic device including the power division circuit 510 of FIG. 7C activates only the first block 610 of the blocks 610 and 620 of the second impedance matching circuit 525, in a state in which an antenna corresponding to the second impedance matching circuit 525 among antennas corresponding to each of the first impedance matching circuit 520 and the second impedance matching circuit 525 is selectively activated. Graph 796 illustrates an s-parameter in a frequency domain when the electronic device including the power division circuit 510 of FIG. 7C activates both of the blocks 610 and 620 of the second impedance matching circuit 525, in the state in which the antenna corresponding to the second impedance matching circuit 525 is selectively activated. Comparing the graphs 796 and 798, the s-parameter may be improved as the second block 620 of FIG. 7C is additionally activated throughout the frequency domain.

As described above, as the power division circuit 510 according to an embodiment is implemented based on a lumped element, such as an inductor or a capacitor, the power division circuit 510 may be simplified. According to an embodiment, the power division circuit 510 may adjust the electrical connections 712, 714, 716, and 718 using the switch 515, thereby performing impedance matching based on the active states of the antennas. As impedance matching based on the active states of the antennas is performed, the electronic device including the power division circuit 510 may selectively activate at least one of the antennas based on the posture of the electronic device (e.g., the posture of the electronic device having a foldable form factor described below), and/or one or more external objects (e.g., a part of the body, such as the hand that grips the electronic device or the ear that is in contact with the electronic device). While selectively activating at least one of the antennas, the electronic device may perform impedance matching based on at least one selectively activated antenna using the power division circuit 510. As the impedance matching is performed, the electronic device may improve insertion loss of at least one selectively activated antenna, radiation efficiency, and/or transmission performance.

Figure 8A:
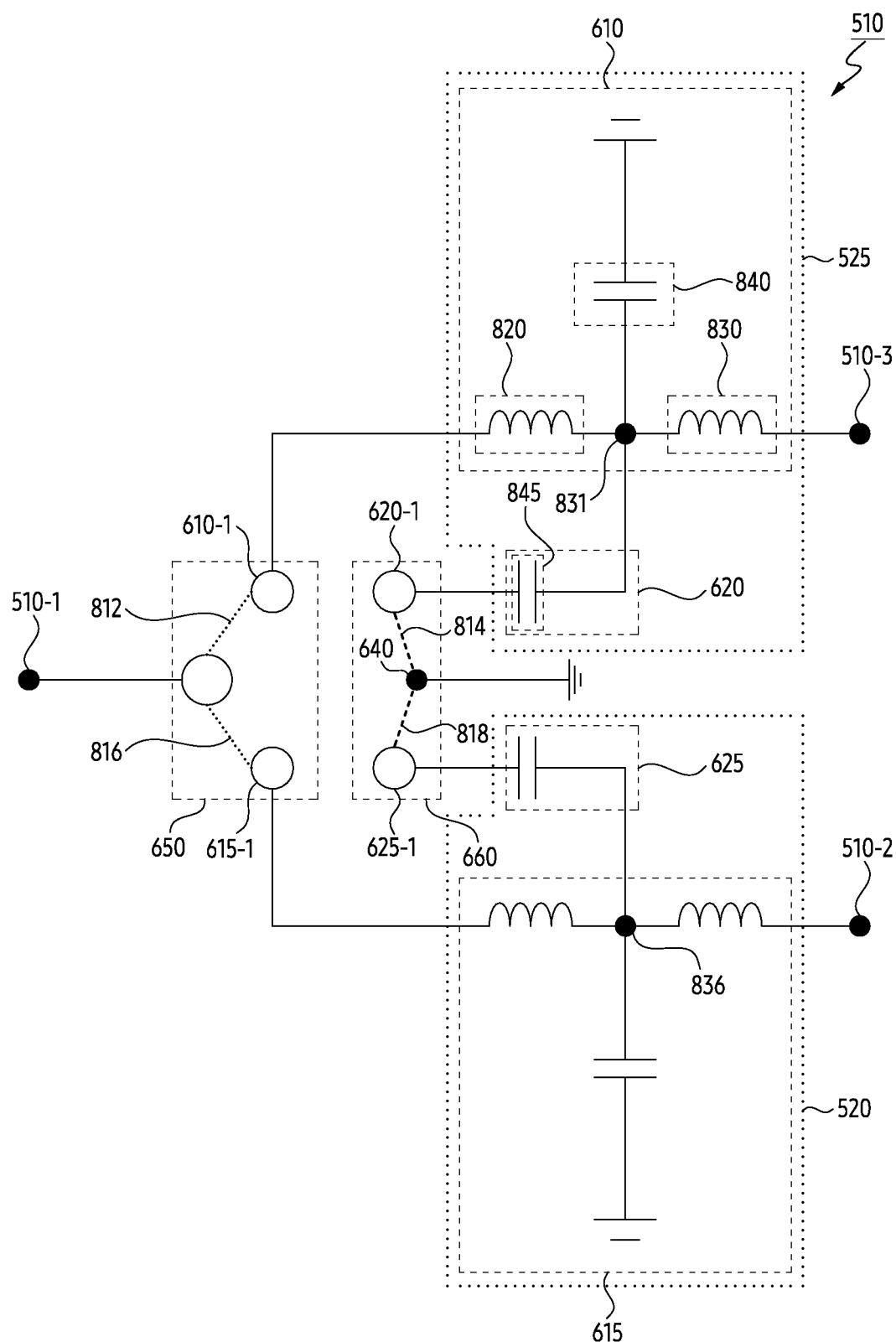
FIGS. 8A and 8B are exemplary circuit diagrams of the power division circuit of FIG. 6B.
Figure 8B:
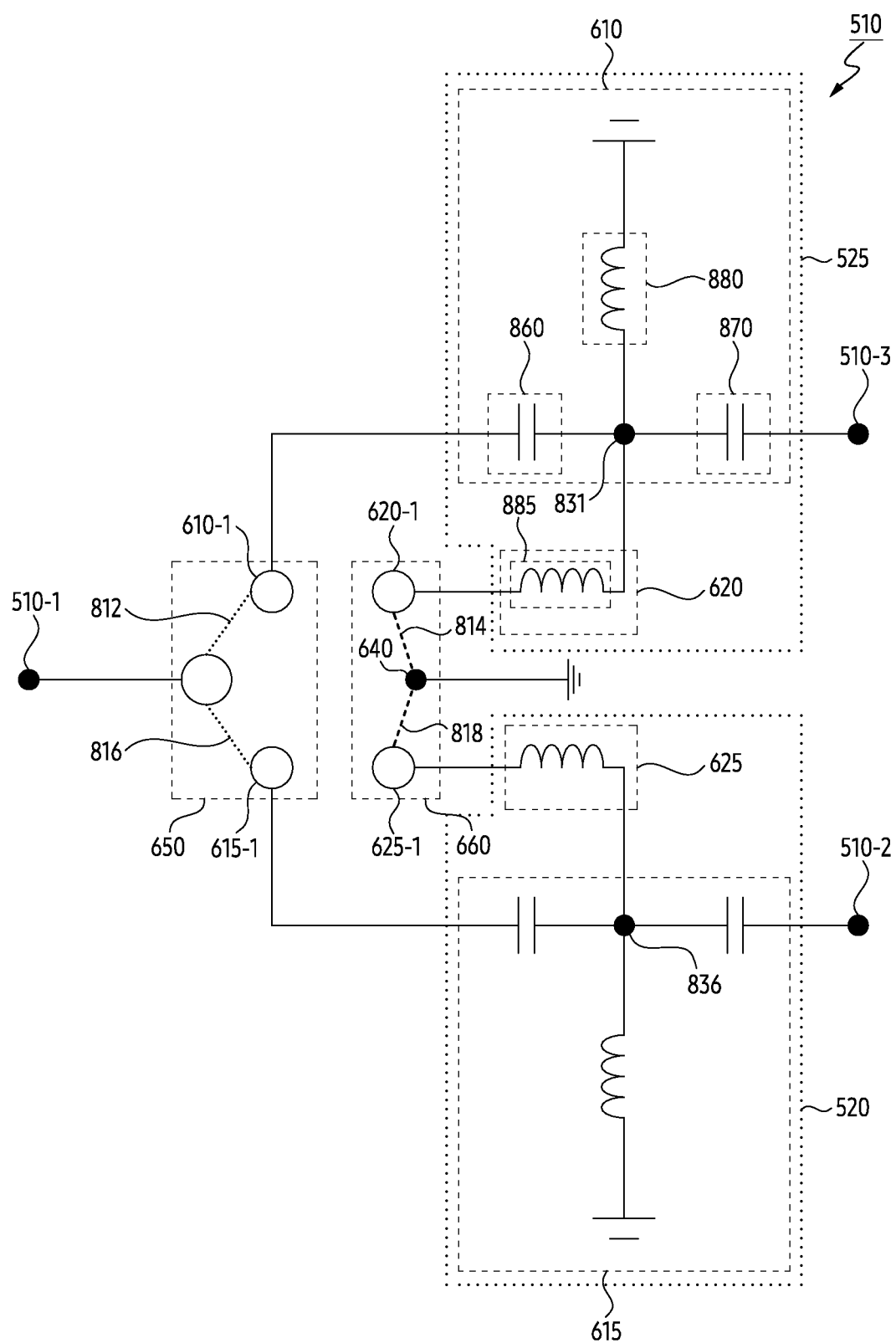

FIGS. 8A and 8B are circuit diagrams of the power division circuit 510 of FIG. 6B according to an embodiment. The electronic device of FIGS. 8A and 8B may be an example of the electronic device 101 of FIGS. 1 and 5. The power division circuit 510 of FIGS. 8A and 8B may be an example of the power division circuit 510 of FIGS. 5 and/or 6B. Components commonly illustrated in at least two drawings of FIGS. 6B, 8A, and 8B may have the same reference numerals.

Referring to an embodiment of FIG. 8A, blocks 610 and 615 of the power division circuit 510 may have a topology based on a low-band pass filter. For example, in the first block 610 of the second impedance matching circuit 525, the power division circuit 510 may include a capacitor 840 and inductors 820 and 830 connected in a Y shape. Referring to FIG. 8A, in the node 831 of the first block 610, one end of the capacitor 840, one end of the inductor 820 and one end of the inductor 830 may be connected. The node 831 may be at least a part of the path 631 of FIG. 6B. The other end of the capacitor 840 may be grounded. The other end of the inductor 830 may be connected to the third node 510-3 of the power division circuit 510. The other end of the inductor 820 may be connected to the first node 610-1 extending toward the first sub-switch 650.

As described in FIG. 6B, the blocks 610 and 620 of the second impedance matching circuit 525 may be connected to each other through a path 631. The second block 620 may include a capacitor 845 including one end connected to the second node 620-1 extending toward the second sub-switch 660 and the other end connected to the node 635. Referring to FIG. 8A, a structure of the first impedance matching circuit 520 may be similar to a structure of the above-described second impedance matching circuit 525. Among descriptions of the structure of the first impedance matching circuit 520, descriptions overlapping the structure of the second impedance matching circuit 525 will be omitted.

According to an embodiment, as described above in FIG. 6B, in the first state (or EPA state), the power division circuit 510 may activate an electrical connection 812 between the first node 510-1 and the first node 610-1 connected to the second impedance matching circuit 525 and an electrical connection 816 between the first node 510-1 and the third node 615-1. In the first state, the power division circuit 510 may deactivate an electrical connection 814 between the second node 620-1 and the ground node 640 and an electrical connection 818 between the fourth node 625-1 and the ground node 640. In this case, as blocks 610 and 615 are selectively activated among blocks 610, 615, 620, and 625 of the first impedance matching circuit 520 and the second impedance matching circuit 525, both impedance of the first impedance matching circuit 520 and the second impedance matching circuit 525 may be adjusted to the first impedance $\sqrt{2}Z_0$, and in an electrical signal transmitted from the first node 510-1 to each of the nodes 510-2 and 510-3, a phase transition of 90 degrees may occur in common.

In an embodiment of FIG. 8A, when the cut-off frequency of the low-band pass filter is $\omega_0$, the impedance of the first block 610 is Z, and the phase change in the first block 610 is $\phi$, the capacitance $$C = \frac{\sin|\phi|}{\omega_0 Z}$$

of the capacitor 840 may be satisfied, and the inductance $$L = \frac{Z\tan\left|\frac{\phi}{2}\right|}{\omega_0}$$

of the inductors 820 and 830 may be satisfied. Since the impedance of the first block 610 has the first impedance $\sqrt{2}Z_0$, and a phase transition of 90 degrees occurs in the first block 610, the capacitance C and inductance L described above may satisfy Equation 2.

In another state distinguished from the first state, as described in FIG. 6B, the power division circuit 510 may selectively activate electrical connections related to an impedance matching circuit corresponding to a specific antenna activated in another state among electrical connections 812, 814, 816, and 818. For example, in a second state in which an antenna connected to the third node 510-3 is activated, the power division circuit 510 may activate electrical connections 812 and 814 related to the second impedance matching circuit 525 and may deactivate other electrical connections 816 and 818 among the electrical connections 812, 814, 816, and 818. In this case, as the capacitor of the second block 620 is connected to the node 635 and the ground node 640, the impedance of the second impedance matching circuit 525 may be adjusted by the capacitor of the second block 620 having the capacitance $C_m$. In this case, referring to the above in Equations 3 to 4, when the capacitance $C_m$ is ⅓ of the capacitance of the capacitor 840 (i.e., $C_m = C/3$), the equivalent impedance of the activated blocks 610 and 620 may have the second impedance Z0. As the second block 620 is additionally activated, a phase transition of 70 degrees may occur in the second impedance matching circuit 525. In the first impedance matching circuit 520, similar to the above description based on the second impedance matching circuit 525, the capacitance of the capacitor included in the second block 625 may also be ⅓ of the capacitance of the capacitor included in the first block 615.

Referring to an embodiment of FIG. 8B, blocks 610 and 615 of the power division circuit 510 may have a topology based on a high-band pass filter. For example, in the first block 610 of the second impedance matching circuit 525, the power division circuit 510 may include an inductor 880 and capacitors 860 and 870. In the node 831 of the first block 610, one end of the inductor 880, one end of the capacitor 860, and one end of the capacitor 870 may be connected. The other end of the inductor 880 may be grounded. The other end of the capacitor 860 may be connected to the first node 610-1 extending toward the first sub-switch 650 of the power division circuit 510. The other end of the capacitor 870 may be connected to the third node 510-3 of the power division circuit 510. The second block 620 connected through the node 831 may include an inductor including one end connected to the node 831 and the other end connected to the second node 620-1 extending toward the second sub-switch 660. The structure of the first impedance matching circuit 520 of FIG. 8B may be similar to the structure of the above-described second impedance matching circuit 525. In an embodiment of FIG. 8B, similar to an embodiment of FIG. 8A, the power division circuit 510 may control electrical connections 812, 814, 816, and 818 based on distinct states for activating antennas.

In an embodiment of FIG. 8B, when the cutoff frequency of the low-band pass filter is $\omega 0$, the impedance of the first block 610 is Z, and the phase change in the first block 610 is $\phi$, Capacitance $$C = \frac{1}{\omega_0 Z \tan\left|\frac{\phi}{2}\right|}$$

of the capacitors 860 and 870 may be satisfied, and inductance $$C = \frac{1}{\omega_0 Z \tan\left|\frac{\phi}{2}\right|}$$

of the inductors 880 may be satisfied. Since the impedance of the first block 610 has the first impedance $\sqrt{2}Z_0$ and a phase transition of 90 degrees occurs in the first block 610, the capacitance C and the inductance L may satisfy Equation 2. In the second state in which the second impedance matching circuit 525 is selectively activated, as the inductor of the second block 620 is activated, unlike the first state, the inductor of the first block 610 may be additionally connected to the node 831. In this case, similar to those described in Equations 3 to 4, only when the inductance Lm of the inductor of the second block 620 is three times the inductance of the inductor 880 (i.e., $L_m=3L$), the equivalent impedance of the activated blocks 610 and 620 may have the second impedance Z0. As the second block 620 is additionally activated, a phase transition of 70 degrees may occur in the second impedance matching circuit 525. In the first impedance matching circuit 520, similar to that described above based on the second impedance matching circuit 525, the inductance of the inductor included in the second block 625 may also be three times the inductance of the inductor included in the first block 615.

Figure 9A:
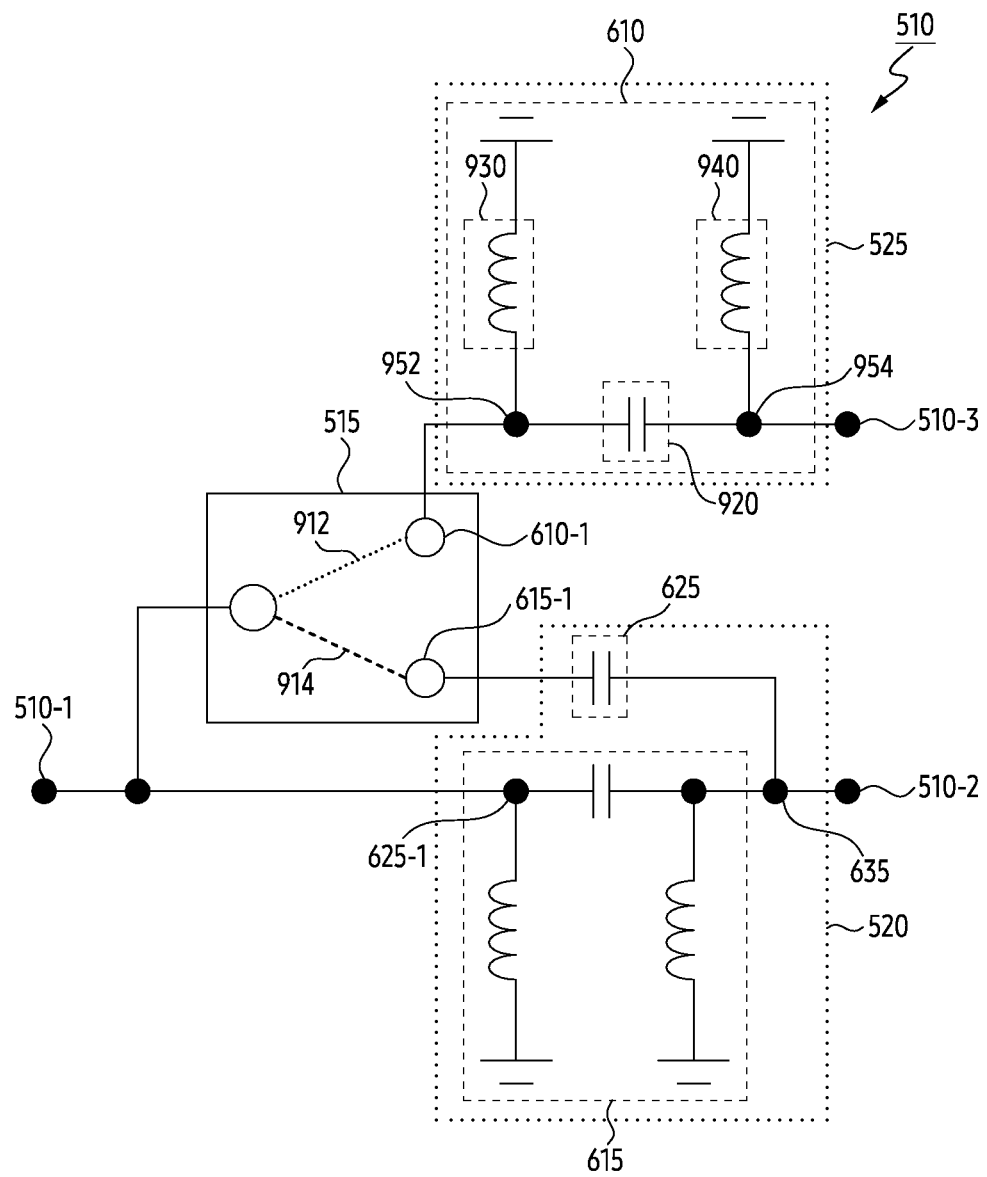
FIGS. 9A and 9B are exemplary circuit diagrams of the power division circuit of FIG. 6C.
Figure 9B:
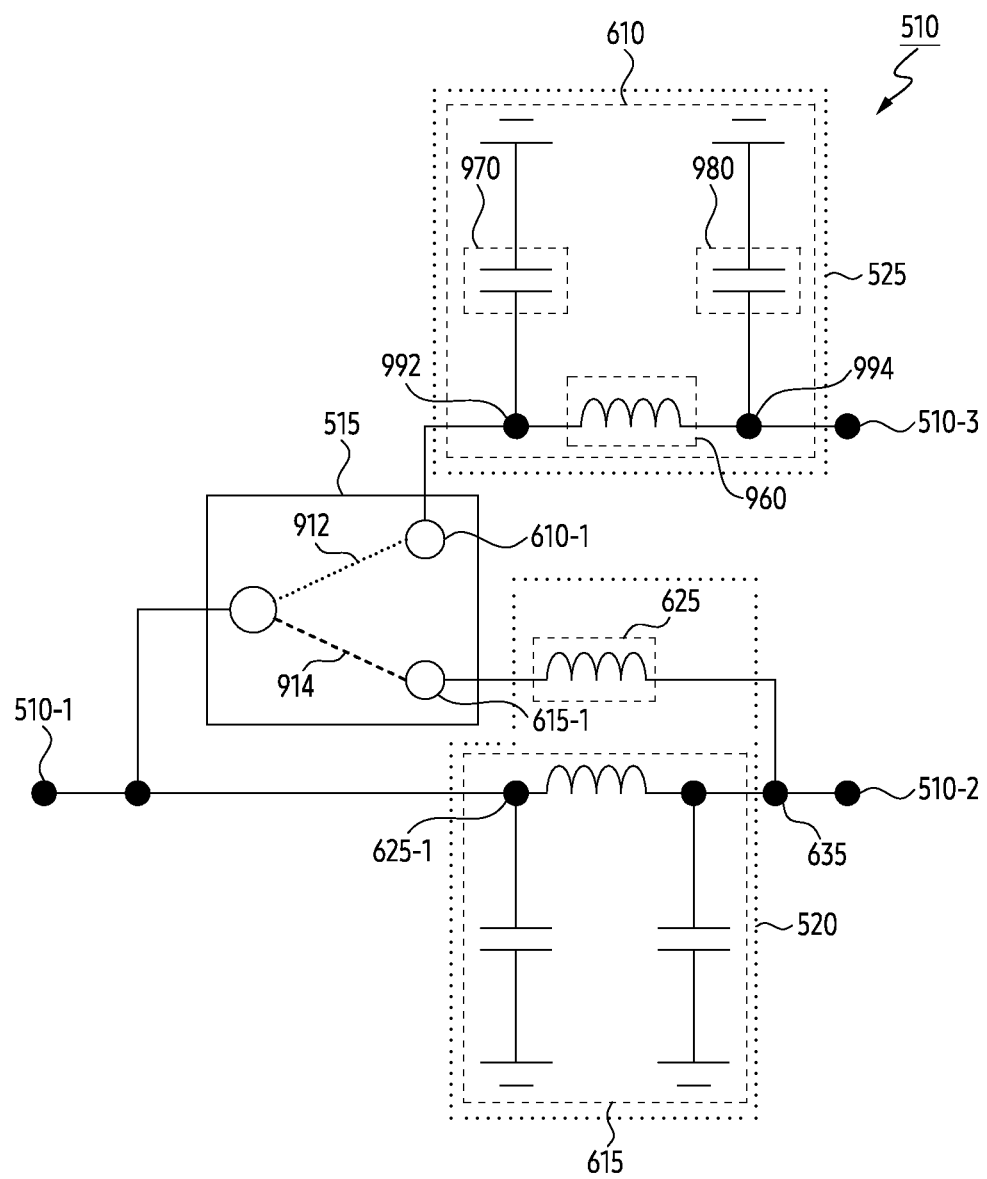

FIGS. 9A and 9B are circuit diagrams of the power division circuit of FIG. 6C according to an embodiment. The electronic devices of FIGS. 9A and 9B may be an example of the electronic device 101 of FIGS. 1 and 5. The power division circuit 510 of FIGS. 9A and 9B may be an example of the power division circuit 510 of FIGS. 5 and/or 6C. Components commonly illustrated in at least two of FIGS. 6C, 9A and 9B may have the same reference numerals.

Referring to an embodiment of FIG. 9A, blocks 610 and 615 of the power division circuit 510 may have a topology based on a high-band pass filter. For example, in the first block 610 of the second impedance matching circuit 525, the power division circuit 510 may include a capacitor 920 and inductors 930 and 940. In the node 952 matching the first node 610-1 extending toward the switch 515, one end of the capacitor 920 and one end of the inductor 930 may be connected. The other end of the inductor 930 may be grounded. In the node 954 matching the third node 510-3 of the power division circuit 510, another end of the capacitor 920 and one end of the inductor 940 may be connected. The other end of the inductor 940 may be grounded. The first block 615 of the first impedance matching circuit 520 may have a structure similar to a structure of the first block 610 of the above-described second impedance matching circuit 525.

As described above in FIG. 6C, the second block 625 of the first impedance matching circuit 520 may be activated in a state (e.g., a third state) in which the first impedance matching circuit 520 of the first impedance matching circuit 520 and the second impedance matching circuit 525 is activated, and adjust the impedance of the first impedance matching circuit 520. Referring to FIG. 9A, in the second block 625, the power division circuit 510 may include a capacitor. One end of the capacitor of the second block 625 may be connected to the third node 615-1 extending toward the switch 515. The other end of the capacitor of the second block 625 may be connected to the node 635.

According to an embodiment, the power division circuit 510 may selectively activate the first antenna (e.g., the first antenna 580 of FIG. 5) connected to the second node 510-2 and the second antenna (e.g., the second antenna 585 of FIG. 5) connected to the third node 510-3 based on distinct states. For example, in the first state (or EPA state), The power division circuit 510 may activate an electrical connection 912 between the first node 510-1 and the first node 610-1 connected to the second impedance matching circuit 525 in the switch 515, and then activate both the first block 615 of the first impedance matching circuit 520 and the first block 610 of the second impedance matching circuit 525. In the first state, the power division circuit 510 may deactivate the electrical connection 914 between the first node 510-1 and the third node 615-1. In this case, as the blocks 610 and 615 are activated among the blocks 610, 615, and 625, all impedance of the first impedance matching circuit 520 and the second impedance matching circuit 525 may be adjusted to a first impedance.

In an embodiment, in another state distinguished from the first state (e.g., a third state in which only the first antenna connected to the second node 510-2 is activated), the power division circuit 510 may deactivate the electrical connection 912 and activate the electrical connection 914. As the electrical connection 914 is activated, all of the blocks 615 and 625 of the first impedance matching circuit 520 are activated, so that the impedance of the first impedance matching circuit 520 may be adjusted from the first impedance to the second impedance. The capacitance of the second block 625 may be half of the capacitance of the capacitor included in the first block 615 as described above in Equation 4. In the other state in which all of the blocks 615 and 625 are activated, the first impedance matching circuit 520 may shift the phase of the electrical signal input through the first node 510-1 by 70 degrees.

Referring to an embodiment of FIG. 9B, blocks 610 and 615 of the power division circuit 510 may have a topology based on a low-band pass filter. In the first block 610 of the second impedance matching circuit 525, the power division circuit 510 may include capacitors 970 and 980 and an inductor 960. In the node 992 matching the first node 610-1 extending toward the switch 515, one end of the inductor 960 and one end of the capacitor 970 may be connected. The other end of the capacitor 970 may be grounded. In the node 994 matching the third node 510-3 of the power division circuit 510, another end of the inductor 960 and one end of the capacitor 980 may be connected. The other end of the capacitor 980 may be grounded.

Referring to FIG. 9B, the first block 615 of the first impedance matching circuit 520 may have a structure similar to a structure of the first block 610 of the above-described second impedance matching circuit 525. The second block 625 of the first impedance matching circuit 520 may include an inductor for adjusting the impedance of the first impedance matching circuit 520 to the second impedance. The inductor of the second block 625 may include one end connected to the third node 615-1 extending toward the switch 515, and another end connected to the node 635 of the first impedance matching circuit 520.

Similar to that described in FIG. 9A, the electrical connections 912 and 914 between the first node 510-1 and the nodes 610-1 and 615-1 may be controlled by the power division circuit 510. For example, in the first state, as the electrical connection 912 of the electrical connections 912 and 914 is activated, both of the first impedance matching circuit 520 and the second impedance matching circuit 525 may perform phase transition by 90 degrees. In the first state, both the first impedance matching circuit 520 and the second impedance matching circuit 525 may have a first impedance. For example, in a third state different from the first state, as the electrical connection 914 of the electrical connections 912 and 914 is activated, the impedance of the first impedance matching circuit 520 may be adjusted from the first impedance to the second impedance. As described above in FIG. 7B, in order to adjust the impedance of the first impedance matching circuit 520 to the second impedance, the inductance of the second block 625 may be twice the inductance of the first block 615. In the third state, the first impedance matching circuit 520 may shift the phase of the electrical signal input through the first node 510-1 by 70 degrees.

According to an embodiment, as described above in FIGS. 7A, 7B, 8A 8B, 9A, and 9B, the power division circuit 510 of the electronic device may be controlled to satisfy distinct impedance matching conditions of distinct states (e.g., the first to third states described above) based on a relatively small number of passive elements. According to an embodiment, the electronic device may selectively activate the antennas by switching between distinct states using the power division circuit 510.

Hereinafter, with reference to FIGS. 10A and 10B, an insertion loss when an electronic device including the power division circuit 510 switches between different states will be described, according to an embodiment.

Figure 10A:
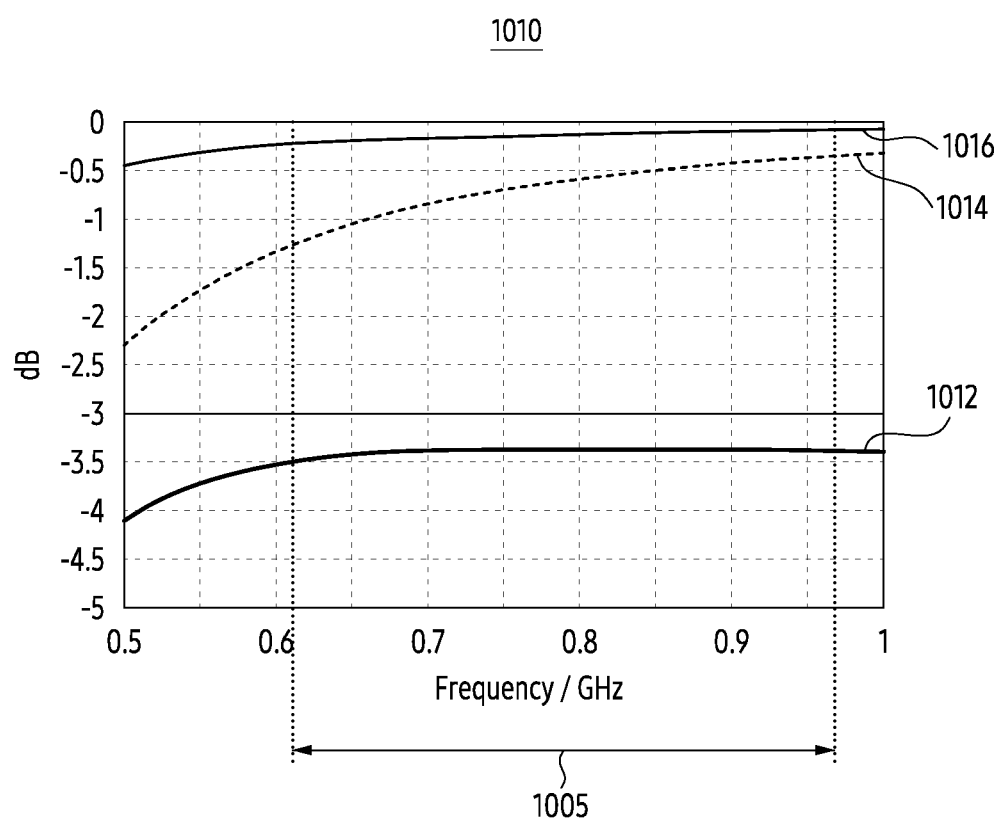
FIGS. 10A and 10B are exemplary graphs for describing insertion loss in a power division circuit included in an electronic device according to an embodiment.
Figure 10B:
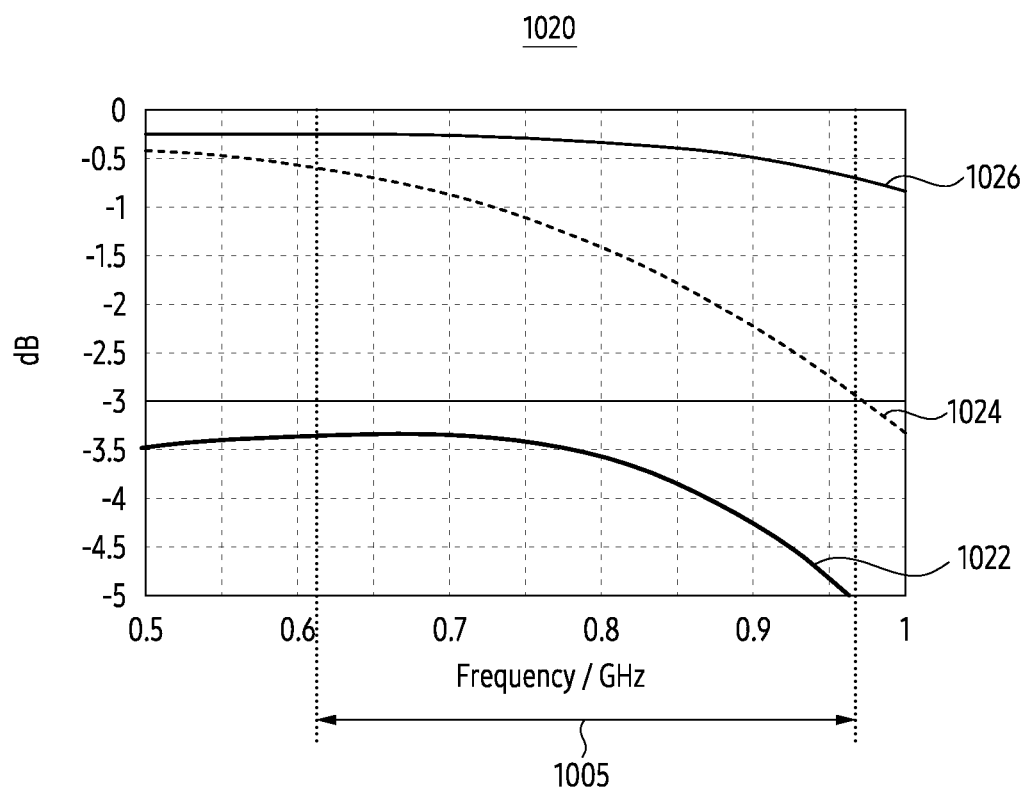

FIGS. 10A and 10B are graphs illustrating an insertion loss in a power division circuit included in an electronic device according to an embodiment. The electronic device of FIGS. 10A and 10B may be an example of the electronic device 101 of FIGS. 1 and 5. The power division circuit of FIGS. 10A and 10B may be an example of the power division circuit 510 of FIGS. 5 and/or 6A to 6C.

Referring to FIG. 10A, in distinct states of the power division circuit included in the electronic device according to an embodiment of FIG. 7A, a graph 1010 illustrating an insertion loss of the power division circuit is illustrated. Referring to FIG. 10B, in distinct states of the power division circuit included in the electronic device according to an embodiment of FIG. 7B, a graph 1020 illustrating an insertion loss of the power division circuit is illustrated. The frequency band 1005 of FIGS. 10A and 10B may include a frequency of a wireless signal transmitted and/or received by an electronic device according to an embodiment, using a power division circuit.

Referring to FIG. 10A, a line 1012 of a graph 1010 represents an insertion loss of a power division circuit in a first state (or an EPA state). The line 1014 of graph 1010 represents the insertion loss of the power division circuit in a state that the first block 615 among the blocks 610, 615, 620, and 625 of the power division circuit 510 of FIG. 7A, for performing the phase transition at a preset angle (e.g., 90 degrees) related to the antenna connected to the second node 510-2 (e.g., the first antenna 580 in FIG. 5) is activated. The line 1016 of the graph 1010 represents the insertion loss of the power division circuit in the third state that the antenna among antennas connected to the second node 510-2 and the third node 510-3 of FIG. 7A, connected to the second node 510-2 is activated. For example, when only the antenna connected to the second node 510-2 of FIG. 7A is used, the lines 1014 and 1016 may represent a differentiated insertion loss based on activation of the second block 625.

As described above, as blocks 615, 625 among the blocks 610, 615, 620, and 625 of the power division circuit 510 of FIG. 7A are activated in the third state, the impedance of the power division circuit 510 may be changed to a second impedance distinct from the first impedance in the first state. Comparing the lines 1014 and 1016 of FIG. 10A, throughout the frequency included in the frequency band 1005, the insertion loss of the third state indicated by the line 1016 may be reduced from the insertion loss of the state indicated by the line 1014 (e.g., state in which, among the blocks 615 and 625 of FIG. 7A, only the first block 615 of the first impedance matching circuit 520 is activated). As the blocks 610 and 615 of the power division circuit 510 of FIG. 7A have a topology based on the high-band pass filter, a difference between the lines 1014 and 1016 may increase as the frequency decreases in the frequency band 1005. For example, in a relatively low frequency, the insertion loss may be relatively further reduced by impedance matching of the power division circuit 510.

Referring to FIG. 10B illustrating an insertion loss measured in an embodiment of FIG. 7B, a line 1022 of a graph 1020 indicates an insertion loss of a power division circuit in a first state (or an EPA state). The line 1024 of graph 1020 represents the insertion loss of the power division circuit in a state that the first block 615 among the blocks 610, 615, 620, and 625 of the power division circuit 510 of FIG. 7B, is activated. The line 1026 of graph 1020 represents the insertion loss of the power division circuit in a third state distinct from the first state. For example, when only the antenna connected to the second node 510-2 of FIG. 7B is used, the lines 1024 and 1026 may indicate an insertion loss that varies based on the activation of the second block 625.

As described above, in the third state, as blocks 615, 625 among the blocks 610, 615, 620, and 625 of FIG. 7B are activated, the impedance of the power division circuit 510 may be adjusted to a second impedance distinct from the first impedance in the first state. Comparing the lines 1024 and 1016 of FIG. 10B, throughout the frequency included in the frequency band 1005, The insertion loss of the third state indicated by the line 1026 may be reduced from the insertion loss of the state indicated by the line 1024 (e.g., state in which, among the blocks 615 and 625 of FIG. 7B, only the first block 615 of the first impedance matching circuit 520 is activated). As the blocks 610 and 615 of the power division circuit 510 of FIG. 7B have a topology based on the low-band pass filter, in the frequency band 1005, as the frequency increases, a difference between the lines 1024 and 1026 may increase. For example, at a relatively high frequency, the insertion loss may be relatively further reduced by the electronic device according to an embodiment, using the power division circuit.

As described above, as impedance matching is performed in each of distinct states (e.g., the first state to the third state) that selectively activates at least one of the antennas (e.g., the first antenna 580 and the second antenna 585 of FIG. 5), using the power divider circuit, the electronic device according to an embodiment may communicate with the external electronic device based on a relatively reduced insertion loss in each of the states. Switching between the states may be performed based on an environment (e.g., distance between the antennas and/or one or more external objects in contact with the electronic device including the antennas) affecting transmission efficiency of at least one of the antennas. Hereinafter, referring to FIGS. 11A, 11B, 12, 13, 14, and 15, an operation of switching between the different states of the electronic device according to an embodiment will be described.

Figure 11A:
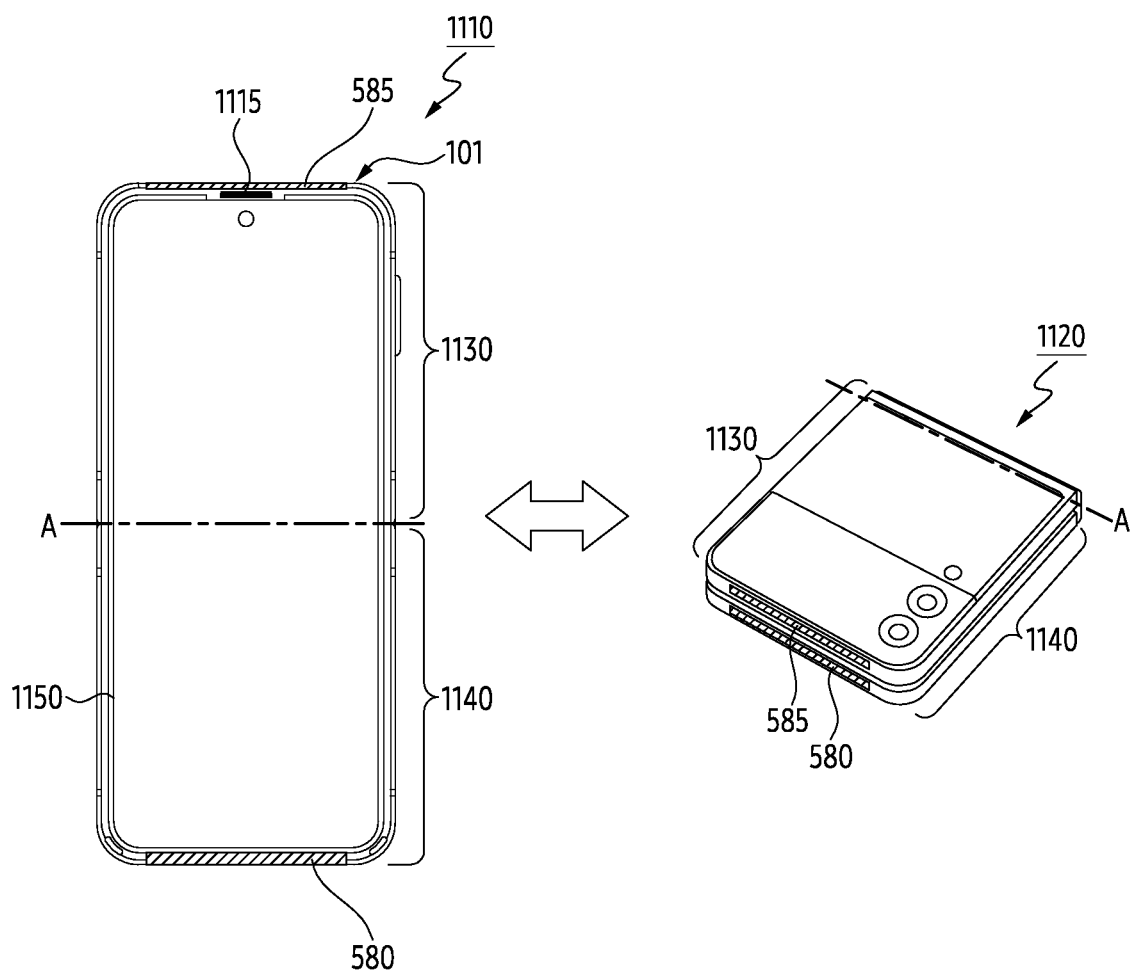
FIGS. 11A and 11B are exemplary diagrams for describing arrangement of antennas included in an electronic device according to an embodiment.
Figure 11B:
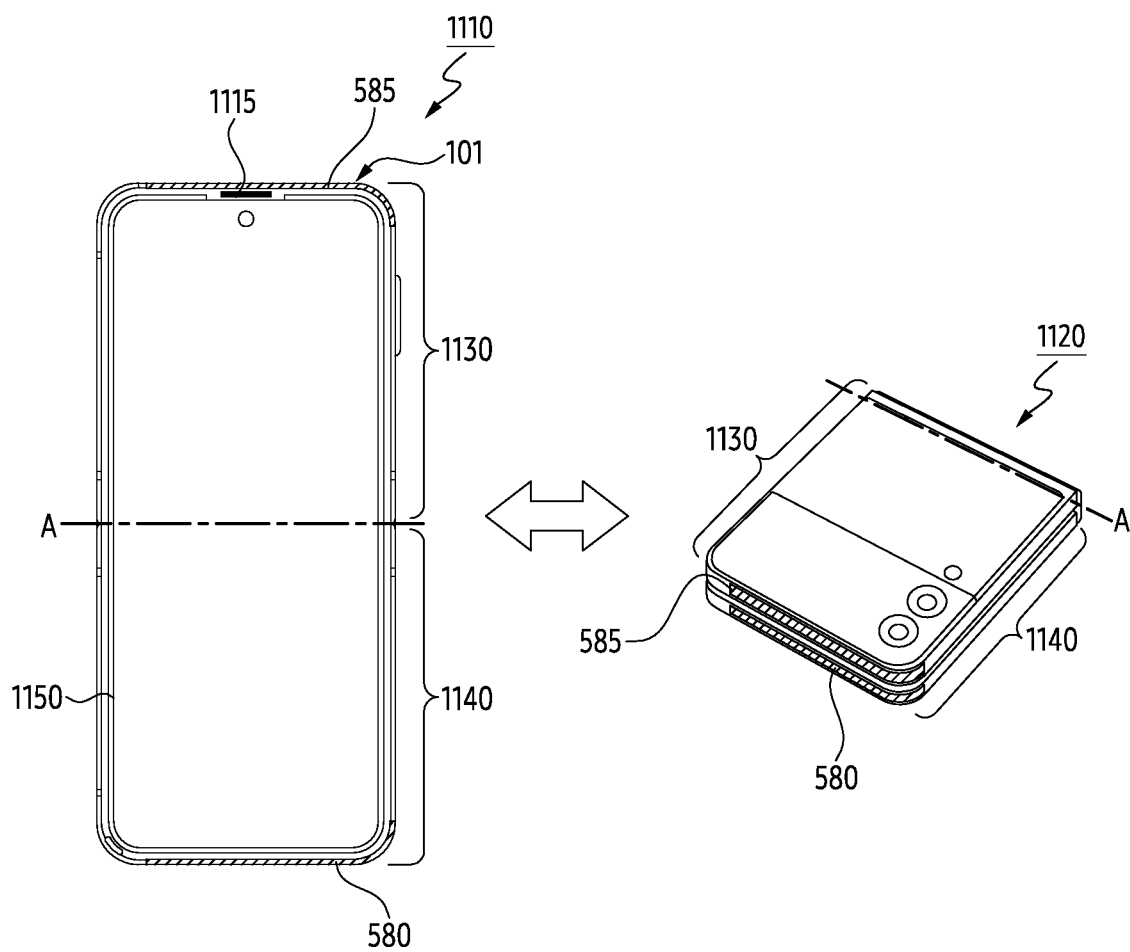

FIGS. 11A and 11B are exemplary diagrams illustrating an arrangement of antennas included in an electronic device according to an embodiment. The electronic device 101 of FIGS. 11A and 11B may be an example of the electronic device 101 of FIGS. 1 and 5.

Referring to FIGS. 11A and 11B, according to an embodiment, the electronic device 101 may include a first housing structure 1130 and a second housing structure 1140, which are rotatably connected to be folded by a hinge assembly. For example, the first housing structure 1130 may include a PCB (e.g., a PCB referred to as a main board) on which an application processor (e.g., the processor 120 of FIG. 1) and/or a power division circuit (e.g., the power division circuit 510 of FIG. 5) is disposed. In the above example, the first housing structure 1130 may be referred to as a main housing structure, and the second housing structure 1140 may be referred to as a sub-housing structure.

In an embodiment, a foldable electronic device 101 may be formed by the hinge assembly. According to an embodiment, the electronic device 101 may include a flexible display 1150 formed across a first surface of the first housing structure 1130 and a first surface of the second housing structure 1140. As a state in which the angle between the first housing structure 1130, the hinge assembly, and the second housing structure 1140 is a flat angle (e.g., 180 degrees), the state 1110 of FIGS. 11A and 11B may be referred to as an unfolded status. In the unfolded status, the shape of the flexible display 1150 may be a flat plane. As the angle between the first housing structure 1130, the hinge assembly, and the second housing structure 1140 is minimum (e.g., substantially 0 degrees), the state 1120 of FIGS. 11A and 11B may be referred to as a folded status. In the folded status, the flexible display 1150 may have a bent shape in a part corresponding to a hinge assembly between the first housing structure 1130 and the second housing structure 1140. In the folded status, the first surface of the first housing structure 1130 on which the flexible display 1150 is formed and the first surface of the second housing structure 1140 may face each other and be in-folded. However, the embodiment is not limited thereto.

Referring to FIGS. 11A and 11B, distinguished examples of antennas disposed in each of the first housing structure 1130 and the second housing structure 1140 are illustrated. The antennas included in the electronic device 101 may include a conductive member disposed on the second surface of the first housing structure 1130 and the second surface of the second housing structure 1140 distinct from the first surface of the first housing structure 1130 and the first surface of the second housing structure 1140 on which the flexible display 1150 is disposed. The second surface of the first housing structure 1130 may be substantially perpendicular to all of the first surface of the first housing structure 1130 and the third surface parallel to the first surface of the first housing structure 1130. Similarly, the second surface of the second housing structure 1140 may be substantially perpendicular to all of the first surface of the second housing structure 1140 and the third surface parallel to the first surface of the second housing structure 1140. Hereinafter, each of the first surface, the second surface, and the third surface of the first housing structure 1130 and the second housing structure 1140 may be referred to as a front surface, a side surface, and a rear surface.

In an embodiment of FIG. 11A, on the side surface of the first housing structure 1130, the conductive member formed in a part parallel to the folding axis A of the first housing structure 1130 and the second housing structure 1140 by the hinge assembly may form the second antenna 585 of the electronic device 101. On the side surface of the second housing structure 1140, the conductive member formed in a part parallel to the folding axis A may form the first antenna 580 of the electronic device 101. In an embodiment of FIG. 11B, one or more conductive members formed at a part including one corner among corners of the side surfaces of the first housing structure 1130 may form the second antenna 585 of the electronic device 101. Referring to FIG. 11B, as one corner of the second housing structure 1140, the first antenna 580 of the electronic device 101 may be formed of one or more conductive members formed in a part including one edge symmetrical to one edge of the first housing structure 1130 in which the second antenna 585 is formed by the folding axis A of the first housing structure 1130 and the second housing structure 1140 by the hinge assembly. For example, at least a part of the first antenna 580 and the second antenna 585 may overlap when viewed from above the third surface in a folded status.

In an embodiment of FIGS. 11A and 11B, in the folded status (e.g., the status 1120), the electronic device 101 may activate the antennas based on the first state (or the EPA state). Referring to FIG. 11A, as the electronic device 101 activates the antennas 580, 585 based on the first state, wireless signals having the same phase may be simultaneously emitted from the antennas 580, 585. In this case, the electronic device 101 may communicate with an external electronic device using the antennas 580 and 585, despite interference caused by the distance between the antennas 580, 585 being reduced than the distance between the antennas 580, 585 in the unfolded status (e.g., status 1110).

In the unfolded status (e.g., status 1110), in a state distinct from the first state (e.g., a second state that is the ASDiv state or a third state in which only the first antenna 580 is activated), the electronic device 101 according to an embodiment may selectively activate any one of the antennas. For example, in response to identifying the switch from the folded status to the unfolded status, the electronic device 101 may deactivate any one of the antennas 580 and 585 by switching from the first state to the second state and/or the third state. The electronic device 101 in which any one of the antennas 580 and 585 is deactivated may maintain activation of the other one of the antennas 580 and 585. In an embodiment, the switch between the folded status and the unfolded status may be detected by a hall sensor included in the electronic device 101.

In the folded state, according to an embodiment, in response to identifying an external object (e.g., hand) in contact with the electronic device 101, the electronic device 101 may selectively activate any one of the antennas by switching to the other state. For example, in the unfolded status and/or the folded status, in response to identifying an external object in contact with the second housing structure 1140, the electronic device 101 may switch to a second state in which the second antenna 585 disposed in the first housing structure 1130 is activated. For example, detecting an external object, such as a hand may be performed by a grip sensor included in the electronic device 101, a receiver 1115 and/or a communication processor (e.g., the communication processor 505 of FIG. 5). For example, in response to identifying a decrease in antenna gain of the first antenna 580 based on the communication processor, the electronic device 101 may identify an external object in contact with the first antenna 580. For example, in response to identifying activation of receiver 1115 according to call setup between electronic device 101 and external electronic device, the electronic device 101 may identify an external object (e.g., a user's head) in contact with the receiver 1115.

As described above, according to an embodiment, the electronic device 101 may compensate for impedance mismatch occurring in switching between the first to third states by using the power division circuit (e.g., the power division circuit 510 of FIG. 5). As impedance mismatch is compensated, the electronic device 101 may secure performance of the antennas based on the external object and the posture of the electronic device 101, such as an unfolded status or a folded status. For example, as the electronic device 101 switches from the third state in which the first antenna 580 is activated to the second state in which the second antenna 585 is activated based on an external object in contact with the first antenna 580, the insertion loss may be reduced.

Figure 12:
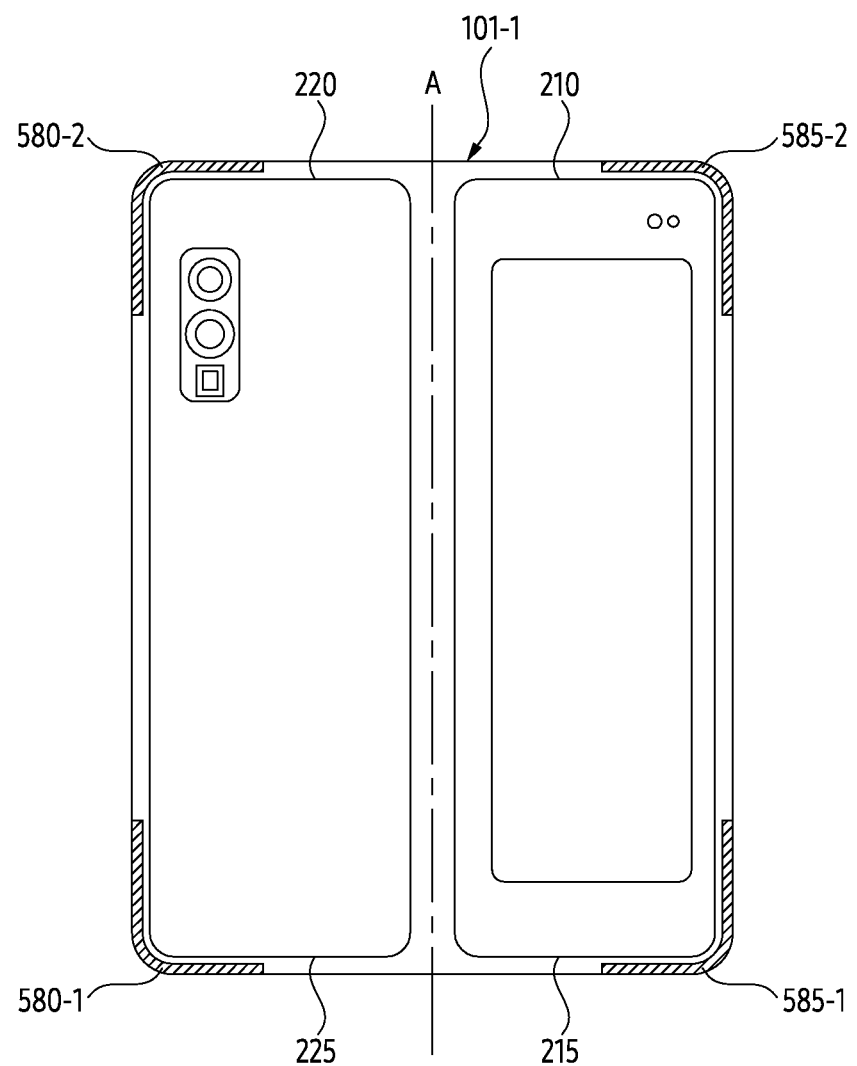
FIG. 12 is an exemplary diagram describing arrangement of antennas included in an electronic device according to an embodiment.

FIG. 12 is an exemplary diagram illustrating an arrangement of antennas included in an electronic device 101-1 according to an embodiment. The electronic device 101-1 of FIG. 12 may be an example of the electronic device 101 of FIGS. 1 and 5, or may be an example of the electronic device 200 of FIGS. 2 to 4.

Referring to FIG. 12, a rear surface of the electronic device 101-1 according to an embodiment is illustrated. In an embodiment of FIG. 12, the electronic device 101-1 may include a first housing structure 210 and a second housing structure 220 rotatably connected to each other by a hinge assembly including a folding axis A. As described above in FIGS. 11A and 11B, for example, the unfolded status may mean a state in which an angle between the first housing structure 210, the hinge assembly, and the second housing structure 220 is substantially the same as 180 degrees. For example, the folded status may mean a state in which the front surface of the first housing structure 210 and the front surface of the second housing structure 220 face each other. Based on the electronic device 101-1 of FIG. 12 corresponding to an example of the electronic device 200 of FIGS. 2 to 4, a description overlapped with the description of FIGS. 2 to 4 will be omitted.

Referring to FIG. 12, examples of combinations of antennas disposed in each of the first housing structure 210 and the second housing structure 220 are illustrated. The antennas included in the electronic device 101-1 may be formed on a part of a side surface including corners of the first housing structure 210 and the second housing structure 220. The electronic device 101-1 according to an embodiment may include a combination of the first antenna 580-1 and the second antenna 585-1 corresponding to the first antenna 580-1, or a different combination of the first antenna 580-2 and the second antenna 585-2 corresponding to the first antenna 580-2.

According to an embodiment, in a folded status, as described above with reference to FIGS. 11A and 11B, the electronic device 101-1 may activate the antennas based on the first state (or the EPA state). For example, in response to identifying switching from the folded status to the unfolded status, or identifying an external object in contact with at least one of the antennas of the electronic device 101-1 in the folded status, the electronic device 101 may switch to another state (e.g., a second state and/or a third state) distinguished from the first state. As another example, in response to identifying switching from the unfolded status to the folded status, the electronic device 101 may activate all of the corresponding antennas among the antennas by switching to the first state. When switching among the first to third states, the electronic device 101-1 may adjust the impedance of the power division circuit to an impedance that satisfies an impedance matching condition in a state after being switched among the first to third states by controlling the power division circuit (e.g., the power division circuit 510 of FIG. 5) included in the electronic device 101-1.

Figure 13:
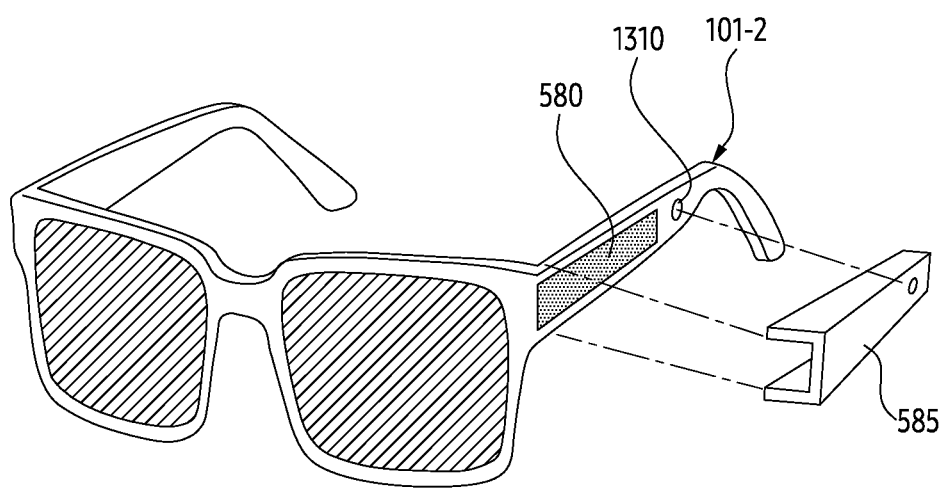
FIG. 13 is an exemplary diagram describing arrangement of antennas included in an electronic device according to an embodiment.

FIG. 13 is an exemplary diagram illustrating an arrangement of antennas 580, 585 included in an electronic device 101-2 according to an embodiment. The electronic device 101-2 of FIG. 13 may be an example of the electronic device 101 of FIGS. 1 and 5. Referring to the embodiment of FIG. 13, an electronic device 101-2 having the form of a wearable device, such as glasses and/or a head-mount device (HMD) may be formed.

According to an embodiment, the electronic device 101-2 may include a first antenna 580 formed on a part of a housing corresponding to a temple of glasses. Referring to FIG. 13, the electronic device 101-2 according to an embodiment may include a second antenna 585 overlapped on the first antenna 580 on a part of the housing. The second antenna 585 may be connected to the electronic device 101-2 through a feeding point 1310. Although an embodiment in which all of the first antenna 580 and the second antenna 580 are disposed on any one of the temples of the glasses is illustrated, the embodiment is not limited thereto. For example, each of the first antenna 580 and the second antenna 585 may be formed in any one of the tips, rims, and/or temples of the glasses.

According to an embodiment, the electronic device 101-2 may include a power division circuit (e.g., the power division circuit 510 of FIG. 5) for selectively activating or/and simultaneously controlling the first antenna 580 and the second antenna 585. For example, while radiating wireless signals having the same phase in each of the first antenna 580 and the second antenna 585 based on the first state, the electronic device 101-2 may identify an external object (e.g., a hand) in contact with the second antenna 585. In response to identifying the external object, the electronic device 101-2 may switch to a third state in which activates the first antenna 580 among the first antenna 580 and the second antenna 585. At a time point of switching from the first state to the third state, the electronic device 101-2 may compensate for impedance mismatch caused by switching from the first state to the third state, by controlling the power division circuit.

Figure 14:
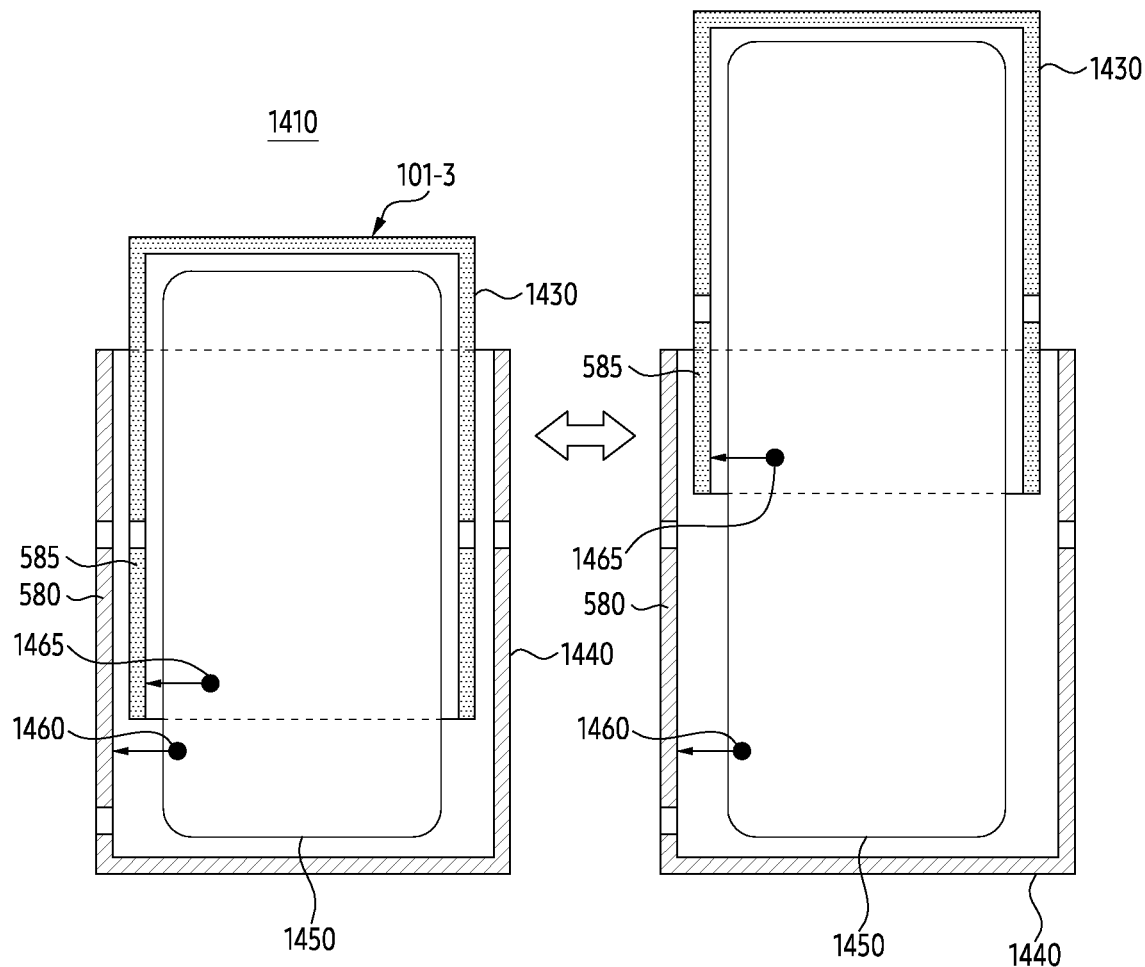
FIG. 14 is an exemplary diagram describing arrangement of antennas included in an electronic device according to an embodiment.

FIG. 14 is an exemplary diagram illustrating an arrangement of antennas 580, 585 included in an electronic device 101-3 according to an embodiment. The electronic device 101-3 of FIG. 14 may be an example of the electronic device 101 of FIGS. 1 and 5.

Referring to FIG. 14, an electronic device 101-3 according to an embodiment may include a first housing structure 1430 and a second housing structure 1440. The first housing structure 1430 may have an accommodatable dimension within the opening of the second housing structure 1440. According to an embodiment, the electronic device 101-3 may include a flexible display 1450 disposed on one surface of the second housing structure 1440 and one surface of the first housing structure 1430. For example, as the first housing structure 1430 moves in the +y direction of FIG. 14, the volume of the inner space of the first housing structure 1430 and the second housing structure 1440 may increase. As another example, as the first housing structure 1430 moves in the +y direction of FIG. 14, the region of the flexible display 1450 exposed to the outside may increase. The first housing structure 1430 may move in the +y direction or the −y direction of FIG. 14 within a distance less than a preset distance from the second housing structure 1440.

Referring to FIG. 14, as the first housing structure 1430 moves in the −y direction of FIG. 14, the state 1410 may be referred to in a slide-in state, in which a part of the first housing structure 1430 included inside the second housing structure 1440 is maximized. The slide-in state may mean a state in which the first housing structure 1430 can no longer slide into the second housing structure 1440 by the structure of the electronic device 101-3. The state 1420 may be referred to as a slide-out state in which a part of the first housing structure 1430 included in the second housing structure 1440 is minimized, as the first housing structure 1430 moves in the +y direction of FIG. 14. In the slide-in state, the region of the flexible display 1450 exposed to the outside may be minimized. The slide-out state may mean a state in which the first housing structure 1430 may no longer slide in a direction away from the second housing structure 1440 by the structure of the electronic device 101-3. In the slide-out state, the region of the flexible display 1450 exposed to the outside may be maximized. Although not shown, the electronic device 101-3 may have an intermediate state between the slide-in state and the slide-out state.

Referring to FIG. 14, according to an embodiment, the electronic device 101-3 may include a first antenna 580 formed on a part of a side surface of the second housing structure 1440 (e.g., one side perpendicular to the front of the second housing structure 1440 in which the flexible display 1450 is exposed). According to an embodiment, the electronic device 101-3 may include a second antenna 585 formed on a part of a side surface of the first housing structure 1430. The electronic device 101-3 may include feeding points 1460, 1465 for providing an electrical signal to each of the first antenna 580 and the second antenna 585. The feeding points 1460, 1465 may be included in the first signal path 550 of FIG. 5 and the second signal path 555.

Referring to FIG. 14, in a slide-in state 1410, a part of a side surface of the first housing structure 1430 in which the second antenna 585 is formed may overlap a part of a side surface of the second housing structure 1440 in which the first antenna 580 is formed. In the slide-out state 1420, a part of the side surface of the first housing structure 1430 in which the second antenna 585 is formed may not overlap a part of the side surface of the second housing structure 1440 in which the first antenna 580 is formed, and may be spaced apart from a part of the side surface of the second housing structure 1440 in which the first antenna 580 is formed.

According to an embodiment, the electronic device 101-3 may perform impedance matching dependent on a positional relationship between the first antenna 580 and the second antenna 585 in a slide-in state and/or a slide-out state by using the power division circuit (e.g., the power division circuit 510 of FIG. 5). For example, in the slide-in state, the electronic device 101-3 may activate both the first antenna 580 and the second antenna 585 based on the first state (or the EPA state). In a slide-in state, in response to identifying an external object in contact with the first antenna 580 or identifying activation of the receiver, the electronic device 101-3 may switch to a third state in which the second antenna 585 of the first antenna 580 and the second antenna 585 is activated. By switching from the first state to the third state, the electronic device 101-3 may adjust the impedance of the power division circuit from the first impedance $\sqrt{2}Z_0$ corresponding to the first state to the second impedance $Z_0$. Similar to impedance matching in switching between the unfolded state and the folded state of FIGS. 11A and 11B, the electronic device 101-3 may perform impedance matching in response to identifying switching between a slide-in state and a slide-out state using the power division circuit.

Figure 15:
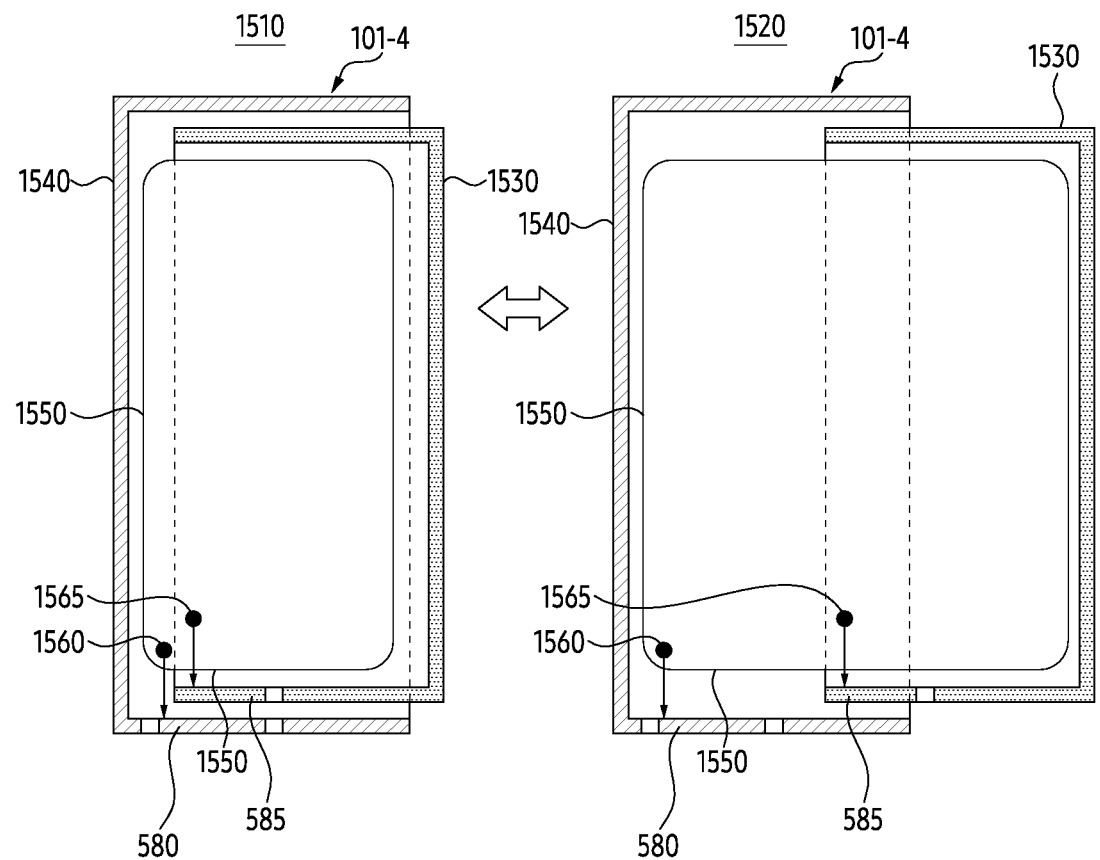
FIG. 15 is an exemplary diagram describing arrangement of antennas included in an electronic device according to an embodiment.

FIG. 15 is an exemplary diagram illustrating an arrangement of antennas 580, 585 included in an electronic device 101-4 according to an embodiment. The electronic device 101-4 of FIG. 15 may be an example of the electronic device 101 of FIGS. 1 and 5.

Referring to FIG. 15, an electronic device 101-4 according to an embodiment may include a first housing structure 1530 and a second housing structure 1540. The first housing structure 1530 may have a shape movable to an inner space of the second housing structure 1540. According to an embodiment, the electronic device 101-4 may include a flexible display 1550 covering one surface of the second housing structure 1540 and one surface of the first housing structure 1530.

The first housing structure 1530 may move in the +x direction or the −x direction of FIG. 15 within a distance less than a preset distance from the second housing structure 1540. Referring to FIG. 15, states 1510 and 1520 distinguished by moving of the first housing structure 1530 in the +x direction or the −x direction of FIG. 15 are illustrated. The state 1510 may be referred to as a slide-in state in which the first housing structure 1530 is inserted into the second housing structure 1540 as much as possible by moving in the −x direction of FIG. 15. The state 1520 may be referred to as a slide-out state in which the first housing structure 1530 is pulled out the outside of the second housing structure 1540 as much as possible by moving in the +x direction of FIG. 15. Although not shown, electronic device 101-4 may have an intermediate state between the slide-in state and the slide-out state.

Referring to FIG. 15, according to an embodiment, the electronic device 101-4 may include a first antenna 580 formed on a part of a side surface of the second housing structure 1540 (e.g., one surface perpendicular to the front surface of the second housing structure 1540 where the flexible display 1550 is exposed). According to an embodiment, the electronic device 101-4 may include a second antenna 585 formed on a part of a side surface of the first housing structure 1530. The electronic device 101-4 may include feeding points 1560, 1565 for providing an electrical signal to each of the first antenna 580 and the second antenna 585. The feeding points 1560, 1565 may be included in the first signal path 550 and the second signal path 555 of FIG. 5.

As described above in FIG. 14, according to an embodiment, the electronic device 101-4 may perform selective activation and/or impedance matching of the antennas, based on a positional relationship (e.g., distance between the first antenna 580 and the second antenna 585, which varies depending on the slide-in and/or slide-out states) between the first antenna 580 of the electronic device 101-4 and the second antenna 585 and/or an external object (e.g., a user's hand and/or head) in contact with at least one of the first antenna 580 and the second antenna 585 using the power division circuit (e.g., the power division circuit 510 of FIG. 5). For example, in the slide-out state 1520, the electronic device 101-4 may control the power division circuit based on the third state in which the first antenna 580 is activated among the first antenna 580 and the second antenna 585. In the above example, as the slide-out state is switched to the slide-in state 1510, the electronic device 101-4 may control the power division circuit based on the first state in which both of the first antenna 580 and the second antenna 585 are activated. As the third state is switched to the first state, the impedance of the power division circuit may be changed from the second impedance $Z_0$ to the first impedance $\sqrt{2}Z_0$.

As described above, according to an embodiment, the electronic device may selectively activate at least one of the antennas based on an environment affecting the performance of the antennas. According to an embodiment, in order to compensate for impedance mismatch caused dynamical activating the antennas, the electronic device may include a power division circuit (e.g., the power division circuit 510 of FIG. 5). Hereinafter, referring to FIG. 16, according to an embodiment, an exemplary operation of controlling the power division circuit based on an environment in which an electronic device affects performance of antennas will be described.

Figure 16:
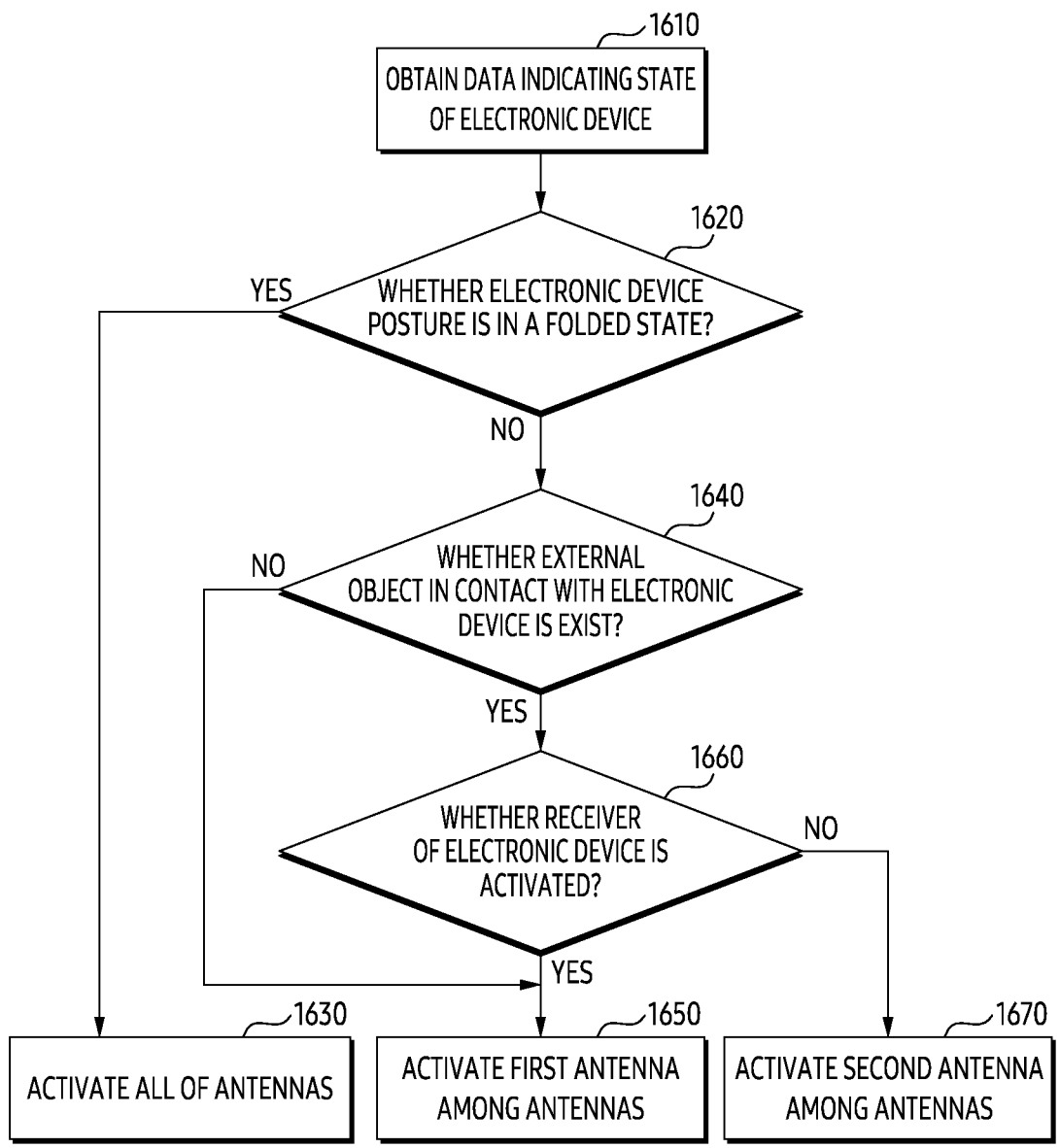
FIG. 16 is a flowchart describing an operation performed by an electronic device to control antennas, according to an embodiment.

FIG. 16 is a flowchart illustrating an operation performed by an electronic device to control antennas according to an embodiment. The electronic device of FIG. 16 may be an example of the electronic device 101 of FIGS. 1 and 5. The operation of FIG. 16 may be performed by the communication processor 505 of FIG. 5 and/or the processor 120 of FIG. 1.

Referring to FIG. 16, in operation 1610, the electronic device according to an embodiment may obtain data indicating a state of the electronic device. The data may include data indicating a posture of an electronic device, such as a folded state, an unfolded state, a slide-in state, and/or a slide-out state. The data may include data indicating an antenna gain and a state of a receiver and/or data for identifying one or more external objects (e.g., a user's hand and/or head) in contact with an electronic device, such as sensor data of a grip sensor. According to an embodiment, the electronic device may perform operation 1610 based on a preset period. According to an embodiment, the electronic device may perform operation 1610 in response to identifying a request (e.g., requests to establish sessions for call connections and data communication, and/or requests generated by running applications such as web browsers) for communicating with an external electronic device different from the electronic device.

Referring to FIG. 16, in operation 1620, the electronic device according to an embodiment may identify whether the electronic device posture is in a folded state. The identification of the folded state may be performed based on the above-described descriptions in FIGS. 2, 11A and 11B, and/or 12. For example, the folding state may represent the posture of the electronic device in which a plurality of antennas included in the electronic device overlap with a preset region or more. In an embodiment of FIGS. 14 to 15 based on a slidable electronic device, the electronic device may identify whether the posture of the electronic device is in a slide-in state.

In response to identifying that the posture of the electronic device is in the folded state, in operation 1630, the electronic device according to an embodiment may activate all of the antennas. For example, the electronic device may transmit and/or receive a signal having a preset phase using all of the antennas. The antennas activated by the electronic device may include the first antenna 580 and the second antenna 585 of FIG. 5. Activating all of the antennas by the electronic device may include emitting, wireless signals having the same phase from the antennas, such as EPA. Operation 1630 may be an example of the first state (or EPA state) described above. In operation 1630, the electronic device according to an embodiment may adjust the impedance of the power division circuit to a first impedance corresponding to the first state. For example, as the impedance of the power division circuit is adjusted to the first impedance, a phase transition based on 90 degrees may occur in the power division circuit, and an impedance matching condition in the first state may be satisfied.

In response to identifying that the posture of the electronic device is in the unfolded state (1620—No), in operation 1640, the electronic device according to an embodiment may identify an external object in contact with the electronic device. The unfolded state may represent a posture of the electronic device in which a plurality of antennas included in the electronic device overlap less than a preset region. In an embodiment of FIGS. 14 to 15, the electronic device may identify an external object contacting the electronic device in response to identifying that the posture of the electronic device is different from the posture in the slide-in state. The electronic device may identify an external object in contact with the electronic device based on at least one of antenna gains of each of the antennas detected by the grip sensor and the communication processor (e.g., the communication processor 505 of FIG. 5). For example, when the antenna gain of at least one of the antennas is less than a preset threshold, the electronic device may identify a contact of an external object. For example, based on the first sensor disposed adjacent to the first antenna in the electronic device, the electronic device may identify an external object.

In response to identifying an external object in contact with the electronic device (1640—YES), in operation 1660, the electronic device according to an embodiment may identify whether the receiver of the electronic device is activated. The electronic device may activate a receiver based on the establishment of a voice call. Activation of the receiver may cause a user of the electronic device to contact the electronic device and the user's head. For example, the activation of the receiver may mean that contact between the electronic device and the user's head has occurred. For example, based on a receiver in the electronic device and/or a second sensor disposed adjacent to the second antenna, the electronic device may identify whether the receiver is activated.

In response to identifying that no external object in contact with the electronic device is present (1640—NO), or identifying a deactivated receiver (e.g., receiver 1115 of FIGS. 11A and 11B) (1660—YES), in operation 1650, the electronic device according to an embodiment may activate a first antenna (or a main antenna) among antennas. Operation 1650 may be an example of the third state described above. In operation 1650, the electronic device may deactivate a second antenna distinct from the first antenna among the antennas. Since any one of the antennas is selectively activated, the electronic device may adjust the impedance of the power division circuit to a second impedance different from the first impedance corresponding to the first state in which all of the antennas are activated. As the impedance of the power division circuit is adjusted to the second impedance, a phase transition occurs in the power division circuit based on a different angle (e.g., 70 degrees) from 90 degrees, and the impedance matching condition in the third state may be satisfied.

In response to the presence of an external object in contact with the electronic device (1640—YES), and the identification of an activated receiver (1660—NO), in operation 1670, the electronic device according to an embodiment may activate a second antenna (or sub-antenna) among antennas. For example, when the user responds to a voice call, the user may attach the electronic device to the head using the hand gripping the electronic device. In the above example, the electronic device may activate the second antenna based on operation 1670. Operation 1670 may be an example of the above-described second state (or ASDiv state). In operation 1670, the electronic device may adjust the impedance of the power division circuit to the second impedance. As the impedance of the power dividing circuit is adjusted to the second impedance, satisfaction of the phase transition and impedance matching conditions of the power division circuit is as described above in operation 1650.

Figure 17A:
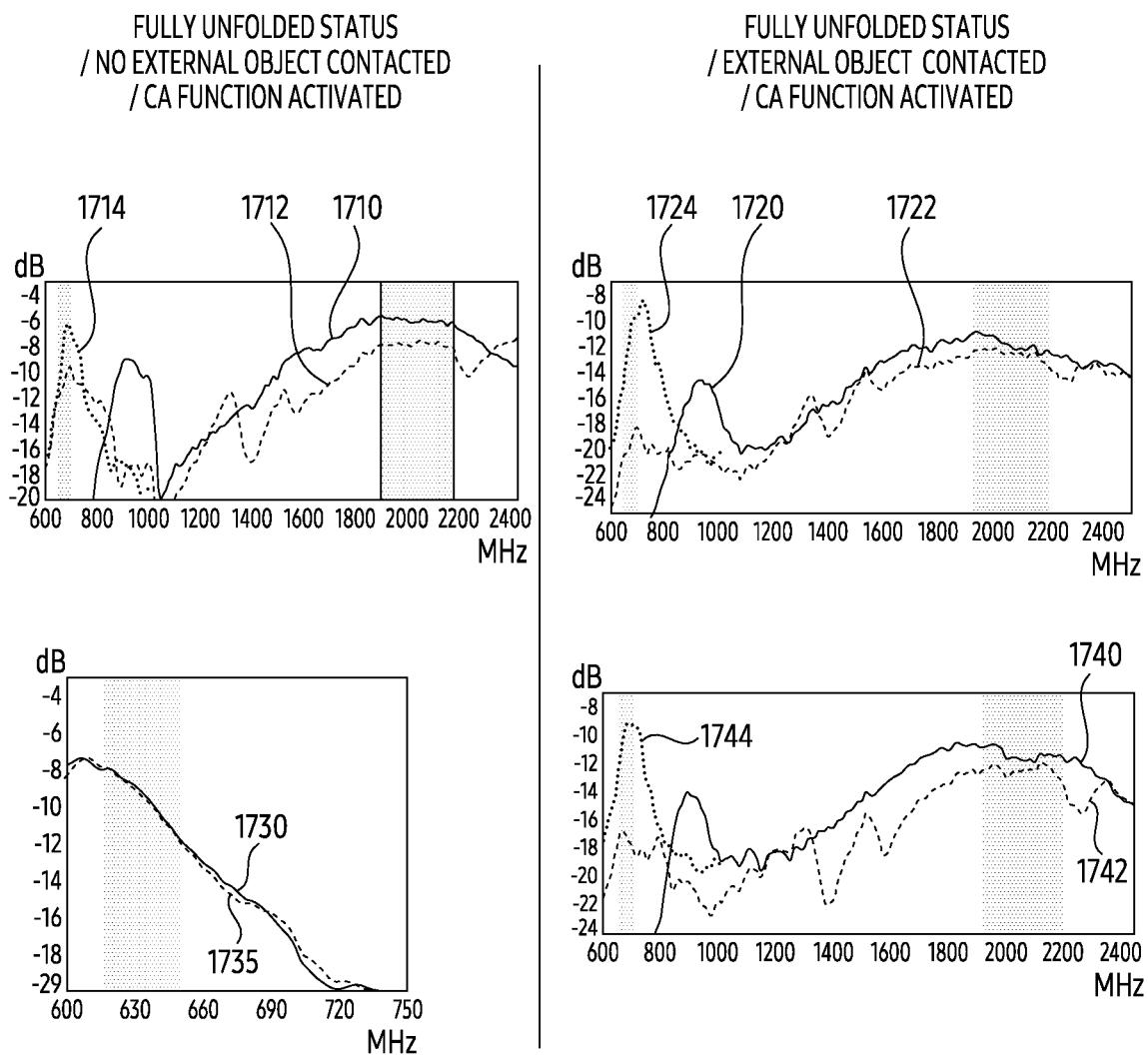
FIGS. 17A and 17B are graphs for describing that an electronic device according to an embodiment improves performance of antennas based on a power division circuit.
Figure 17B:
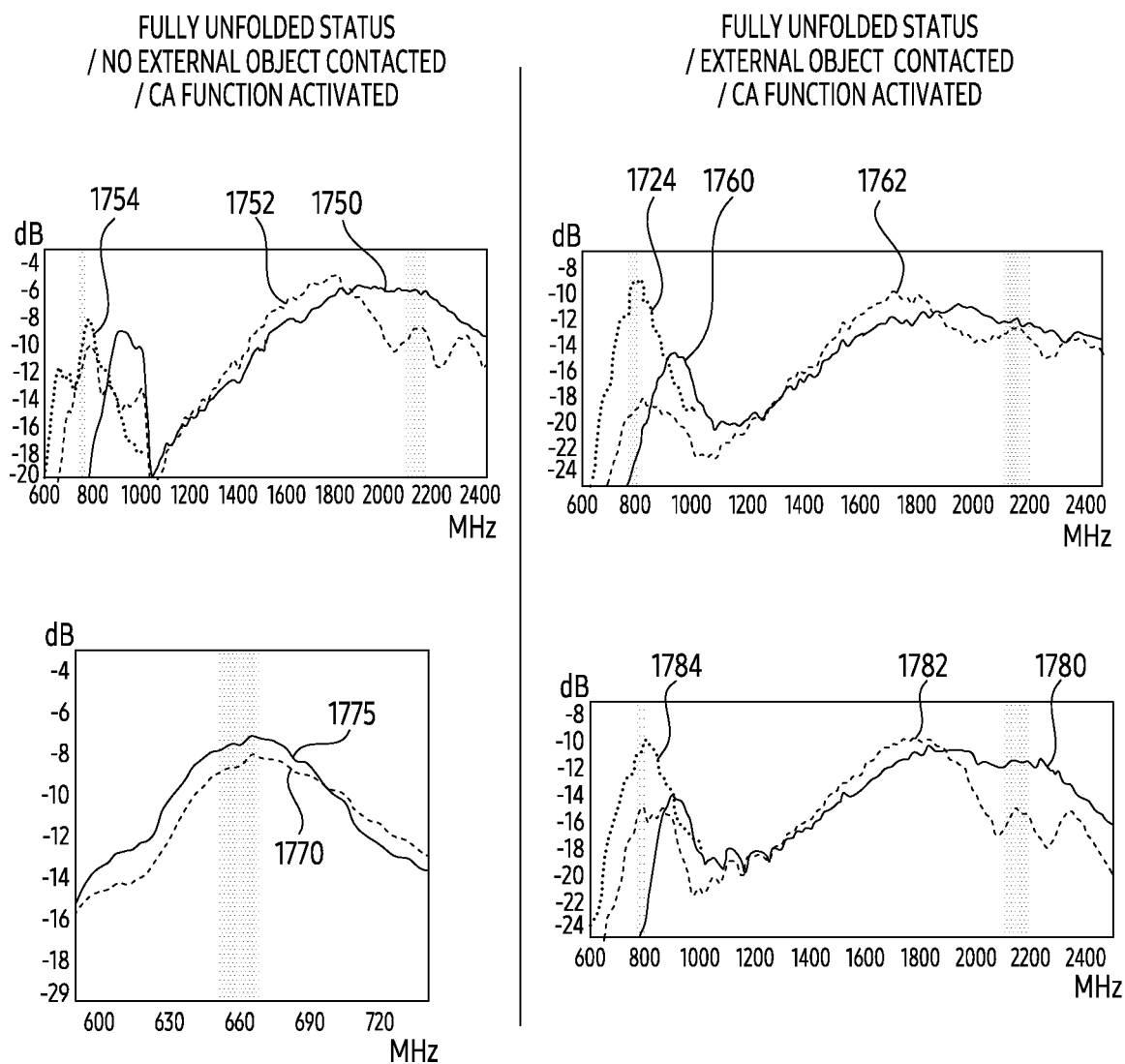

FIGS. 17A and 17B are graphs for illustrating an electronic device according to an embodiment improves performance of antennas based on a power division circuit.

Figure 18A:
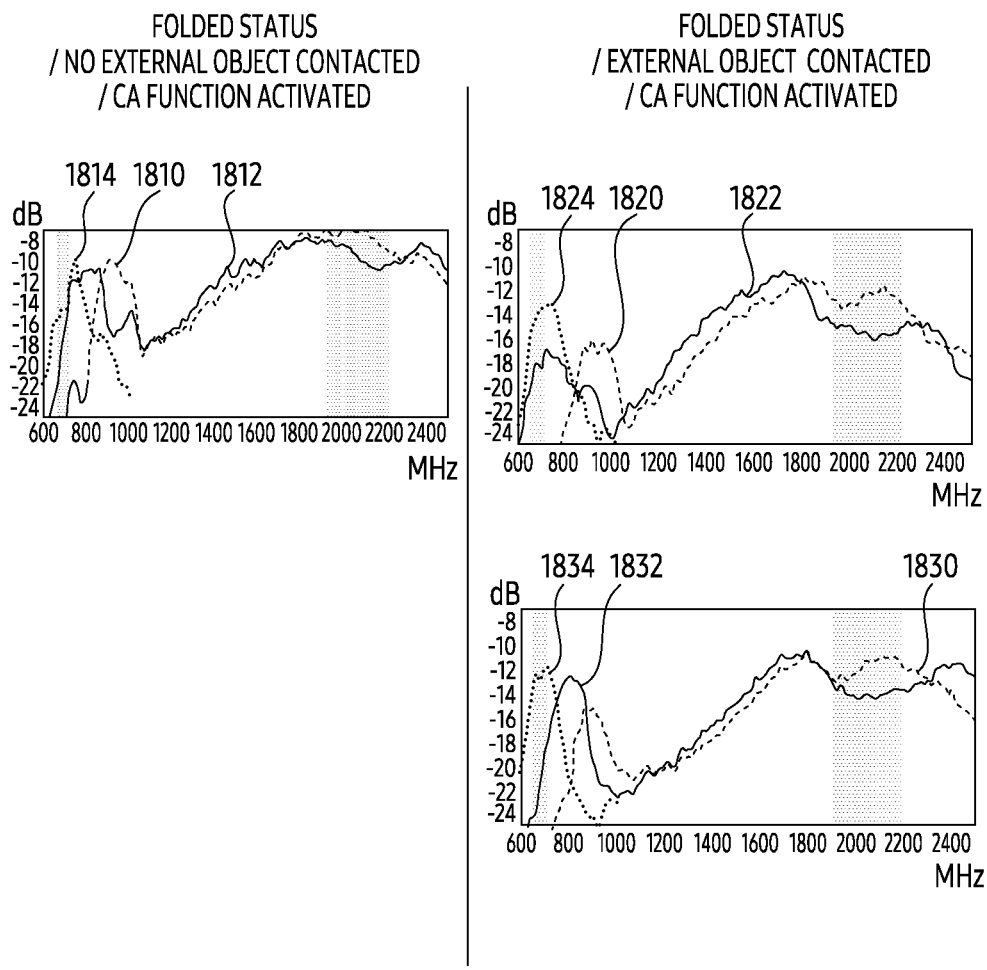
FIGS. 18A and 18B are graphs for describing that an electronic device according to an embodiment improves performance of antennas based on a power division circuit.
Figure 18B:
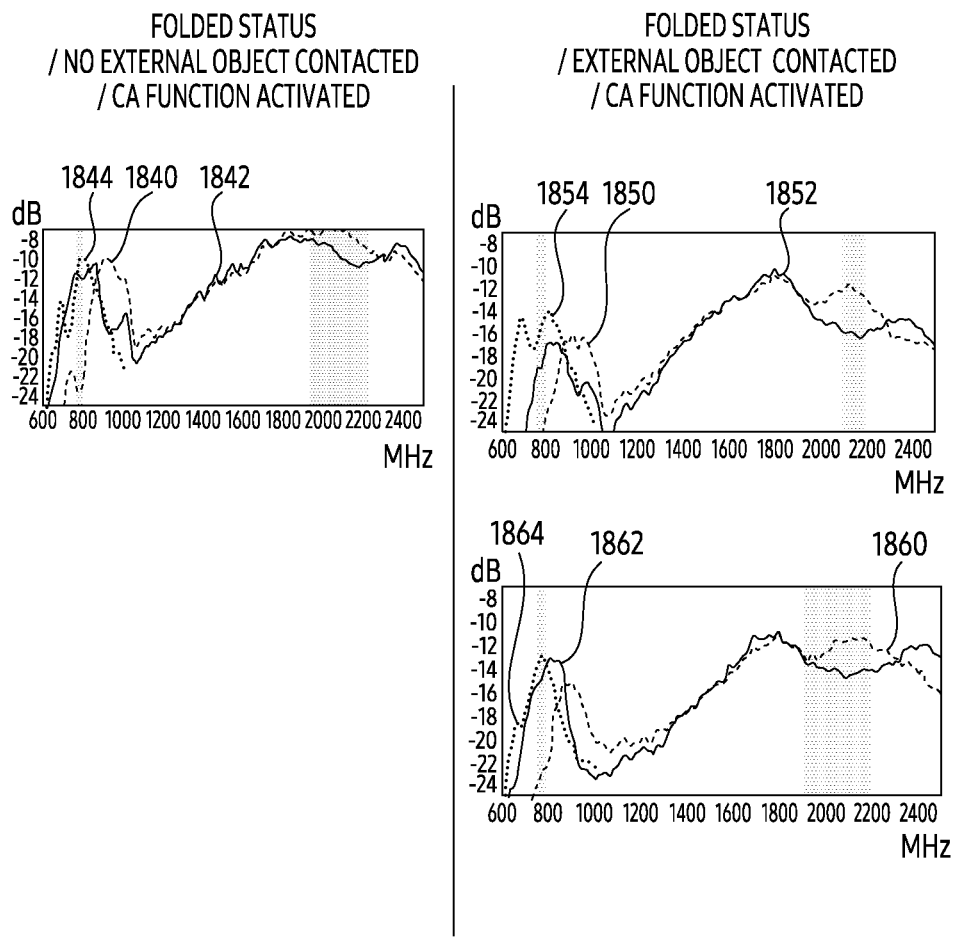

FIGS. 18A and 18B are graphs for illustrating an electronic device according to an embodiment improves performance of antennas based on a power division circuit. The electronic devices of FIGS. 17A and 17B and 18A and 18B may be examples of the electronic device 101 of FIG. 1. For example, the electronic devices of FIGS. 17A to 18B may include the power division circuit 510 of FIG. 5.

Referring to FIGS. 17A, 17B, 18A, and 18B, as shown in FIGS. 11A and 11B, Graphs for describing an improvement in performance when impedance related to a plurality of antennas is adjusted by a power division circuit according to an embodiment of an electronic device foldable by housings are illustrated. The x-axis of the graphs of FIGS. 17A, 17B, 18A, and 18B may mean frequencies indicated based on MHz, and the y-axis may represent total radiation efficiency of the electronic device based on the dB. Referring to FIGS. 17A and 18A, the total radiation efficiency measured in a state in which a carrier aggregation (CA) function based on B71, B2 of an LB band and B66 of an MB band is activated is illustrated. Referring to FIGS. 17B and 18B, the total radiation efficiency measured in each of the states in which the CA function based on the B13 of the LB band and the B66 of the MB band is activated is illustrated.

Referring to FIGS. 17A and 17B, in a state in which the electronic device is fully unfolded, graphs measured according to whether an external object is in contact are illustrated.

Referring to FIG. 17A, the graphs 1710, 1720, and 1740 illustrate the total radiation efficiency in a state in which the electronic device uses all of the frequency bands of B2 and B66 only as the main antenna (e.g., the first antenna 580 of FIG. 5). The graphs 1712, 1722, and 1742 illustrate the total radiation efficiency in a state in which the electronic device uses all of the frequency bands of B71, B2, and B66 only as the main antenna (e.g., the first antenna 580 of FIG. 5). According to an embodiment, based on the power division circuit, the graphs 1714, 1724, and 174 illustrate the total radiation efficiency in a state in which the frequency band of B71 is used based on a sub antenna different from the main antenna (e.g., the second antenna 585 of FIG. 5). Referring to graphs 1714, 1724, and 1744, in each state, the total radiation efficiency in the frequency band of B71 may be maximized when the electronic device uses the frequency band of B71 based on the sub-antenna. Comparing each of the graphs 1724 and 174 with the graph 1714, radiation efficiency when using the B71 band based on the sub-antenna may be relatively improved in a state where the external object contacts the electronic device.

Referring to FIG. 17A, the graph 1730 illustrates the total radiation efficiency when the electronic device uses the LB bands (e.g., B2 and B71) based on the main antenna. Graph 1735 illustrates the total radiation efficiency when the electronic device uses the LB bands (e.g., B2 and B71) based on the sub-antenna.

Referring to FIG. 17B, graphs 1750, 1760, and 1780 illustrate the total radiation efficiency in a state in which the electronic device uses the frequency band of B66 based on the main antenna (e.g., the first antenna 580 of FIG. 5). The graphs 1752, 1762, and 1782 illustrate the total radiation efficiency in a state in which the electronic device uses all of the frequency bands of B13 and B66 only as the main antenna (e.g., the first antenna 580 of FIG. 5). The graphs 1754, 1764, and 1784 illustrate the total radiation efficiency in a state in which the frequency band of B13 is used based on a sub antenna different from the main antenna (e.g., the second antenna 585 of FIG. 5), based on the power division circuit according to an embodiment. Referring to graphs 1754, 1764, and 1784, in each state, the total radiation efficiency in the frequency band of B13 may be maximized when the electronic device uses the frequency band of B13 based on the sub-antenna. Comparing the graphs 1764 and 1784 with the graphs 1754, radiation efficiency when using the B13 band based on the sub-antenna may be relatively improved in a state where the external object contacts the electronic device.

Referring to FIG. 17B, a graph 1770 illustrates total radiation efficiency when the electronic device uses the LB band (e.g., the B13 band) based on the main antenna. Graph 1775 illustrates the total radiation efficiency when the electronic device uses the LB band (e.g., the B13 band) based on the sub-antenna.

Referring to FIGS. 18A and 18B, graphs measured according to whether an external object is in contact in a state in which an electronic device is fully folded are illustrated.

Referring to FIG. 18A, graphs 1810, 1820, and 1830 illustrate the total radiation efficiency in a state in which the electronic device uses all of the frequency bands of B2 and B66 only as the main antenna (e.g., the first antenna 580 of FIG. 5). The graphs 1812, 1822, and 1832 illustrate the total radiation efficiency in a state in which the electronic device uses all of the frequency bands of B71, B2, and B66 only as the main antenna (e.g., the first antenna 580 of FIG. 5). Based on the power division circuit, according to an embodiment, the graphs 1814, 1824, and 1834 illustrate the total radiation efficiency in a state in which the frequency band of B71 is used based on a sub-antenna (e.g., the second antenna 585 of FIG. 5) distinct from the main antenna. Referring to graphs 1814, 1824, and 1834, in each state, the total radiation efficiency in the frequency band of B71 may be maximized when the electronic device uses the frequency band of B71 based on the sub-antenna. For example, since the electronic device uses the frequency band of B71 by switching from the main antenna to the sub-antenna based on the power division circuit according to an embodiment, the total radiation efficiency in the frequency band of B71 may be improved.

Similarly, referring to FIG. 18B, graphs 1840, 1850, and 1860 illustrate the total radiation efficiency in a state in which the electronic device uses the frequency band of B66 based on the main antenna (e.g., the first antenna 580 of FIG. 5). The graphs 1842, 1852, and 1862 illustrate the total radiation efficiency in a state in which the electronic device uses all of the frequency bands of B13 and B66 only as the main antenna (e.g., the first antenna 580 of FIG. 5). Based on the power division circuit, according to an embodiment, the graphs 1844, 1854, and 1864 illustrate the total radiation efficiency in a state in which the frequency band of B13 is used based on a sub-antenna (e.g., the second antenna 585 of FIG. 5) distinct from the main antenna. Referring to graphs 1844, 1854, and 1864, in each state, the total radiation efficiency in the frequency band of B13 may be maximized when the electronic device uses the frequency band of B13 based on the sub-antenna activated using the power division circuit according to an embodiment. Comparing the graphs 1854 and 1864 with the graphs 1844, the total radiation efficiency may be improved as the electronic device switches an antenna corresponding to the B13 band to a sub-antenna based on identifying an external object in contact with the electronic device.

As described above, according to an embodiment, an electronic device (e.g., the electronic device 101 of FIG. 1 and/or FIG. 5) may comprise a first antenna (e.g., the first antenna 580 of FIG. 5), a first impedance matching circuitry (e.g., the first phase shifting circuit 520 of FIG. 5) corresponding to the first antenna, a second antenna (e.g., the second antenna 585 of FIG. 5), a second impedance matching circuitry (e.g., the second phase shifting circuit 525 of FIG. 5) corresponding to the second antenna, a switch (e.g., the switch 515 of FIG. 5) connected to the first impedance matching circuitry and the second impedance matching circuitry, and a processor (e.g., the communication processor 505 of FIG. 5 and/or the processor 120 of FIG. 1) controlling the switch. The processor may be configured to adjust, in a first state that the first antenna and the second antenna is activated based on a preset phase, impedances of the first impedance matching circuitry and the second impedance matching circuitry as a first impedance by controlling the switch. The processor may be configured to adjust, in a second state that the first antenna of the first antenna and the second antenna is activated, an impedance of the first impedance matching circuitry as the second impedance different from the first impedance by controlling the switch.

For example, the electronic device may further comprise an amplifier, and wherein the switch is configured to electronically connects, in the first state, the amplifier (e.g., the first amplifier and/or the second amplifier 564 of FIG. 5) to the first node of a first node and a second node of the first impedance matching circuitry, and electronically connects the amplifier to a third node of the second impedance matching circuitry, and electronically connects, in the second state, the amplifier to both of the first node and the second node, and electronically insulates the amplifier and the second impedance matching circuitry.

For example, the first impedance matching circuitry may comprise a first block (e.g., the first block 615 of FIGS. 6A to 6C) which is disposed between the first node, and a fourth node that is electronically connected to at least one filter filtering an electronic signal associated with the first antenna, and is configured to adjust a phase of an electronic signal transmitted between the first node and the fourth node according to the preset phase, and a second block (e.g., the second block 625 of FIGS. 6A to 6C) which is disposed between the second node and the fourth node, and is configured to adjust an impedance of the first impedance matching circuit to the second impedance, based on electronic connection between the amplifier and the second node in the second state.

For example, the first block of the first impedance matching circuit may comprise a first capacitor including an end connected to the first node, and another end connected to the fourth node, a first inductor including an end connected to the first node, and another end that is grounded, a second inductor including an end connected to the fourth node, and another end that is grounded, and wherein the second block of the first impedance matching circuit may comprise a second capacitor including an end connected to the second node, and another end connected to the fourth node, and having a capacitance that is half of a capacitance of the first capacitor.

For example, the first block of the first impedance matching circuit may comprise a first inductor including an end connected to the first node, and another end connected to the fourth node, a first capacitor including an end connected to the first node, and another end that is grounded, a second capacitor including an end connected to the fourth node, and another end that is grounded, and wherein the second block of the first impedance matching circuit may comprise a second inductor including an end connected to the second node, and another end connected to the fourth node, and having an inductance that is multiplier of an inductance of the first inductor.

For example, the electronic device may further comprise an amplifier, and wherein the switch may be configured to electronically connects, in the second state, the amplifier to a first node of the first impedance matching circuit, electronically connects, in the second state, a second node of the first impedance matching circuit to a ground node, electronically insulates, in the second state, the amplifier and the second impedance matching circuit, and electronically insulates, in the first state, the second node and the ground node.

For example, the first impedance matching circuit may comprise a first block which is disposed between the first node, and a fourth node electronically connected to at least one filter filtering an electronic signal associated with the first antenna, and configured to adjust a phase of an electronic signal transmitted between the first node and the fourth node according to a preset phase, and a second block which is disposed between the second node and a fifth node of the first block, and configured to adjust an impedance of the first impedance matching circuit to the second impedance based on electronic connection between the amplifier and the second node in the second state.

For example, the first block of the first impedance matching circuit may comprise a first inductor including an end connected to the first node, and another end connected to the fifth node, a second inductor including an end connected to the fifth node, and another end connected to the fourth node, and a first capacitor including an end connected to the fifth node, and another end that is grounded, and wherein the second block of the first impedance matching circuit may comprise a second capacitor including an end connected to the second node, and another end connected to the fifth node, and having a capacitance which is ⅓ of a capacitance of the first capacitor.

For example, the first block of the first impedance matching circuit may comprise a first capacitor including an end connected to the first node, and another end connected to the fifth node, a second capacitor including an end connected to the fifth node, and another end connected to the fourth node, and a first inductor including an end connected to the fifth node, and another end that is grounded, and wherein the second block of the first impedance matching circuit may comprise a second inductor including an end connected to the second node, and another end connected to the fifth node, and having an inductance which is a multiplier of an inductance of the first inductor.

For example, the electronic device may further comprise a first housing, a second housing, a hinge assembly which is disposed between the first housing and the second housing and rotatably connects the first housing and the second housing by a folding axis, and wherein the first antenna may be disposed on an edge of the first housing separated from the hinge assembly in parallel, and wherein the second antenna may be disposed on an edge of the second housing separated from the hinge assembly in parallel.

For example, the processor may be configured to control the switch based on the first state, in response to identifying that a distance between the edge of the first housing and the edge of the second housing is included in a preset range, and switch, in response to identification of an external object contact with the electronic device while controlling the switch based on the first state, from the first state to the second state.

For example, the processor may be configured to control the switch based on the second state, in response to identifying that a distance between an edge of the first housing and an edge of the second housing is greater than a preset threshold.

As described above, according to an embodiment, a method of an electronic device may comprise identifying a distance between a first antenna and a second antenna supporting communication between the electronic device and external electronic device. The method may comprise activating, in a first state where the distance is lower than a preset threshold, a first impedance matching circuit of the first antenna and a second impedance matching circuit of the second antenna, based on a preset phase and a first impedance. The method may comprise selectively activating, in a second state where the distance is greater than the preset threshold, one of the first impedance matching circuit and the second impedance matching circuit based on a second impedance different from the first impedance.

For example, the selectively activating one of the first impedance matching circuit and the second impedance matching circuit may further comprise identifying whether a receiver of the electronic device is activated in response to identification of an external object contacted with the electronic device, selectively activating, in a third state where the receiver is activated, the second impedance matching circuit of the first impedance matching circuit and the second impedance matching circuit based on the second impedance, selectively activating, in a fourth state different from the third state, the first impedance matching circuit of the first impedance matching circuit and the second impedance matching circuit based on the second impedance, and selectively activating, in response to identification that the external object is not identified, the first impedance matching circuit of the first impedance matching circuit and the second impedance matching circuit based on the second impedance.

For example, the activating the first impedance matching circuit and the second impedance matching circuit based on a preset phase and the first impedance may further comprise electronically connecting, of a first node and a second node of the first impedance matching circuit, the first node and a third node of the third node and the fourth node of the second impedance matching circuit, to an amplifier, electronically insulating the first node and the second node from the amplifier in the third state, electronically connecting both of the third node and the fourth node from the amplifier in the third state.

For example, the identifying may comprise Identifying the distance based on a sensor included in the electronic device, and is configured to detect a degree between a first housing including the first antenna, and a second housing including a second antenna.

For example, as described above, according to an embodiment, an electronic device may comprise a sensor, a first antenna (e.g., the first antenna 580 of FIG. 5), a first impedance matching circuit (e.g., a first impedance matching circuit 520 of FIG. 5) corresponding to the first antenna, second antenna (e.g., a second antenna 585 of FIG. 5), a second impedance matching circuit (e.g., a second impedance matching circuit 525 of FIG. 5) corresponding to the second antenna, a switch (e.g., a switch 515 of FIG. 5) connected to the first impedance matching circuit and the second impedance matching circuit, and a processor (e.g., the communication processor 505 of FIG. 5 and/or the processor 120 of FIG. 1) controlling the switch based on the sensor, wherein the processor may be configured to activate, in a first state that both the first antenna and second antenna are activated, both the first impedance matching circuit and the second impedance matching circuit based on a preset phase and a first impedance, and switch, in response to identification of an external object in contact with the electronic device by using the sensor in the first state, from the first state to a second state that an impedance of one of the first impedance matching circuit or the second impedance matching circuit is adjusted to a second impedance different from the first impedance by controlling the switch.

For example, the electronic device may further comprise a receiver, and wherein the processor may be configured to identify, in response to identification of the external object, whether the receiver is enabled, adjust, based on identification that the receiver is enabled, an impedance of the first impedance matching circuit of the first impedance matching circuit and the second impedance matching circuit to the second impedance, and adjust, based on identification that the receiver is disabled, an impedance of the second impedance matching circuit of the first impedance matching circuit and the second impedance matching circuit to the second impedance.

For example, the first impedance matching circuit may comprise a first node electronically connected to an amplifier by the switch in the first state, a second node connected to a diplexer of the first antenna, and a third node that is electronically connected to the amplifier by the switch controlled by the processor in the second state, and is electronically insulated from the amplifier in the first state.

For example, the first impedance matching circuit may comprise at least one circuit element for adjusting an impedance of the first impedance matching circuit, to the second impedance from the first impedance for impedance matching in the second state, as the at least one circuit element electronically connected to the amplifier in the second state, and wherein the at least one circuit element may include an end connected to the second node and another end connected to the third node.

As described above, according to an embodiment, a method of an electronic device may comprise activating, in a first state that both the first antenna and second antenna are activated, both the first impedance matching circuit and the second impedance matching circuit based on a first impedance by controlling a switch connected to a first impedance matching circuit corresponding to the first antenna and a second impedance matching circuit corresponding to the second antenna. The method may comprise switching, in response to identification of an external object in contact with the electronic device by using the sensor of the electronic device in the first state, from the first state to a second state that an impedance of one of the first impedance matching circuit or the second impedance matching circuit is adjusted to a second impedance different from the first impedance by controlling the switch.

The devices described heretofore may be implemented as hardware components, or software components, and/or a combination of the hardware components and the software components. For example, the devices and components described in the embodiments may be implemented using one or more general-purpose or special-purpose of computers, such as e.g., a processor, a controller, an arithmetic logic unit (ALU), a digital signal processor, a microcomputer, a field programmable gate array (FPGA), a programmable logic unit (PLU), a microprocessor, or any other device capable of executing and responding to instructions. A processing unit/device may execute an operating system (OS) and one or more software applications running on the operating system. Further, the processing unit may access, store, manipulate, process, and generate data in response to execution of the software. For convenience of understanding, although it is sometimes described that a single processing unit is used, one of ordinary knowledge in the art will appreciate that the processing unit may include a plurality of processing elements and/or plural types of such processing elements. For example, the processing unit may include multiple processors or a single processor and at least one controller. Other processing configurations may be also possible, such as a parallel processor.

The software may include computer programs, codes, instructions, or a combination of one or more of the same, and configure a processing unit to operate as desired or command the processing unit independently or collectively. The software and/or data may be embodied in any type of machine, component, physical device, computer storage medium or device for interpretation by the processing unit or providing instructions or data to thereto. The software may be distributed over networked computer systems and stored or executed in a distributed manner. Software and data may be stored in one or more computer-readable recording media.

The method according to an embodiment may be implemented in the form of program instructions that can be executed through various computer means and recorded in a computer-readable medium. In this instance, the medium may be to continuously store the computer-executable program, or to temporarily store the program for execution or download. Further, the medium may be various recording means or storage means in the form of a single or several hardware combined together, which is not limited to a medium directly connected to any computer system and may exist distributed over a network. Examples of the recording media may include a magnetic medium, such as e.g., a hard disk, a floppy disk and a magnetic tape, an optical recording medium, such as e.g., CD-ROM and DVD, a magneto-optical medium, such as e.g., a floptical disk, and those configured to store program instructions, such as e.g., ROM, RAM, flash memory, and the like. In addition, examples of other recording media may include recording media or storage media managed by an app stores distributing applications, websites supplying or distributing various other software, and servers.

As described above, although an embodiment has been described with reference to some limited embodiments and drawings, various modifications and changes may be made from the above description by those skilled in the art. For example, although the techniques described above are performed in an order different from the described methods, and/or the described system, structure, apparatus, circuit, etc. are coupled or combined in a different form than the described method, and/or replaced or substituted by other components or equivalents thereof, an appropriate result can be achieved.

Therefore, any other implementations, alternative embodiments, and/or equivalents to those claims will fall within the scope of the following claims.

What is claimed is:

1. An electronic device comprising:
a first antenna;
a first impedance matching circuitry corresponding to the first antenna;
a second antenna;
a second impedance matching circuitry corresponding to the second antenna;
a switch connected to the first impedance matching circuitry and the second impedance matching circuitry; and
a processor controlling the switch,
wherein the processor is configured to:
adjust, in a first state that the first antenna and the second antenna is activated based on a preset phase, impedances of the first impedance matching circuitry and the second impedance matching circuitry as a first impedance by controlling the switch; and
adjust, in a second state that the first antenna among the first antenna and the second antenna is activated, an impedance of the first impedance matching circuitry as a second impedance distinct from the first impedance by controlling the switch.

2. The electronic device of claim 1, further comprising:
an amplifier,
wherein the switch is configured to:
electronically connect, in the first state, the amplifier, among a first node and a second node of the first impedance matching circuitry, to the first node, and electronically connect the amplifier to a third node of the second impedance matching circuitry; and
electronically connect, in the second state, the amplifier to both of the first node and the second node, and electronically insulate the amplifier and the second impedance matching circuitry.

3. The electronic device of claim 2, wherein the first impedance matching circuitry comprises:
a first block which is disposed between the first node, and a fourth node that is electronically connected to at least one filter filtering an electronic signal associated with the first antenna, and is configured to adjust a phase of an electronic signal transmitted between the first node and the fourth node according to the preset phase; and
a second block which is disposed between the second node and the fourth node, and is configured to adjust an impedance of the first impedance matching circuitry to the second impedance, based on electronic connection between the amplifier and the second node in the second state.

4. The electronic device of claim 3,
wherein the first block of the first impedance matching circuitry comprises:
a first capacitor including an end connected to the first node, and another end connected to the fourth node;
a first inductor including an end connected to the first node, and another end that is grounded; and
a second inductor including an end connected to the fourth node, and another end that is grounded, and
wherein the second block of the first impedance matching circuitry comprises a second capacitor including an end connected to the second node, and another end connected to the fourth node, and having a capacitance that is half of a capacitance of the first capacitor.

5. The electronic device of claim 3,
wherein the first block of the first impedance matching circuitry comprises:
a first inductor including an end connected to the first node, and another end connected to the fourth node;
a first capacitor including an end connected to the first node, and another end that is grounded; and
a second capacitor including an end connected to the fourth node, and another end that is grounded, and
wherein the second block of the first impedance matching circuitry comprises a second inductor including an end connected to the second node, and another end connected to the fourth node, and having an inductance that is multiplier of an inductance of the first inductor.

6. The electronic device of claim 1, further comprising:
an amplifier,
wherein the switch is configured to:

electronically connect, in the second state, the amplifier to a first node of the first impedance matching circuitry;

electronically connect, in the second state, a second node of the first impedance matching circuitry to a ground node;

electronically insulate, in the second state, the amplifier and the second impedance matching circuitry; and electronically insulate, in the first state, the second node and the ground node.

7. The electronic device of claim 6, wherein the first impedance matching circuitry comprises:

a first block which is disposed between the first node, and a fourth node electronically connected to at least one filter filtering an electronic signal associated with the first antenna, and configured to adjust a phase of an electronic signal transmitted between the first node and the fourth node according to a preset phase; and a second block which is disposed between the second node and a fifth node of the first block, and configured to adjust an impedance of the first impedance matching circuitry to the second impedance based on electronic connection between the amplifier and the second node in the second state.

8. The electronic device of claim 7, wherein the first block of the first impedance matching circuitry comprises:

a first inductor including an end connected to the first node, and another end connected to the fifth node;

a second inductor including an end connected to the fifth node, and another end connected to the fourth node; and a first capacitor including an end connected to the fifth node, and another end that is grounded, and wherein the second block of the first impedance matching circuitry comprises a second capacitor including an end connected to the second node, and another end connected to the fifth node, and having a capacitance which is ⅓ of a capacitance of the first capacitor.

9. The electronic device of claim 7, wherein the first block of the first impedance matching circuitry comprises:

a first capacitor including an end connected to the first node, and another end connected to the fifth node;

a second capacitor including an end connected to the fifth node, and another end connected to the fourth node; and a first inductor including an end connected to the fifth node, and another end that is grounded, and wherein the second block of the first impedance matching circuitry comprises a second inductor including an end connected to the second node, and another end connected to the fifth node, and having an inductance which is a multiplier of an inductance of the first inductor.

10. The electronic device of claim 1, further comprising:

a first housing;

a second housing; and a hinge assembly which is disposed between the first housing and the second housing and rotatably connects the first housing and the second housing by a folding axis, wherein the first antenna is disposed on an edge of the first housing separated from the hinge assembly in parallel, and wherein the second antenna is disposed on an edge of the second housing separated from the hinge assembly in parallel.

11. The electronic device of claim 10, wherein the processor is further configured to:

control the switch based on the first state, in response to identifying that a distance between the edge of the first housing and the edge of the second housing is included in a preset range; and switch, in response to identification of an external object contact with the electronic device while controlling the switch based on the first state, from the first state to the second state.

12. The electronic device of claim 10, wherein the processor is further configured to control the switch based on the second state, in response to identifying that a distance between an edge of the first housing and an edge of the second housing is greater than a preset threshold.

13. A method of an electronic device, the method comprising:

identifying a distance between a first antenna and a second antenna supporting communication between the electronic device and external electronic device;

activating, in a first state where the distance is lower than a preset threshold, a first impedance matching circuit of the first antenna and a second impedance matching circuit of the second antenna, based on a preset phase and a first impedance; and selectively activating, in a second state where the distance is greater than the preset threshold, one of the first impedance matching circuit and the second impedance matching circuit based on a second impedance different from the first impedance.

14. The method of claim 13, wherein the selectively activating of the one of the first impedance matching circuit and the second impedance matching circuit comprises:

identifying whether a receiver of the electronic device is activated in response to identification of an external object contacted with the electronic device;

selectively activating, in a third state where the receiver is activated, the second impedance matching circuit among the first impedance matching circuit and the second impedance matching circuit based on the second impedance;

selectively activating, in a fourth state different from the third state, the first impedance matching circuit among the first impedance matching circuit and the second impedance matching circuit based on the second impedance; and selectively activating, in response to identification that the external object is not identified, the first impedance matching circuit among the first impedance matching circuit and the second impedance matching circuit based on the second impedance.

15. The method of claim 14, wherein the activating of the first impedance matching circuit and the second impedance matching circuit based on a preset phase and the first impedance further comprises:

electronically connecting, among a first node and a second node of the first impedance matching circuit, the first node and a third node among the third node and a fourth node of the second impedance matching circuit, to an amplifier;

electronically insulating the first node and the second node from the amplifier in the third state; and electronically connecting both of the third node and the fourth node from the amplifier in the third state.

16. The method of claim 14, wherein the identifying of whether the receiver of the electronic device is activated comprises:
    identifying the distance based on a sensor included in the electronic device, and is configured to detect a degree between a first housing including the first antenna, and a second housing including a second antenna.

17. An electronic device comprising:
a sensor;
a first antenna;
a first impedance matching circuit corresponding to the first antenna;
a second antenna;
a second impedance matching circuit corresponding to the second antenna;
a switch connected to the first impedance matching circuit and the second impedance matching circuit; and
a processor controlling the switch based on the sensor,
wherein the processor is configured to:
    activate, in a first state that both the first antenna and second antenna are activated, both the first impedance matching circuit and the second impedance matching circuit based on a preset phase and a first impedance by controlling the switch; and
    switch, in response to identification of an external object in contact with the electronic device by using the sensor in the first state, from the first state to a second state that an impedance of one of the first impedance matching circuit or the second impedance matching circuit is adjusted to a second impedance different from the first impedance by controlling the switch.

18. The electronic device of claim 17, further comprising:
a receiver,
wherein the processor is further configured to:
    identify, in response to identification of the external object, whether the receiver is enabled;
    adjust, based on identification that the receiver is enabled, an impedance of the first impedance matching circuit among the first impedance matching circuit and the second impedance matching circuit to the second impedance; and
    adjust, based on identification that the receiver is disabled, an impedance of the second impedance matching circuit among the first impedance matching circuit and the second impedance matching circuit to the second impedance.

19. The electronic device of claim 17, wherein the first impedance matching circuit comprises:
a first node electronically connected to an amplifier by the switch in the first state;
a second node connected to a diplexer of the first antenna; and
a third node that is electronically connected to the amplifier by the switch controlled by the processor in the second state, and is electronically insulated from the amplifier in the first state.

20. The electronic device of claim 19,
wherein the first impedance matching circuit comprises at least one circuit element for adjusting an impedance of the first impedance matching circuit, to the second impedance from the first impedance for impedance matching in the second state, as the at least one circuit element electronically connected to the amplifier in the second state, and
wherein the at least one circuit element includes an end connected to the second node and another end connected to the third node.

* * * * *